(12) United States Patent
Cohen

(10) Patent No.: US 8,702,432 B2
(45) Date of Patent: *Apr. 22, 2014

(54) SYSTEMS AND METHODS FOR COMPUTERIZED INTERACTIVE TRAINING

(75) Inventor: Martin L. Cohen, Malibu, CA (US)

(73) Assignee: Breakthrough Performancetech, LLC, Los Angeles, CA (US)

( * ) Notice: Subject to any disclaimer, the term of this patent is extended or adjusted under 35 U.S.C. 154(b) by 1359 days.

This patent is subject to a terminal disclaimer.

(21) Appl. No.: 12/058,493

(22) Filed: Mar. 28, 2008

(65) Prior Publication Data

US 2008/0254424 A1    Oct. 16, 2008

Related U.S. Application Data

(60) Provisional application No. 60/908,598, filed on Mar. 28, 2007, provisional application No. 60/948,881, filed on Jul. 10, 2007, provisional application No. 60/954,273, filed on Aug. 6, 2007.

(51) Int. Cl.
*G09B 23/28* (2006.01)

(52) U.S. Cl.
USPC ............ 434/323; 434/322; 434/350; 434/362

(58) Field of Classification Search
USPC .................................. 434/322, 323, 350, 362
See application file for complete search history.

(56) References Cited

U.S. PATENT DOCUMENTS

| | | | |
|---|---|---|---|
| 4,015,344 A | 4/1977 | Michaels et al. | |
| 4,459,114 A * | 7/1984 | Barwick | 434/307 R |
| 4,493,655 A | 1/1985 | Groff | |
| 4,608,601 A | 8/1986 | Shreck et al. | |
| 4,643,682 A | 2/1987 | Migler | |
| 4,689,022 A | 8/1987 | Peers et al. | |
| 4,745,468 A | 5/1988 | Von Kohorn | |
| 5,006,987 A | 4/1991 | Harless | |
| 5,056,792 A | 10/1991 | Helweg-Larsen et al. | |
| 5,147,205 A | 9/1992 | Gross et al. | |
| 5,533,110 A | 7/1996 | Pinard et al. | |
| 5,597,312 A | 1/1997 | Bloom et al. | |

(Continued)

FOREIGN PATENT DOCUMENTS

| | | |
|---|---|---|
| GB | 2271262 A | 4/1994 |
| JP | 2000330464 | 11/2000 |

(Continued)

OTHER PUBLICATIONS

International Search Report and Written Opinion; PCT/US08/58781, Filing date: Mar. 28, 2008; mailed Oct. 1, 2008.

(Continued)

*Primary Examiner* — Nikolai A Gishnock
(74) *Attorney, Agent, or Firm* — Knobbe, Martens, Olson & Bear LLP

(57) ABSTRACT

Interactive electronic training systems and methods are described herein. Certain embodiments provide preprogrammed video, audio, and/or textual presentations of training materials which provide information related to skills/information to be trained. A scenario including real or animated actors is presented, simulating an interaction. The training system presents related queries for the trainee who audibly responds. The training system stores a score based in part on a comparison of the trainee's response with an answer stored in training system memory. Optionally, the scores are substantially immediately presented by the system to the trainee.

39 Claims, 80 Drawing Sheets

(56) References Cited

U.S. PATENT DOCUMENTS

| | | |
|---|---|---|
| 5,722,418 A | 3/1998 | Bro |
| 5,980,429 A | 11/1999 | Nashner |
| 6,067,638 A | 5/2000 | Benitz et al. |
| 6,106,298 A | 8/2000 | Pollak |
| 6,113,645 A | 9/2000 | Benitz et al. |
| 6,125,356 A * | 9/2000 | Brockman et al. ............. 705/37 |
| 6,155,834 A | 12/2000 | New, III |
| 6,171,112 B1 | 1/2001 | Clark et al. |
| 6,190,287 B1 | 2/2001 | Nashner |
| 6,236,955 B1 | 5/2001 | Summers |
| 6,296,487 B1 | 10/2001 | Lotecka |
| 6,319,130 B1 | 11/2001 | Ooseki et al. |
| 6,409,514 B1 | 6/2002 | Bull |
| 6,514,079 B1 | 2/2003 | McMenimen et al. |
| 6,516,300 B1 | 2/2003 | Rakshit et al. |
| 6,535,713 B1 | 3/2003 | Houlihan et al. |
| 6,589,055 B2 | 7/2003 | Osborne et al. |
| 6,632,158 B1 | 10/2003 | Nashner |
| 6,648,651 B1 | 11/2003 | Cadman et al. |
| 6,684,027 B1 * | 1/2004 | Rosenberg ................. 386/244 |
| 6,705,869 B2 * | 3/2004 | Schwartz .................... 434/219 |
| 6,722,888 B1 | 4/2004 | Macri et al. |
| 6,736,642 B2 * | 5/2004 | Bajer et al. .................. 434/322 |
| 6,755,659 B2 | 6/2004 | LoSasso et al. |
| 6,909,874 B2 | 6/2005 | Holtz et al. |
| 6,913,466 B2 | 7/2005 | Stanfield et al. |
| 6,925,601 B2 | 8/2005 | Moore et al. |
| 6,944,586 B1 | 9/2005 | Harless et al. |
| 6,966,778 B2 | 11/2005 | Macri et al. |
| 6,976,846 B2 | 12/2005 | Dupont et al. |
| 6,988,239 B2 | 1/2006 | Womble et al. |
| 7,016,949 B1 | 3/2006 | Tagawa |
| 7,221,899 B2 | 5/2007 | Ohno et al. |
| 7,367,808 B1 | 5/2008 | Frank et al. |
| 2002/0059376 A1 | 5/2002 | Schwartz |
| 2002/0119434 A1 | 8/2002 | Beams et al. |
| 2003/0059750 A1 | 3/2003 | Bindler et al. |
| 2003/0065524 A1 * | 4/2003 | Giacchetti et al. ............. 705/1 |
| 2003/0127105 A1 | 7/2003 | Fontana |
| 2003/0180699 A1 | 9/2003 | Resor |
| 2004/0014016 A1 | 1/2004 | Popeck et al. |
| 2004/0018477 A1 | 1/2004 | Olsen |
| 2004/0043362 A1 * | 3/2004 | Aughenbaugh et al. ...... 434/118 |
| 2004/0166484 A1 | 8/2004 | Budke et al. |
| 2005/0003330 A1 | 1/2005 | Asgarinejad et al. |
| 2005/0004789 A1 | 1/2005 | Summers |
| 2005/0026131 A1 | 2/2005 | Elzinga et al. |
| 2005/0054444 A1 | 3/2005 | Okada |
| 2005/0089834 A1 * | 4/2005 | Shapiro ..................... 434/323 |
| 2005/0170326 A1 | 8/2005 | Koehler et al. |
| 2006/0048064 A1 | 3/2006 | Vronay |
| 2006/0074689 A1 | 4/2006 | Cosatto et al. |
| 2006/0078863 A1 | 4/2006 | Coleman et al. |
| 2006/0154225 A1 | 7/2006 | Kim |
| 2006/0172275 A1 | 8/2006 | Cohen |
| 2006/0177808 A1 | 8/2006 | Aosawa et al. |
| 2006/0204943 A1 | 9/2006 | Kimball |
| 2007/0015121 A1 | 1/2007 | Johnson et al. |
| 2007/0188502 A1 | 8/2007 | Bishop |
| 2007/0245305 A1 * | 10/2007 | Anderson .................. 717/110 |
| 2007/0245505 A1 | 10/2007 | Abfall et al. |
| 2008/0182231 A1 | 7/2008 | Cohen et al. |
| 2008/0254419 A1 | 10/2008 | Cohen |
| 2008/0254423 A1 | 10/2008 | Cohen |
| 2008/0254425 A1 | 10/2008 | Cohen |
| 2008/0254426 A1 | 10/2008 | Cohen |
| 2010/0028846 A1 | 2/2010 | Cohen et al. |

FOREIGN PATENT DOCUMENTS

| | | |
|---|---|---|
| JP | 200272843 | 3/2002 |
| JP | 200489601 | 3/2004 |
| JP | 2004240234 | 8/2004 |
| WO | WO 8505715 | 12/1985 |

OTHER PUBLICATIONS

PCT International Search Report and Written Opinion, PCT Application No. PCT/US2009/051994, dated Sep. 23, 2009.
PCT International Search Report and Written Opinion dated Jul. 23, 2008, PCT Application No. PCT/US2006/003174.
PCT International preliminary report on patentability; PCT Application No. PCT/US2006/003174, dated: Mar. 31, 2009.
PCT International Search Report and Written Opinion; PCT/US 08/50806; International Filing Date: Jan. 10, 2008; Mailed Jul. 8, 2008.
Australian Office Action, dated Jan. 31, 2012, on patent application 2008230731 by Breakthrough Performancetech, LLC, 3 pages.
English translation of Japanese Office Action regarding Japanese Patent Application No. 2007-553313, dated Mar. 12, 2012 and transmitted on Mar. 21, 2012.

* cited by examiner

| | | |
|---|---|---|
| BREAKTHROUGH PERFORMANCE TECHNOLOGIES *Performance Drilling* | | EXIT ☒ *Feedback Scores* |
| /1/2/3/4/5/ | | ◄ 4 of 5 ► MENU |

*Opportunity Clue Detailed Feedback Score*

| Opportunity Clue | Moving to the Area Soon | ☐ |
|---|---|---|
| Reason Why an Opportunity | Help with Day-to-Day Banking Needs | ☐ |
| Products and/od Services | Checking Account | ☐ |
| | Overdraft Protection | ☐ |
| | Savings Account | ☐ |
| | Money Market Account | ☐ |
| | ATM/Debit Card | ☐ |
| | Telephone Banking | ☐ |
| | Online Banking | ☐ |
| | Direct Deposit | ☐ |
| | Automatic Bill pay | ☐ |
| Reasons Why an Opportunity | Asset Protection | ☐ |
| Products and/or Services | Safe Deposit Box | ☐ |

Total Points = 0 out of 13

[Print Current Page]

Scoring page can be used as a post-study!

*FIG. 1H*

Performance Drilling

Challenges 1 2 3 4 5 6 7 8 9 10 11    1 of 11   MENU

*Technique Identification Introduction*

Welcome to the Technique Identification Section

You will listen to a conversation/segments of a conversation. Take detailed notes on correctly and incorrectly delivered key elements of a Mini-FiNAP, including key style elements.

You will then:
- Identify the key technique elements that were implemented correctly
- Identify the technique errors
- State why it is important to correct these errors
- Verbalize the correct technique guideline language for each error *in the first person*
- Identify the style key elements that were implemented correctly
- Identify the style key element errors You have the option of referring to the pre-study for each segment repeatedly. In addition, you can listen to role-modeled guideline language that demonstrates the correct technique for each technique error.

Review your scores upon responding to all the challenges related to a particular conversation segment and/or upon completing all segments.

*FIG. 1J*

| BREAKTHROUGH PERFORMANCE TECHNOLOGIES | *Performance Drilling* | EXIT ⊠ Challenges |

| 1 | 2 | 3 | 4 | 5 | 6 | 7 | 8 | 9 | 10 | 11 | ◀ 2 of 11 ▶ | MENU |

*Pre-Conversation Overview*

Module Objective:
To develop mastery of the Mini-FiNAP key elements.

Pre-Conversation Context:
The banker-proposed conversation you are about to hear takes place in a bank. It is the prospect's first time at this bank and he just finished opening an ABC Checking Account.

Your Immediate Steps:
Note all the correct and incorrect key elements you hear during the conversation.

Thereafter, as previously stated, be prepared to state why it is important to correct the errors, and to verbalize the correct technique guidelines language for each error *in the first person*. Also, take note of the correct and incorrect style elements.

Click the Forward arrow to continue.

*FIG. 1K*

BREAKTHROUGH PERFORMANCE TECHNOLOGIES *Performance Drilling*

EXIT ☒

*Challenges*

/1/2/3/4/5/6/7/8/9/10/11/ ◀ 3 of 11 ▶ MENU

*Pre-Conversation Overview Continues*

Your Next Steps:

You have the option of:

- Listening to the entire conversation and immediately responding to all challenges in the order listed
- Listening to the entire conversation and then listening to individual segments again before responding to challenges specific to each segment
- Listening to individual segments and answering questions specific to each segment without first listening to the entire conversation Click the Forward arrow to continue.

*FIG. 1L*

Welcome to Advanced Listening
Technologies (ALT)

Module 23

LOADING

Welcome to Advanced Listening Technologies (ALT)

Module 23

This Module is especially designed to improve the Financial Needs Analysis skills of Bankers and Managers.

You will listen to a fictional conversation between a Banker and Client (accompanied by on screen animation). This conversation contains a purpose-built Banker-Client interaction, designed with built in errors.

You will be required to listen intently for errors made by the Banker, identify these errors in real-time, and analyze them in detail.

You will also be required to keep track of any opportunities revealed by the Client, and to evaluate the Banker's communication style.

Financial Needs Analysis Profile

BACK        NEXT

*FIG. 3B*

General Overview

This conversation picks up right after the Banker has opened up a new Checking account for the Client who is new to the Bank. The Client is in a hurry to keep an appointment at a car dealership.

You are going to hear a Banker-Client interaction, the total length of which is about two and a half minutes.

The converstaion contains 11 errors made by the Banker. Your mission is to identify the errors when they occur, explain why they occur, and determine how to fix them.

Note: You may hear statements within the conversation during which the Client reveals opportunities not capitalized upon by the Banker. Do not click on the stop button in the case of these opportunities. The 11 errors will focus on Banker-Client interaction errors only, not missed opportunites. Even so, you should take note of these opportunities as you will be asked to identify them at the end of the interactive module.

BACK  NEXT

*FIG. 3C*

User Instructions

PART 1: Listening to the Conversation Uninterrupted

You will first be given the opportunity to listen to the entire conversation uninterrupted. Listen carefully for any errors, and take notes. Also listen and take notes of any opportunities revealed by the client, which are not capitalized upon by the Banker. The entire conversation lasts two-and-a-half minutes. You will not be allowed to pause or rewind Part 1. (If this is not your first attempt at this Module, you may skip it by clicking the skip Part 1 button.)

PART 2: Interactive Listening Section

At the end of Part 1, review your notes, and when ready click the GO! button to begin the interactive portion of this Module. You will hear the same conversation commence.

When you hear an error on the part of the Banker, click the STOP button immediately. The window of opportunity during which you can "score" by correctly clicking the STOP button is between 7 and 11 seconds. This window starts at the time the error occurs and ends near the end of the phrase or sentence. Do not wait until the end of a sentence to click the STOP button, as you may miss this window.

BACK    NEXT

*FIG. 3D*

User Instructions

If you identify an error correctly:
The STOP button will change color from red to green, and the conversation will automatically pause at the end of the sentence. You will then be presented with a multiple-choice quiz.

If you click the STOP button when there is no error present:
The conversation will continue uninterrupted and the stop button will stay red. Wrong clicks will reflect in your final score, so do not click on this button indiscriminately.

If you fail to click the STOP button during an error:
The conversation will stop automatically, replay the error, and then present you with a multiple-choice quiz.

Quiz:
Each multiple-choice quiz contains 2 questions, which refer directly to the error they follow. You will get 2 chances to answer each question correctly, before being presented with the correct answer. Upon completion of each quiz, the conversation will resume.

BACK    NEXT

*FIG. 3E*

User Instructions

PART 3: Opportunity Identification Test.

After you have completed the last two-part multiple-choice quiz, you will be presented with an opportunity identification test. This test will contain 9 phrases, each presented individually. You will be required to identify statements made by the Client during the conversation, which revealed opportunities, but were missed by the banker. Correctly identify these statements by clicking directly on the phrase as soon as you identify an opportunity. Your window of opportunity to click on a phrase is very small, as each phrase stays on the screen for only a few seconds.

If you identify the phrase correctly, you will be presented with a single multiple-choice quiz, and the test will continue after you have answered it.

If you misidentify the phrase as an opportunity, the test will continue uninterrupted.

If you fail to identify an opportunit phrase, you will hear an automatic REPLAY of the phrase followed by the multiple-choice quiz.

BACK    NEXT

*FIG. 3F*

Banker's Style Quiz:
To round off this module, you will be presented with a single question relating to your perception of the Banker's attitude and communication style.

Part 4: Final Score:
At the end of this module, you will be presented with a detailed score of this session, along with a scoring explanation.

Part 4: Final Score:
Click the GO TO PART 1 button to listen to the uninterrupted dialog.
We encourage you to take notes during this section.

BACK     GO TO PART 1

*FIG. 3G*

Part 1 Reminder

PART 1:

You are about to hear the conversation in its entirety without interruptions. Make sure that you have a pen and paper ready to take ntoes. Listen carefully for errors made by the Banker. Also listen and take note of opportunities revealed by the Client, which are not capitalized on by the Banker.

As a reminder, this conversation picks up right after the Banker has opened up a new Checking account for the Client, who is new to the Bank. The Client has revealed to the Banker that he has an appointment at a car dealership after this meeting at the bank. The total length of the conversation is about two and a half minutes.

Do not click the SKIP Part 1 button on the next screen if you are attempting this Module for the first time.

Click the OK button when you are ready.

BACK    OK

*FIG. 3H*

Part 2

PART 2:

You are about to start the core interactive section of this Module. Review your notes from Part 1, and have them on hand as a reminder.

Remember to stay very attentive and focused. Listen intently, with your hand poised on the mouse, and the cursor positioned over the STOP button. Be ready to click immediately when you hear an error.

The multiple-choice quizzes are not timed, so there is no need to rush your answers. Click the TRY AGAIN button if you get the answer wrong the first time.

Click the GO button below to proceed.

Good Luck!

Quiz 1 Question 1

Q. What is the error?

A. The Banker does not state the benefit to Mr. Jenkins for taking the time to do the Customer Service Review.

B. The Banker makes the Customer Service Review sound ordinary.

C. The Banker does not pre-position the Client Service Review at all.

Quiz 1 Question 1

Sorry, that's not the right answer.

Try Again!

( TRY AGAIN )

*FIG. 3M*

Quiz 1 Question 1

Incorrect

The correct answer is

A. The Banker does not state the benefit to Mr. Jenkins for taking the time to do the Customer Service Review.

B. The Banker makes the Customer Service Review sound ordinary.

C. The Banker does not pre-position the Client Service Review at all.

Quiz 1 Question 2

Correct

A. The fact that doing the Client Service Review is part of the banker's responsibility.

B. The fact that the Bank does this only with customers who maintain a minimum balance.

C. The fact that the Bank does the Client Service Review to provide appropriate financial recommendations.

D. All of the above

PART 3: Opportunity Identification Test

This test will contain 9 phrases, each presented individually. You will be required to identify statements made by the Client during the conversation, which revealed opportunites, but were missed by the banker. Correctly identify these statements by clicking directly on the phrase as soon as you identify an opportunity. Your window of opportunity to click on a phrase is very small, as each phrase stays on the screen for only a few seconds.

If you identify the phrase correctly, you will be presented with a single multiple-choice quiz, and the test will continue after you have answered it.

If you misidentify the phrase as an opportunity, the test will continue uninterrupted.

If you fail to identify an opportunity phrase, you will hear an automatic REPLAY of the phrase followed by the multiple-choice quiz.

Banker's Style Quiz:
To round off this module, you will be presented with a single question relating to your perception of the Banker's attitude and communication style.

Opportunities

What specific statements were made by the Client that the Banker did not capitalize upon during the conversation?

1. "A higher rate of return"

*FIG. 3Q*

You have just failed to identify an Opportunity!

To proceed with the session, please click the CONTINUE button below and you will be presented with the quiz.

Opportunity Question 1

Q. Why is this an opportunity?

A. If the client hasn't already moved from Texas, he may be moving soon which indicates a possibility for a home loan.

B. There may be real estate that has been sold or will be sold which indicates a possible windfall.

C. It can imply a recent marriage or divorce.

D. A & B only

*FIG. 3S*

Opportunity Question 1

Sorry, that's not the right answer.
Try Again!

TRY AGAIN

*FIG. 3T*

Opportunity Question 1

Incorrect
The correct answer is

A. If the client hasn't already moved from Texas, he may be moving soon which indicates a possibility for a home loan.

B. There may be real estate that has been sold or will be sold which indicates a possible windfall.

C. It can imply a recent marriage or divorce.

D. A & B only

Banker Style Question

Q. How would you best describe the Banker's attitude and style?

- A. Comforting & Formal
- B. Discouraging & Informal
- C. Unmotivated & Reactive
- D. Patronizing & Abrupt

*FIG. 3V*

Banker Style Question

Correct

A. Comforting & Formal

B. Discouraging & Informal

C. Unmotivated & Reactive

D. Patronizing & Abrupt

Subjectivity

Naturally with respect to both errors and opportunities and their associated quizzes there could be some subjectivity.

We believe that all errors and opportunities that are built into the scenarious are objectively correct.

On the other hand, as participant, you may have found additional errors and opportunities that ALT did not identify. Likewise, there may be a difference of opinion on some of the multiple-choice questions and answers.

Not withstanding the above, we have reviewed all ALT choices with a team of experts, and believe they are the best possible choices.

As the object of ALT is continuous improvement the score you are about to receive is not a "grade score". We believe that any difference of opinion between your thoughts and those of ALT will be relatively minor and inconsequential.

( GO TO SCORE )

*FIG. 3X*

LISTENING SCORE

Correct STOPS:
(Number of correctly identified errors)

Incorrect STOPS:
(Number of times you asked STOP when no error was present)

MULTIPLE-CHOICE QUIZ SCORE

Correct Answers:
(Questions you answered correctly on the first or second attempt)

OPPORTUNITIES SCORE

Correct STOPS during Opportunity Test
(Number of correctly identified opportunites)

Incorrect STOPS during Opportunity Test
(Number of times you clicked STOP when no Opportunity was present)

Correct Opportunity Quiz Answer:
(Questions you answered correctly on the first or second attempt)

STYLE ANSWER:

( CLOSE WINDOW )    ( REPEAT ALT )

*FIG. 3Y*

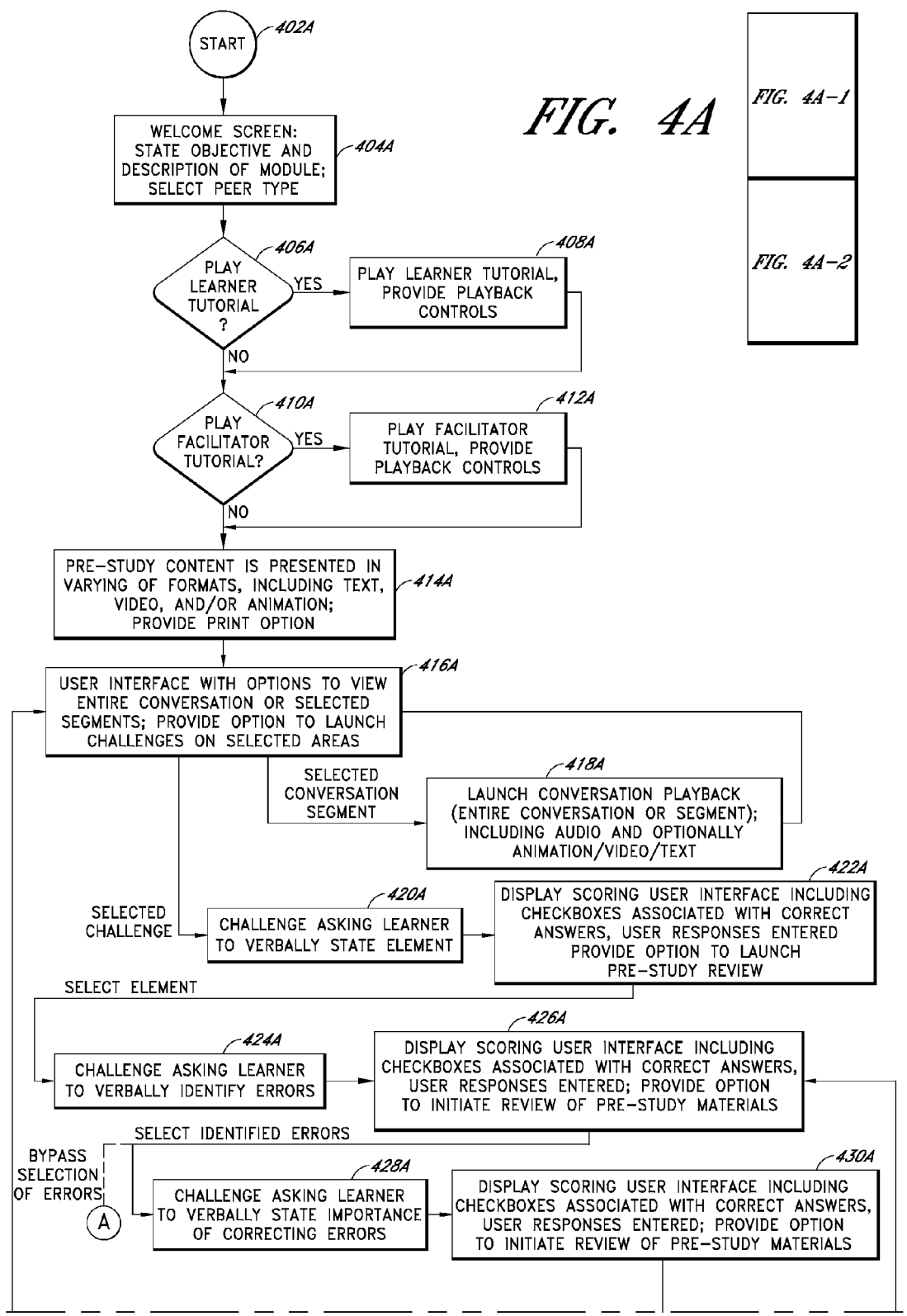

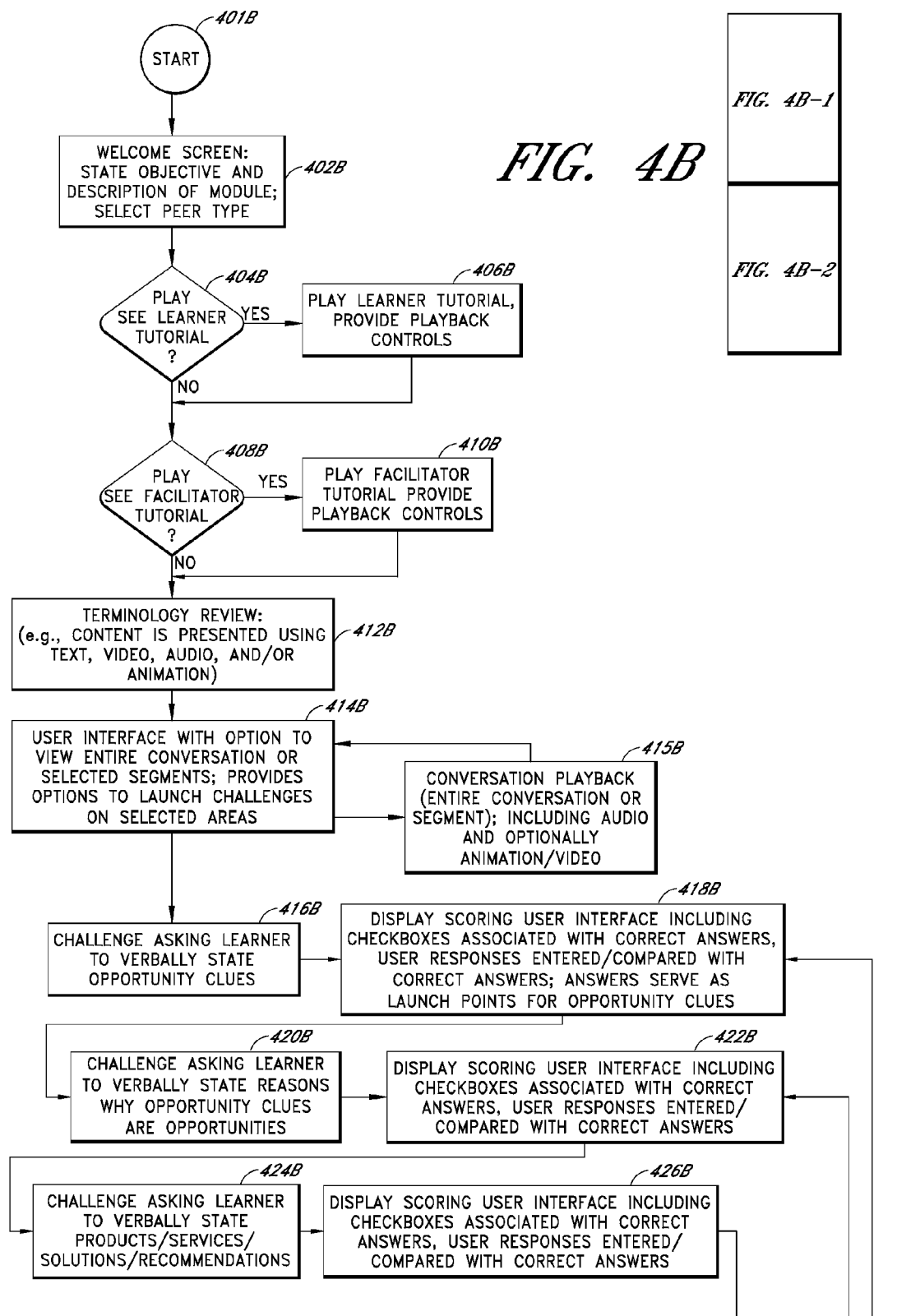

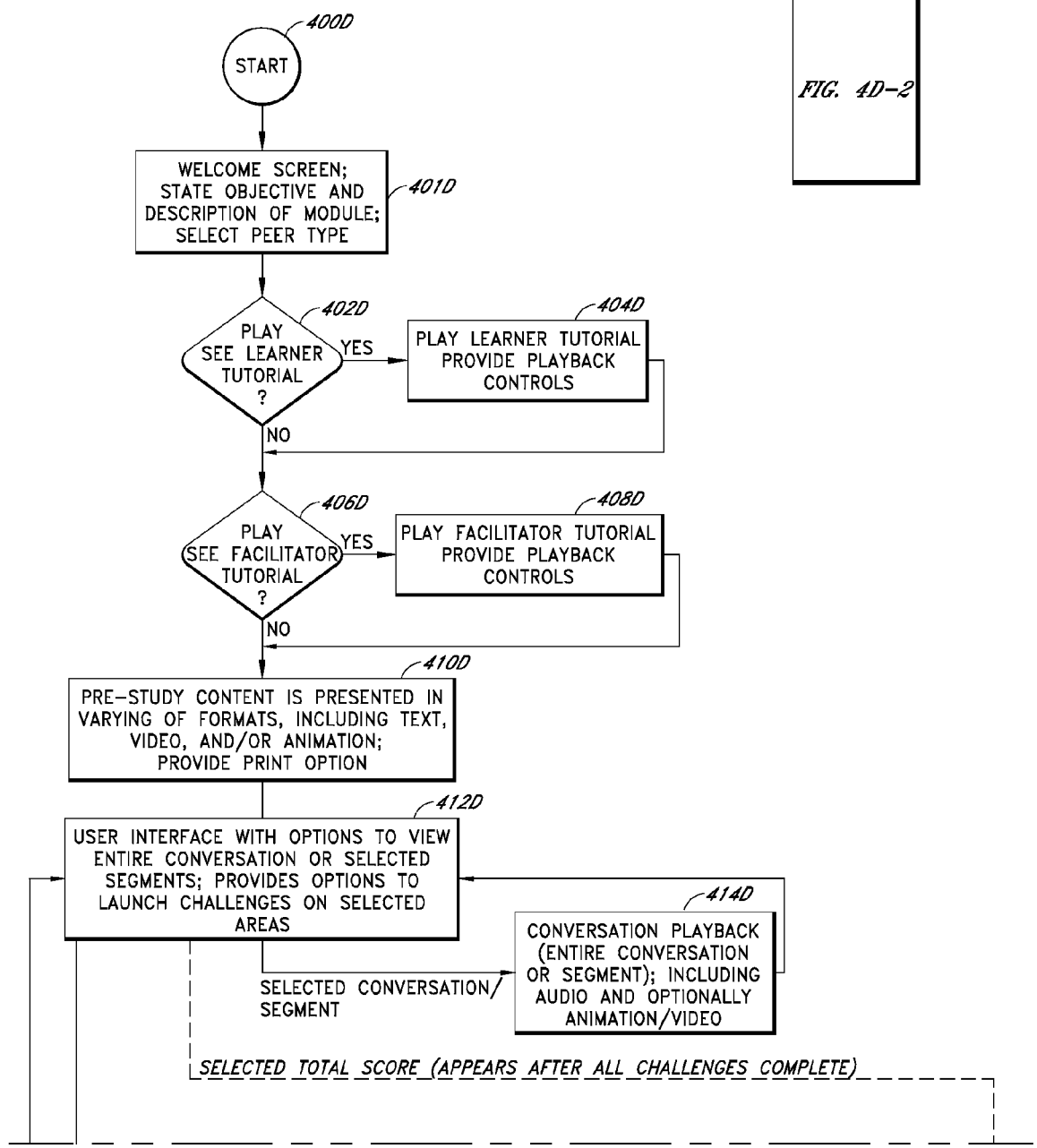

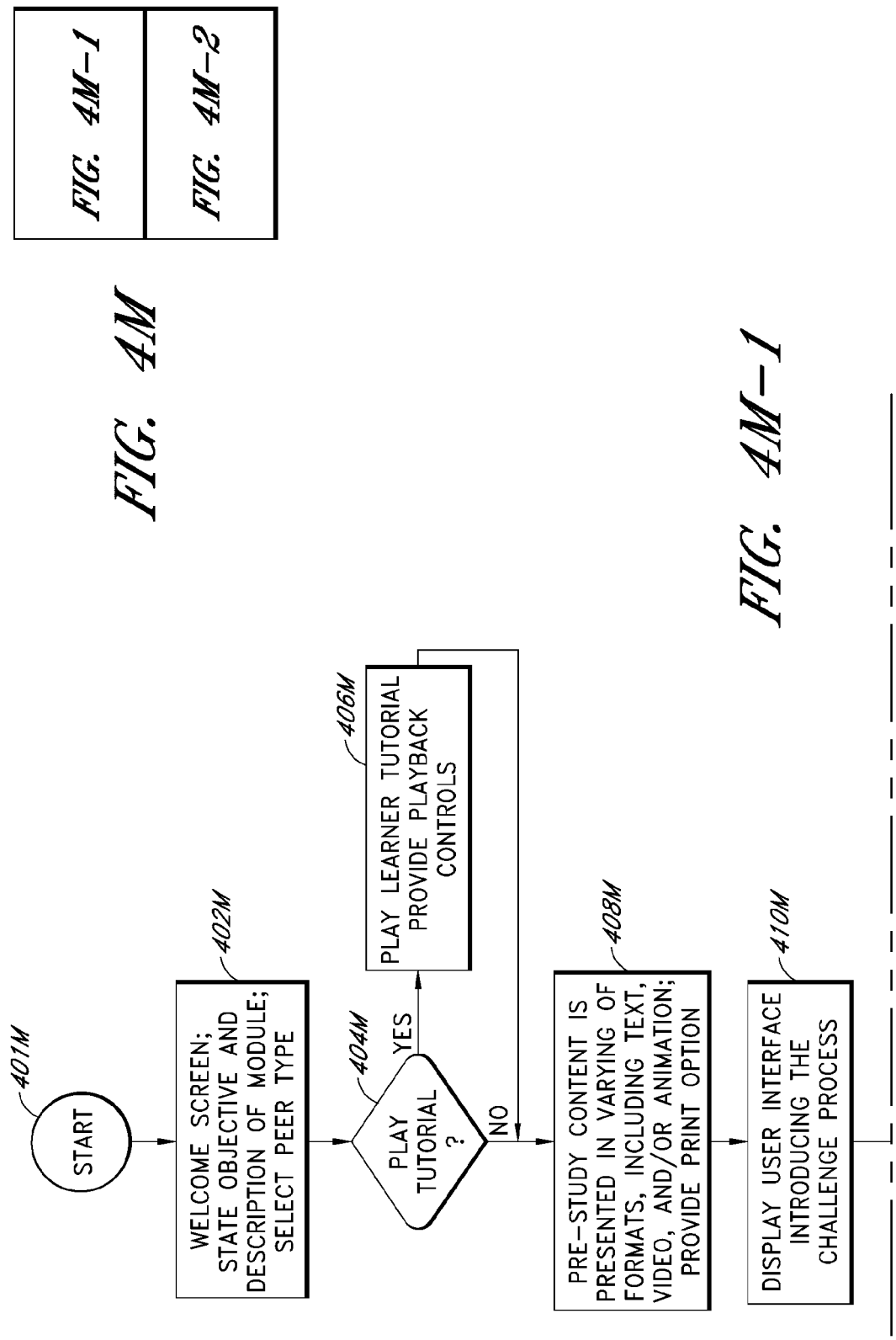

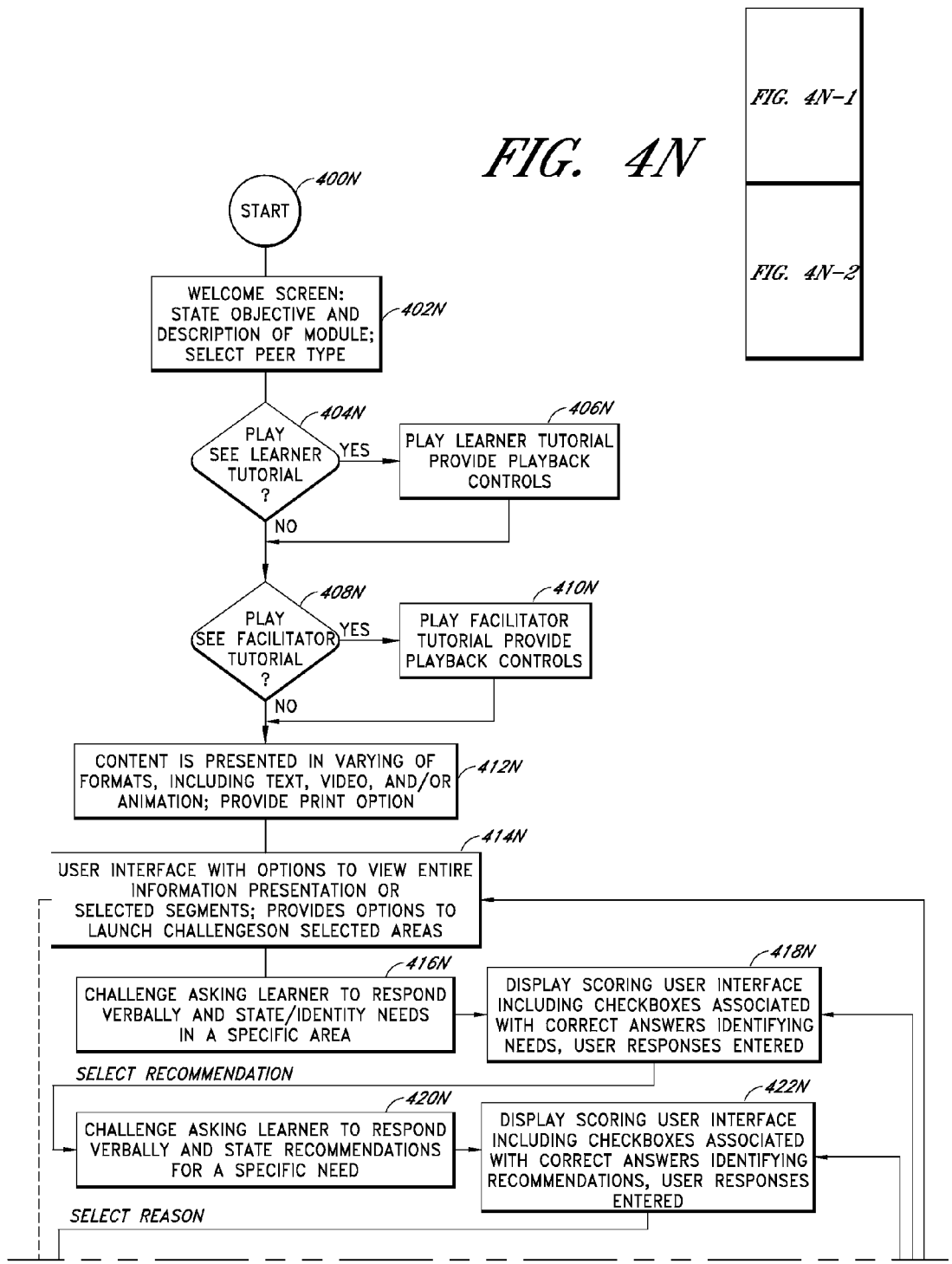

ADVANCED LISTENING
TECHNOLOGIES (ALT) TRAINING
SYSTEMS CONTAINS SEVERAL
LEARNING APPROACHES.

IN THIS TUTORIAL YOU WILL LEARN
HOW TO NAVIGATE THROUGH ONE
OF THE ALT TRAINING SYSTEM
FORMATS

◁GO BACK?
❚PAUSE

ADVANCED LISTENING TECHNOLOGIES TRAVEL
AGENCY – INSTRUCTIONS:

YOU ARE ABOUT TO HEAR A CONVERSATION
BETWEEN A TRAVEL AGENT AND A CUSTOMER.
CERTAIN STATEMENTS MADE BY THE TRAVEL
AGENT CONTAIN FACTUAL ERRORS.

YOU WILL HAVE 5 SECONDS AFTER THE ERROR
OCCURS TO CLICK THE RED STOP BUTTON AND
CORRECTLY IDENTIFY THE PRESENCE OF AN ERROR.
FOR EACH ERROR CONTAINING SEGMENT CORRECTLY
IDENTIFIED YOU WILL BE PRESENTED WITH AN
INTERACTIVE QUIZ. UPON COMPLETING EACH QUIZ,
THE CONVERSATION WILL RESUME.

NOTE: INCORRECT CLICKS ON THE ERROR BUTTON
WILL BE REFLECTED IN YOUR FINAL SCORE.

CLICK THE START BUTTON BELOW TO BEGIN.

GOOD LUCK!

IN THE BEGINNING OF EACH
ALT MODULE, YOU WILL
RECEIVE INSTRUCTIONS.
SIMPLY GLANCE AT THIS
AS IT IS MERELY AN
EXAMPLE OF WHAT YOU
MIGHT EXPECT TO SEE.

◁ GO BACK?
‖ PAUSE

*FIG. 5B*

IN EACH MODULE THERE WILL BE A VARIED COLLECTION OF CHARACTERS PARTICIPATING IN A CONVERSATION ASSOCIATED WITH YOUR FIELD. IN THIS MODULE, THERE ARE TWO CHARACTERS. THE SCENARIO TAKES PLACE IN A TRAVEL AGENCY.

◁GO BACK?
❚PAUSE

THIS PARTICULAR ALT LEARNING
APPROACH FOCUSES ON
ERROR IDENTIFICATION.

WITHIN THIS CONVERSATION
ERRORS ARE STRATEGICALLY
PLACED. IT IS YOUR JOB TO
FIND THEM.

◁GO BACK?
❚❚PAUSE

IN SOME MODULES, YOU WILL BE
GIVEN A CHANCE TO LISTEN TO THE
ENTIRE CONVERSATION
UNINTERRUPTED, DURING WHICH
YOU CAN TAKE NOTES PRIOR TO THE
INTERACTIVE PORTION.

IN OTHER MODULES YOU WILL NOT
BE GIVEN THIS CHANCE.

◁GO BACK?
▯PAUSE

IN THE INTERACTIVE PORTION OF THIS MODULE, YOU WILL BE EXPECTED TO ENGAGE WITH THE CONVERSATION.
YOU CAN CLICK ANYWHERE WITHIN THIS AREA TO IDENTIFY THE ERROR WHEN YOU HEAR IT.

◁GO BACK?
❚PAUSE

WHEN YOU CLICK THE MOUSE AT THE APPROPRIATE TIME, THE ERROR BUTTON WILL TURN GREEN.

◁GO BACK?
❚❚PAUSE

HOWEVER, IF YOU CLICK THE MOUSE WHEN THERE IS NO ERROR IN THE CONVERSATION, THE ERROR BUTTON WILL TURN RED AND READ INCORRECT. EVEN WHEN YOU CLICK THE MOUSE INCORRECTLY, THE NUMBER OF WRONG CLICKS IS RECORDED IN YOUR FINAL SCORE. SO MAKE SURE YOU ONLY CLICK IT WHEN YOU THINK THERE IS AN ERROR.

◁GO BACK?
‖PAUSE

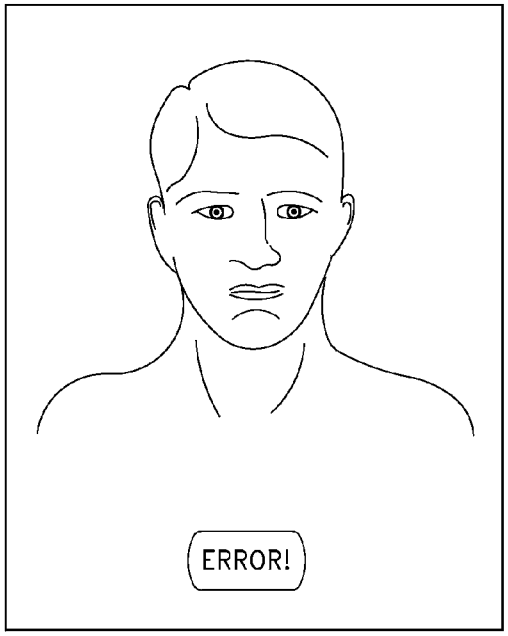

THE TIME ALOTTED FOR EACH ERROR IS 5 SECONDS FROM THE TIME THE TRAVEL AGENT MAKES A WRONG STATEMENT.

FOR THE PURPOSE OF THIS TUTORIAL, THE ERROR WILL BE REVEALED TO YOU AND THE COUNTDOWN WILL BE SHOWN ON A CLOCK. HOWEVER, THIS WILL NOT BE THE CASE IN THE ACTUAL MODULES.

AS AN EXAMPLE, AN ERROR WILL OCCUR WHERE THE TRAVEL AGENT STATES THAT INGRID BERGMAN'S BIRTHPLACE IS IN FINLAND.

HERE THE ERROR WILL BE IDENTIFIED CORRECTLY WITHIN THE TIME ALLOTED.

◁GO BACK?
❚❚PAUSE

*FIG. 51*

SEE HOW FAST IT GOES BY?

IN THIS TUTORIAL, THERE WILL
BE 2 MULTIPLE-CHOICE
QUIZZES PER ERROR. THE FIRST
QUIZ WILL ASK YOU ABOUT THE
NATURE OF THE SPECIFIC ERROR.
THE SECOND QUIZ WILL ASK
YOU TO IDENTIFY THE
CORRECT ALTERNATIVE.

◁GO BACK?
⏸PAUSE

QUIZ 1A

WHAT IS THE ERROR?

A. INGRID BERGMAN WAS BORN IN FINLAND.

B. THE WEATHER IN FINLAND IS STUNNING DURING THE SUMMER MONTHS.

C. INGRID BERGMAN IS A FICTIONAL CHARACTER WHO NEVER EXISTED IN REAL LIFE.

D. A & B

HERE IS THE FIRST QUIZ WHERE YOU WOULD PICK THE ANSWER THAT BEST FITS THE QUESTION USING YOUR MOUSE TO SELECT THE CORRECT ANSWER.

NOW, WE'LL DO IT FOR YOU.

◁ GO BACK?
❚❚ PAUSE

*FIG. 5L*

QUIZ 1A

WHAT IS THE ERROR?

A.　INGRID BERGMAN WAS BORN IN FINLAND.

B.　THE WEATHER IN FINLAND IS STUNNING DURING THE SUMMER MONTHS.

C.　INGRID BERGMAN IS A FICTIONAL CHARACTER WHO NEVER EXISTED IN REAL LIFE.

D.　A & B

◁GO BACK?
▯▯PAUSE

QUIZ 1B

WHAT SHOULD THE TRAVEL AGENT
HAVE SAID INSTEAD?

A. INGRID BERGMAN WAS BORN IN NORWAY.

B. INGRID BERGMAN WAS BORN IN DENMARK.

C. INGRID BERGMAN WAS BORN IN SWEDEN.

D. TO THIS DAY, THE BIRTHPLACE OF INGRID BERGMAN REMAINS A MYSTERY.

◁GO BACK?
▯PAUSE

*FIG. 5N*

QUIZ 1B

WHAT SHOULD THE TRAVEL AGENT HAVE SAID INSTEAD?

A. INGRID BERGMAN WAS BORN IN NORWAY.

B. INGRID BERGMAN WAS BORN IN DENMARK.

C. INGRID BERGMAN WAS BORN IN SWEDEN.

D. TO THIS DAY, THE BIRTHPLACE OF INGRID BERGMAN REMAINS A MYSTERY.

◁GO BACK?
⏸ PAUSE

QUIZ 1B

SORRY! THE ANSWER IS C.

A. INGRID BERGMAN WAS BORN IN NORWAY.

B. INGRID BERGMAN WAS BORN IN DENMARK.

C.  INGRID BERGMAN WAS BORN IN SWEDEN.

D. TO THIS DAY, THE BIRTHPLACE OF INGRID BERGMAN REMAINS A MYSTERY.

CONTINUE CONVERSATION ⊙

IF YOU PICK THE WRONG OPTION A SECOND TIME THE CORRECT ANSWER WILL BE AUTOMATICALLY HIGHLIGHTED AS SHOWN.

YOU MAY THEN CONTINUE ON WITH THE CONVERSATION BY CLICKING THE ARROW.

◁GO BACK?
▥PAUSE

*FIG. 5P*

QUIZ 1B

SORRY! THE ANSWER IS C.

A. INGRID BERGMAN WAS BORN IN NORWAY.

B. INGRID BERGMAN WAS BORN IN DENMARK.

C. INGRID BERGMAN WAS BORN IN SWEDEN.

D. TO THIS DAY, THE BIRTHPLACE OF INGRID BERGMAN REMAINS A MYSTERY.

CONTINUE CONVERSATION 

IF YOU PICK THE WRONG OPTION A SECOND TIME THE CORRECT ANSWER WILL BE AUTOMATICALLY HIGHLIGHTED AS SHOWN.

YOU MAY THEN CONTINUE ON WITH THE CONVERSATION BY CLICKING THE ARROW.

◁GO BACK?
▯PAUSE

*FIG. 5Q*

INCORRECT...
   TRY AGAIN.

IF YOU PICK THE WRONG
OPTION YOU WILL HAVE A
SECOND CHANCE TO
IDENTIFY THE
CORRECT ANSWER.

◁ GO BACK?
◫ PAUSE

*FIG. 5R*

THE CONVERSATION WOULD THEN CONTINUE WHERE IT LEFT OFF. IDENTIFY THE CORRECT ANSWER.

◁ GO BACK?
❚❚ PAUSE

```
SCORE

CORRECTLY IDENTIFIED
ERRORS:                4 OUT OF 4

INCORRECT CLICKS ON
THE ERROR BUTTON:              4

MULTIPLE-CHOICE QUIZ SCORE

CORRECTLY ANSWERED
QUIZZES:               3 OUT OF 8
```

AT THE END OF EACH ALT MODULE, THERE IS A SCORE PAGE WHICH OUTLINES HOW YOU DID WHILE GOING THROUGH THE CONVERSATION.

◁GO BACK?
‖PAUSE

*FIG. 5T*

NOW, YOU HAVE A BETTER IDEA OF
HOW THE ALT PROCESS WORKS,
WITH RESPECT TO IDENTIFYING
ERRORS AND COMPLETING MULTIPLE
CHOICE QUIZZES.

THE MODULE YOU WILL NOW
PARTICIPATE IN IS FOR PRACTICE
PURPOSES ONLY. EVEN IF YOU KNOW
ALL OF THE ANSWERS, WE ENCOURAGE
YOU TO MAKE INTENTIONAL ERRORS
SO THAT YOU CAN FAMILIARIZE
YOURSELF WITH THE PROCESS.

REMEMBER, KEEP YOUR FINGERS POISED
ON THE MOUSE TO IDENTIFY THE
ERRORS AS SOON AS YOU HEAR THEM.

TRY FINDING ALL 4 ERRORS IN THE ALT
TRAVEL AGENT MODULE ⊙

◁ GO BACK?
❚ PAUSE

*FIG. 5U*

YOU HAVE MISSED AN ERROR.

THE ERROR WILL NOW REPLAY
FOR YOU TO HEAR.

THEN THE QUIZZES FOLLOW.

◁GO BACK?
❚❚PAUSE

*FIG. 5V*

SYSTEMS AND METHODS FOR COMPUTERIZED INTERACTIVE TRAINING

COPYRIGHT RIGHTS

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

PRIORITY APPLICATION

This application claims the benefit of U.S. Provisional Patent Application 60/908,598, filed Mar. 28, 2007, U.S. Provisional Patent Application 60/948,881, filed Jul. 10, 2007, U.S. Provisional Patent Application 60/954,273, filed Aug. 6, 2007, the entire disclosures of which are hereby incorporated by reference herein.

RELATED APPLICATIONS

This application is related to copending application, entitled SYSTEMS AND METHODS FOR COMPUTERIZED INTERACTIVE TRAINING, application Ser. No. 12/058,515, copending application, entitled SYSTEMS AND METHODS FOR COMPUTERIZED INTERACTIVE TRAINING, application Ser. No. 12/058,481, copending application, entitled SYSTEMS AND METHODS FOR COMPUTERIZED INTERACTIVE TRAINING, application Ser. No. 12/058,491, and copending application, entitled SYSTEMS AND METHODS FOR COMPUTERIZED INTERACTIVE TRAINING, application Ser. No. 12/058,525, all filed on the same date as the present application, the entirety of which are hereby incorporated by reference, including the detailed description of preferred embodiments and the figures.

BACKGROUND OF THE INVENTION

1. Field of the Invention

The present invention is directed to interactive training, and in particular, to methods and systems for electronic interactive training.

2. Description of the Related Art

In order to teach employees and others new skills, training systems have been developed. However, many conventional training systems are based on the premise that the most efficient way to train people (e.g., in performing a task) is to have them read a text regarding a task and/or have them observe or listen to a presentation of someone performing the task without any follow-up questions, or, using a form, have the trainee answer multiple choice questions (in which possible correct and incorrect answers are presented) regarding what they have read or viewed.

Disadvantageously, many of these conventional techniques fail to provide adequate training reinforcement and often fail to adequately engage the trainee. Further, many of these conventional techniques fail to adequately develop a trainee's fluency, automaticity or the trainee's ability to generalize the training. Thus, many trainees trained using such conventional techniques are unable to adequately utilize the skills being trained in real world environments.

SUMMARY OF THE INVENTION

The present invention is directed to interactive training, and in particular, to methods and systems for computerized interactive training and learning. For example, certain embodiments can be used to teach people to enhance their performance with respect to a variety of skills.

Certain illustrative embodiments provide an interactive, optionally Web-based, performance training and coaching system that focuses on both knowledge acquisition and behavioral embedding of skills and techniques.

Certain embodiments provide preprogrammed video, audio, and/or textual presentations of training materials which provide information related to skills/information to be trained. A scenario including real or animated actors is optionally presented, simulating an interaction. The training system presents related queries for the trainee who responds (e.g., audibly responds using role playing language or otherwise). The training system stores a score based in part on a comparison of the trainee's response with an answer stored in training system memory. Optionally, the scores are substantially immediately presented by the system to the trainee.

Certain embodiments and teachings disclosed herein can be utilized with respect to various fields where interpersonal/knowledge proficiency applies. These fields include, but are not limited to, some or all of the following: business situations and employment "families" (e.g., interactions between employees and customers/prospects, internal clients, managers and employees, and managers with other managers regarding sales, service, leadership/management/coaching, administration, etc.), educational situations, such as those where fluency of knowledge is important, consumer situations (e.g., counseling relationships, marketing, sales, etc.), family relationships, healthcare situations, etc. Certain embodiments and teachings disclosed herein can also be utilized for selection testing, assessment, certification, and compliance among various other uses. Further, certain embodiments and teachings disclosed herein can optionally be applied to individual and team/group performance. Certain embodiments and teachings disclosed herein can optionally be utilized in multi-cultural fashion.

In contrast to conventional training systems, certain example embodiments optionally utilize "unprompted" real world verbal answering by a trainee, versus "prompted" multiple-choice or true/false responses of other automated systems. By virtue of the verbal responding, a trainee's cognitive and psychomotor functions are both engaged, versus only the cognitive functions as with traditional eLearning. Thus, certain embodiments described herein convert knowledge into desired behaviors and embed knowledge and skill acquisition.

The foregoing attributes enable focused learning, such as with respect to verbal interactions where individuals/teams are expected to respond without "reference sources", as is the case in most "real world" human interactions. Thus, certain embodiments enhance the acquisition of skills as well as the embedding of skills via verbal challenges. Furthermore, certain embodiments optionally are configured to drive continuous learning using changing/new verbal challenges, scenarios, etc., which can be added or updated to as desired.

Further, certain embodiments optionally teach and test a trainee with respect to accurate verbalization of key or important elements of knowledge (and optionally other types of knowledge). Additionally, certain embodiments optionally test trainees with respect to the speed of their answers, and on the confidence level of their responses.

Furthermore, optionally certain embodiments optionally utilize "real-world" randomized challenges that reflect the real-world environment with the option of focused training, drilling and testing in particular areas of need.

Certain example embodiments address current information in the fields of neuroscience and learning theory to enhance a trainee's fluency and automaticity and generalization, which can enhance a trainee's performance in real world environments. Certain embodiments optionally enhance trainee fluency with respect to different skills via trainee practice, drilling, repetition, by having the trainee respond at rapid rates, and by providing built-in positive reinforcement. Certain example embodiments provide multi-modal, multi-channel integrated learning by affecting different brain areas, such as the occipital and temporal lobes.

Certain embodiments optionally simultaneously and/or interactively teach and test via a combination of interconnected verbal drilling and scoring, plus optional pre-study materials. Knowledge acquisition and verbal skills performance are significantly enhanced by the optional looping cycle of being questioned, verbally answering, being exposed to the right answers, and seeing/hearing optional guideline role plays in rapid succession. Because of the immediacy of scoring optionally provided in certain embodiments, performance is rapidly measured and specific feedback is quickly or instantly provided, further enhancing training effectiveness. It has been noted that the closer the measurement and feedback is to the event being measured/scored, the greater the impact on learning and future performance.

This teaching and testing methodology provided via certain embodiments are substantially enhanced by having users/trainees operate virtually in real-time, which leverages the quality of learning, the speed of learning, learning engagement, retention, and the embedding of learning and skills.

Teaching and testing methodologies provided via certain optional embodiments enhance critical thinking by having participants take a "challenge" to logical conclusions versus the more common "jumping to conclusions". For example, in certain optional embodiments, a trainee is asked a question and then the system asks additional related questions, drilling down for more granularity, which helps learners to more fully analyze and understand situations that they will likely face. This is in contrast with traditional eLearning systems which typically ask a question, elicit a response, and then moves on to the next question regarding another topic. Further, in certain embodiments, even if a trainee answers a given question incorrectly, optionally the trainee is provided the correct answer and is then still tested using other related questions (that rely on the correct answer), thereby further enhancing critical thinking.

Training systems and methods described herein are based on how people really learn. That is, in certain optional embodiments, via multiple exposures to differing situations which they will face in real life, and through logical rehearsals and practice. Thus, purpose built scenarios are created and utilized that simulate real world experience. Therefore, learning is encoded through multiple and "unlimited" simulated scenarios which replicate real-world situational opportunities. These multiple and ongoing exposures result in accelerated and compressed experiential learning.

Thus, certain example training systems and methods enable daily training and reinforcement vs. mere single event/limited "role plays/scenarios/modeling" and/or reinforcement training (as is conventionally performed), and thereby capitalizes on advances in neuroscience research. Continuous learning and engagement is thus enhanced. Furthermore, dilution of knowledge and behavioral performance is reduced and/or eliminated because of this periodic, frequent (e.g., daily, weekly, monthly, etc.) utilization. Thus, training impact falloff is also reduced and/or eliminated.

Certain embodiments optionally utilize brief high-impact modules/drills/rehearsals, which are very repeatable by virtue of their brevity, which encourages re-use and reinforcement. These high levels of repetition positively impact short-term, intermediate-term and long-term memory and learning. Thus, certain embodiments cause initial embedding, ongoing embedding, and the capacity of trainees to adapt what they have learned to the real world ("embedding adaptations").

Optionally, trainees can repeat previously used modules as well as module adaptations, in addition to new modules.

Certain embodiments optionally utilize a "story context" in providing training, which is more effective with respect to learning, retaining, and embedding information than rote memorization.

Certain embodiments optionally utilize "purpose built" modules which focus on the most or relatively more important and prioritized relevant concepts to organizations, groups, teams and/or individual users. This enhances focused attention through the use of relevant, to-the-point scenarios. Furthermore, this relevancy is optionally granular enough so that users realize that what they are learning they may put into practice in real world situations immediately thereafter (e.g., the same day). In this regard, the ability to engineer precise technique training and testing based upon real-world performance opportunities and gaps is enhanced. This is achieved through the use of purpose-built scenarios targeted to improve specific performance and results. For example, a scenario can be purpose-built to insert what the commissioning or designing entity believes is relatively more important for their trainees to learn. For example, the commissioning or content designer entity can be a company, school, group, individual, etc., that identifies the most or relatively more important opportunities and challenges that their trainees will encounter. This also enhances mental encoding, as the learners know that they will need to utilize what they are being taught in their real world environment, possibly immediately.

Certain embodiments are configured to be utilized by two participants at a time in a given training session, the trainee/student and a "teacher/coach/facilitator/trainer" (also referred to as a learning partner). In certain embodiments, the person in the role of "teacher/coach/facilitator/trainer can be an untrained peer or a trained teacher, etc. Thus, certain embodiments of the training process can be leader, peer, or trainer facilitated. Furthermore, it can be utilized with team interactions for more than two participants. This creates enhanced focus, engagement, and attention by enabling persons to interact and learn; provides leveraged motivation concentration and fun (wherein in certain embodiments the training is in a "video game" format); provides local team engagement, whether in offices, groups, classrooms, etc; instant accountability and feedback through the use of segment scores and role modeled proper responses; provides "dual learning" (where both the facilitator and learner are engaged in the learning process); and further provides "emotional simulation," as responses are to a real person, which simulates the real world environment where people interact.

Certain embodiments optionally include a "back and forth" mode where the user and facilitator switch roles after a given question and/or as frequently as desired. This mode of operation enhances engagement and can also be used for competitive team scoring.

Additionally, certain embodiments can be used individually and/or in combination with others, creating a solo mode, a multi-person mode, or a mode that combines solo and two or more persons. Thus, certain embodiments can be used "solo" for rehearsal and self-drilling, and with others for interactive drilling and testing.

Optionally, even in the solo mode, responses by the learner are verbal, thus creating constant role plays/rehearsals for real world involvement. Because role plays/rehearsals, even in a solo mode, are optionally implemented using the automated methodology described herein, it overcomes the problem of diluted and ineffective role plays/rehearsals which are typically the norm when people utilize role plays/rehearsals by themselves.

Certain embodiments provide sufficient flexibility so that generic and custom content can be included as needed or desired. With respect to customization, certain embodiments enable an entity utilizing certain training systems and processes described herein to insert its own custom content. This enables entities employing the training system to precisely tailor a training program for their significant, relatively more important objectives, utilizing their own internal content, language and examples.

Thus, certain embodiments serve as a learning tool and delivery platform independent of the actual content. As such, content specific and unique to a given organization can be presented.

Optionally, training modules can be rapidly created, and can be adapted and modified, allowing for continuous module development and continuous improvement of the content. This enables lessons from real world deployment to be used to appropriately modify existing modules. This also allows for a constantly fresh and new experience as part of a continuous improvement program.

Certain embodiments provide for academically and emotionally "fail-safe" utilization with facilitators/trainers, in that answers are already programmed into a given module. The reason that it is academically fail-safe is that the technology provides the facilitators/trainers with the correct answers during the training session, so that the facilitators/trainers do not have to know the answers on their own, and do not need to worry as to whether they are prepared to evaluate the trainee. The reason that it is emotionally fail-safe is that the technology provides the challenges and answers for scoring rather than the facilitator/trainees. Thus, in such embodiments facilitators do not need advanced knowledge of the training materials, nor are they in a "confrontational mode" with users/trainees. Furthermore, scoring is based upon a highly objective methodology, even though the answering is verbal, which further reduces tension between the facilitator and trainee.

An example embodiment optionally breaks out scoring assessments, providing for substantially immediate feedback, accountability and reinforcement. The example embodiment scores by category and sub-category. Therefore, it provides substantially instant feedback on a sub-category basis, and total feedback for the "full" category (e.g., including the summation of scores for the sub-categories). This substantially instant evaluation enables the pinpointing of areas where improvement is needed, optionally including improvement in the ability to articulate the correct answers/content, as well as the assessment of speed/fluency and style/confidence. Furthermore, a trainee's performance can be self-scored and/or "distance scored" by remote facilitators.

Optionally, modules are purposely implemented to be short in duration for learning and comprehension reasons, to aid in information and performance retention, to limit the time away from real world obligations and responsibilities, and so that modules can be used for training daily without a significant time cost per day. Optionally, relatively longer versions of modules are also provided. Thus, "snapshot" and "full-length" formats are provided.

Avatars (e.g., in the form of animations) and/or live video and/or audio are optionally utilized for monologues, dialogues and/or group conversations (optionally including statements and/or questions aimed directly at the trainee). A "bank" of avatars is optionally provided for users (e.g., training implementers) to select from and insert into modules on a module-by-module basis. Thus, issues of multi-culturalism, diversity and global/regional uniqueness are resolved.

Optionally, speech is programmed by utilizing text to speech and/or recorded voices, which also allows diversity and customization using a desired language and/or dialect.

Certain embodiments provide optional pre-study learning sections and results summary sections, which can be accessed for initial learning and for reinforcement purposes and can optionally be printed out in hard copy. Optionally, the results summary sections are available during utilization of a training module, within training module segments, as well as at the end of a training module for substantially instant reinforcement purposes.

Additionally, optionally the pre-study teachings are aligned with challenges, scoring and optionally with guideline "default role models" that represent an ideal or appropriate manifestation of the basics.

Certain embodiments include an optional instant replay of the pre-study materials when desired, which is aligned with the portion of the pre-study that applies to aspects of a particular module or segment. Thus, a solution is provided for when a user challenges the facilitator regarding an answer that they believe was not part of the pre-study.

Thus, as described herein, certain optional embodiments virtually function as "automated coaching" for the techniques and skills being trained. This is achieved by engaging users regarding what was done right in a scenario, what were the errors, why is it important to correct the errors, correcting the errors using first-person language, seeing a "verbal first-person role model correcting the errors", and analyzing correct and incorrect styles. Such focusing on errors and error correction capitalizes on error-based learning, and aids high grade learning that drives behavioral change. Furthermore, by placing users in the position of a "safe" third-person coach, learning is enhanced. One effective method of learning is by actually teaching the skills/information to others and/or by being in an observational/coaching mode, wherein the "teacher" is also learning the skills/information by virtue of acting as a teacher. In this regard, this principle also operates in a similar fashion when the user is expected to actually function as a coach in the real world. Thus, using embodiments disclosed herein, by virtue of being in the role of a coach, watching, listening, and/or reading, analyzing, and commenting on the performance of another (e.g., a participant, in the form of an avatar or a real person in a video, in a scenario presented to the trainee), the trainee learns and embeds the skills and knowledge being taught. In the solo mode, the example embodiment functions as an automated self-coaching tool.

Optionally, certain embodiments teach a user to identify relevant opportunities and potential needs of others, to understand why they are opportunities/needs, and how to capitalize/provide solutions to these identified opportunities/needs. Further, certain embodiments train the mind to specifically seek out the opportunities/needs that are desirable to recognize, and how to capitalize on such opportunities/needs. Certain processes ask a trainee to verbally identify opportunity clues; the stated and/or unstated needs embedded in these opportunity clues (e.g., including future anticipated needs/opportunities); and the appropriate products, services and/or solutions that would capitalize on identified opportunities/needs. Thus, it moves the users from "opportunity blindness and/or casual awareness" to insightful and functional observations, with correlating solution identification and recommendations.

Certain embodiments optionally utilize an automated case history approach with respect available data (data regarding a customer, a prospect, a client, a family member, a student, an employee, etc.). The data can be data present via data screens (e.g., using data obtained for a customer account database/CRM system), information gathered (e.g., gathered via a verbal communication with a customer or prospect, a family member, a student, an employee,) during needs/opportunity analysis and/or other conversational engagements with customers, prospects, and/or internal personnel, as well as in educational, consumer and/or healthcare settings, among many others. This methodology teaches and tests the trainee with respect to identifying stated, unstated and potential future needs/opportunities, etc., based upon a case history, and then making proper recommendations and justifying/explaining such recommendations. Optionally, the trainee is to provide verbal responses without access to answers. Answers are thereafter provided and the trainee is scored accordingly. Thus, certain embodiments teach a trainee to rationally analyze "symptoms, diagnosis and treatment" where the symptoms correspond to the data, the diagnosis corresponds to the identification of needs/opportunities, and the treatment corresponds to the recommendations.

This methodology teaches and tests upon how to listen versus simply telling people to "listen better." It trains learners in how to "listen between the lines" and understand what is truly meant in a conversation. It teaches learners to reach conclusions based upon actual word usage and the "verbal delivery" of those words. This educates learners to identify voice inflections that may contradict the words being spoken and thus teaches them to clearly focus in on what is said and meant.

Furthermore, certain embodiments optionally teach trainees to prioritize, paraphrase, restate, and appropriately summarize. This also enhances short-term memory by training the learner's mind to process, retain, and restate elements of conversations or full conversations.

Additionally, certain embodiments encourage focused listening through the optional use of purpose-built, real-world conversations that do not sound staged or contrived.

A flexible learning environment is provided in certain optional embodiments with respect to interacting with/observing/listening to full conversations and/or segments of conversations. In an example embodiment, the learner progresses through a range of simple to complex conversations and is requested to respond to challenges about the full conversation or segments. Thus, it breaks out segments and correlating questions. In the same regard, a flexible learning environment is provided with the choice of holistically responding to the totality of available information presented to the learner or responding on a segment-by-segment basis. Optionally, certain embodiments also enable learners to progress from simple scenarios to more complex situations and respond to challenges of increasing intricacy.

Certain embodiments optionally enable a user to identify and record (verbally and/or textually) their own intrusive thoughts, which will help focus and concentration, as it will create an awareness of intrusive thoughts which did not previously exist.

Additionally, certain embodiments also optionally drive learning how to take appropriate and prioritized notes.

Certain optional embodiments provide a parallel avatar process which provides "variable controlled scenarios". That is, two avatars (or real people) are shown in parallel with aspects of one avatar differing from the other avatar so as to teach the user how to distinguish between different aspects of communication. Different elements can be varied while others are held constant, and the trainee can be asked to compare the effect of the varied elements.

For time management purposes and to deal with interruptions, certain optional embodiments include a book-marking function which allows a trainee/trainer to "pause and resume" the training process.

Certain optional embodiments enable a trainee to access training sessions on demand, via a computer and/or portable video/audio player as compared to only having access within a scheduled classroom setting as with many conventional systems. The training software/modules can be hosted locally on a trainee terminal or remotely and accessed over a wired and/or wireless network.

Furthermore, certain optional embodiments include providing a learning management system to access modules and record performance.

Certain embodiments optionally capitalize on learning theory (e.g., including links to Bloom's Taxonomy and/or Merrill's Principles of Instruction). For example, with respect to Bloom's Taxonomy, certain systems and processes embody multiple domains including the cognitive, affective and psychomotor domains. For example, within the psychomotor domain, it focuses on Set, Guided Response, Mechanism, Complex Overt Response and Adaptation.

Certain embodiments include additional optional elements that embody neuroscience research data including but not limited to, some or all of the following: making it emotionally easy and "safe" to learn; attention-grabbing; engaging strategies; priming; surprise and novelty; repetition of information to consolidate learned materials into long-term memory; visual information to stimulate the occipital lobes; observations and repetitive practice observations; hearing information to stimulate the temporal lobes; instant feedback; multiple forms of review; multiple memory pathways; brain plasticity; patterning; focusing on fives +/; relevancy; learning in a meaningful context; critical thinking questions; daily/periodic individual assessment/mini-assessment; accountability; periodic/daily and multiple mini/full role plays; relating to previously learned information.

An optional example embodiment provides a method of training a user via an interactive electronic training system wherein the user views and hears a presentation and verbally articulates answers, the method comprising: providing via an interactive electronic training system terminal a presentation of information on which the user is to be tested and trained; providing via the interactive electronic training system terminal a training presentation of an interaction between two real or simulated people, of a person appearing to speak to the user, and/or a monologue by a person, wherein the presentation includes audible articulated words and a visual presentation of at least one person speaking or appearing to speak; providing user instructions via which the user is instructed to identify using verbal articulation one or more correct acts of a first type committed by at least one of the persons in the presentation using an audible articulation, without providing a choice of answers from which the user can select; causing, at least in part, an indication to be stored in computer readable memory as to whether the user correctly identified a first correct act performed by at least one of the persons in the presentation; enabling, at least in part, a user instruction to be provided via which the user is instructed to verbally identify one or more errors committed by at least one of the persons in the presentation, without providing a choice of answers from which the user can select; causing, at least in part, an indication to be stored in computer readable memory as to whether the user correctly identified a first error committed by at least one of the persons in the presentation; providing user instructions via which the user is instructed to explain why it is important to correct the first error, without providing a choice of answers from which the user can select; causing, at least in part, an indication to be stored in computer readable memory as to whether the user correctly explained why it is important to correct the first error; causing, at least in part, the user to be asked to recite, in the first person, correct language that should have been used by at least one of the persons in the presentation so that the first error would not have occurred, without providing a choice of answers from which the user can select; presenting via the interactive electronic training system terminal preprogrammed correct language that should have been used in the form of text, audio, animation, and/or video so that a scorer can compare the preprogrammed correct language with language verbally provided by the user in response to the instruction to state correct language and enter a corresponding score substantially immediately after the user responded to the instruction to state correct language; and causing, at least in part, an indication to be stored in computer readable memory as to whether the user recited the correct language.

Another optional example embodiment provides a method of training a user via an interactive electronic training system, the method comprising: providing via an interactive electronic training system terminal an informational presentation, the informational presentation including example language for use by a first person in obtaining and/or providing information to a second person; providing via the interactive electronic training system terminal a training presentation of an interaction between two real or simulated people, of a person appearing to speak to the user, and/or a monologue by a person, wherein the training presentation includes one or more scripted correct acts and one or more scripted errors designed to train a user with respect to one or more skills; providing user instructions via which the user is instructed to verbally identify one or more correct acts of a first type committed by at least one of the persons in the training presentation without providing a choice of answers from which the user can select; causing, at least in part, an indication to be stored in computer readable memory as to whether the user correctly identified a first correct act performed by at least one of the persons in the training presentation; providing user instructions via which the user is instructed to verbally identify one or more errors committed by at least one of the persons in the training presentation; causing, at least in part, an indication to be stored in computer readable memory as to whether the user correctly identified a first error committed by at least one of the persons in the training presentation; causing, at least in part, the user to be asked to verbally state, in the first person using language from the informational presentation, what should have been said by at least one of the persons in the training presentation so that the first error would not have occurred, without providing answers from which the user can select; presenting via the interactive electronic training system terminal preprogrammed correct language that should have been used in the form of text, audio, animation, and/or video so that a scorer can compare the preprogrammed correct language with language provided by the user in response to the instruction to state correct language and enter a corresponding score substantially immediately after the user responded to the instruction to state correct language; and causing, at least in part, an indication to be stored in computer readable memory as to whether the user correctly explained what should have been said so that the first error would not have occurred.

Another optional example embodiment provides an interactive electronic training system comprising program code stored in computer readable memory, that when executed is configured to: provide an informational presentation; provide a presentation of at least one person speaking, wherein the presentation includes at least one error committed by a first person, wherein the at least one error is scripted to train the user; provide an instruction via which the user is to be instructed to identify one or more errors committed by at least one person in the presentation, wherein at least one error relates to a verbal communication; store an indication related to the user's performance in providing the identification of one or more errors; provide an instruction via which the user is to be instructed to explain why at least one error should be corrected; store an indication related to the user's performance in providing the explanation as to why the least one error should be corrected; provide an instruction via which the user is to be instructed to state correct language in the first person corresponding to the verbal communication; present preprogrammed text and/or audio including correct language corresponding to the verbal communication so that a scorer can compare the preprogrammed correct language with language provided by the user in response to the instruction to state correct language and enter a corresponding score substantially immediately after the user responded to the instruction to state correct language; and receive and store the score related to the user's response to the query regarding correct language and present the score to the user.

Another optional example embodiment provides a method of training a user via an interactive electronic training system at least in part by engaging a user's hearing and seeing senses and by having the user perform audible articulation, the method comprising: providing via an interactive electronic training system terminal an informational presentation to be heard and/or viewed by the user, the informational presentation including one or more elements that are to be utilized by a first person during an interaction of a first type with a second person; providing via the interactive electronic training system terminal a training presentation of at least one person, wherein the training presentation is configured to include one or more errors committed by the first person with respect to performance of at least one element; causing, at least in part, the user to be instructed to identify using an audible articulation at least one error with respect to performance of at least one element by the first person; causing, at least in part, an indication to be stored in computer readable memory as to whether the user identified at a first error with respect to performance of at least one element; causing, at least in part, an indication to be stored in computer readable memory as to whether the user identified information related to the significance of the first error; and causing, at least in part, an indication to be stored in computer readable memory as to whether the user identified information related to the avoidance of the first error.

An optional example embodiment provides a method of training a user to identify information via an interactive electronic training system at least in part by engaging a user's hearing and seeing senses and by having the user perform audible articulation, the method comprising: providing via an interactive electronic training system terminal a first training presentation of a first communication involving verbal communication from at least a real or simulated person, including a monologue, a person appearing to speak to the user, and/or a dialogue, the presentation including an image of the person; providing user instructions via which the user is instructed to verbally and audibly identify an opportunity clue from information presented by at least a first person involved in the first communication, wherein the user is not provided a choice of answers from which the user can select, and wherein the opportunity clue indicates an opportunity exists to provide the first person with a product, service, solution, or recommendation, where the first person has not specifically requested the product, service, solution, or recommendation; causing, at least in part, an indication to be stored in computer readable memory as to whether the user correctly identified the opportunity clue; causing at least in part a query to be provided to the user regarding why the opportunity clue is an opportunity, wherein the user is not provided a choice of answers from which the user can select; causing, at least in part, an indication to be stored in computer readable memory as to whether the user correctly explained why the opportunity clue is an opportunity; causing at least in part a query to be provided to the user regarding how the opportunity should be responded to, wherein the query does not include a choice of answers from which the user can select and where the user is to verbally answer; and causing, at least in part, an indication to be stored in computer readable memory as to whether the user correctly explained how the opportunity should be responded to.

An optional example embodiment provides an interactive electronic training system for training users to identify opportunities, comprising program code stored in computer readable memory, that when executed is configured to: provide a first training presentation of a first communication involving verbal communication from at least a real or simulated person, including a monologue, a person speaking to an off screen person, and/or a dialogue; provide an instruction via which the user is to be instructed to verbally identify an opportunity clue presented by at least a first person involved in the first communication; store in computer readable memory an indication as to whether the user correctly identified the opportunity clue; provide an instruction via which the user is to be instructed to be queried regarding how an opportunity corresponding to the opportunity clue should be responded to, wherein the query does not include an answer from which the user can select and where the user is to verbally answer; and store in computer readable memory an indication as to whether the user correctly explained how the opportunity should be responded to.

Another optional example embodiment provides an method of training a user to identify opportunities via an interactive electronic training system, the method comprising: enabling a first training presentation of a first communication including at least a verbal communication from at least one real or simulated person, the first communication including a monologue, a person appearing to speak to the user, and/or a dialogue to be provided via the training system; enabling, at least in part, a user instruction to be provided via which the user is instructed to verbally identify an opportunity clue presented by at least a first person involved in the first communication; causing, at least in part, an indication to be stored in computer readable memory as to whether the user correctly identified the opportunity clue; causing at least in part a query to be provided to the user regarding how an opportunity corresponding to the opportunity clue should be responded to, wherein the query does not include an answer from which the user can select and where the user is to verbally answer; and causing, at least in part, an indication to be stored in computer readable memory as to whether the user correctly explained how the opportunity should be responded to.

Another optional example embodiment provides an method of training a user to identify opportunities via an interactive electronic training system at least in part by engaging a user's hearing and seeing senses and by having the user perform audible articulation, the method comprising: enabling a first training presentation of a first communication including at least a verbal communication from at least person to be provided via the training system, wherein an image of the at least one person is displayed to the user; enabling, at least in part, a user instruction to be provided via which the user is instructed to identify an opportunity clue presented by at least a first person involved in the first communication by audibly articulating the identification; enabling, at least in part, an indication to be stored in computer readable memory as to whether the user correctly identified the opportunity clue; enabling, at least in part, a query to be provided to the user regarding how an opportunity corresponding to the opportunity clue should be responded to; and enabling, at least in part, an indication to be stored in computer readable memory as to whether the user correctly explained how the opportunity should be responded to.

An optional example embodiment provides a method of training a user to improve the user's ability to retain and understand what is communicated, the method comprising: playing a first segment including a first speaker's verbal speech via a training system to the user; causing at least in part the user to be asked to paraphrase and/or quote the verbal speech; presenting a first preprogrammed answer via the training system, storing in computer readable memory a first score assigned to the user's paraphrase and/or quote at least in part by referring to the first preprogrammed answer; causing at least in part the user to be asked to explain what the first speaker meant; presenting a second preprogrammed answer via the training system; and storing in computer readable memory a second score assigned to the user's explanation as to what the first speaker meant at least in part by referring to the second preprogrammed answer.

An optional example embodiment provides a method of training a user how to improve the user's ability to understand and retain what is communicated, the method comprising: playing a first segment including a first speaker's pre-recorded verbal communication via a training system terminal to the user; causing at least in part the user to be asked to repeat and/or paraphrase the verbal communication or specified content thereof in audible communication; presenting a first preprogrammed answer related to the paraphrase and/or repeat of the verbal communication via the training system, storing in memory a first score related to the user's paraphrase and/or repeat of the verbal communication; causing at least in part the user to be asked to explain what the first speaker meant; presenting a second preprogrammed answer related to what the speaker meant via the training system; and storing in memory a first score related to the user's explanation as to what the first speaker meant.

Another optional example embodiment provides a method of training a user via an interactive electronic training system, the method comprising: playing a first segment on an interactive electronic training system terminal to the user, the first segment including at least a first person providing a verbal communication; causing at least in part the user to be asked to repeat, paraphrase and/or summarize what the first person said; causing at least in part the user to be asked to identify needs of the first person that are not explicitly stated by the first person but is inferable from the tone and/or words of the verbal communication; and causing at least in part the user to be asked to explain how the user inferred the identified needs from the verbal communication.

Another optional example embodiment provides an interactive electronic training system, comprising program code stored in computer readable memory, that when executed is configured to: play a first segment that includes at least a first person communication a plurality of verbal communications of different importance; provide instructions for a user to repeat, paraphrase and/or summarize at least a portion of the plurality of verbal communications and to indicate the relative importance of at least a portion of plurality of verbal communications.

Another optional example embodiment provides a method of training a user via an interactive electronic training system to identify a need of a first person based on a communication from the first person, wherein the first person does not explicitly state the need, the method comprising: at least partly enabling a first segment to be played on an interactive electronic training system terminal to the user, the first segment including at least a first person providing a verbal communication; enabling at least in part an instruction to be provided to the user, wherein the user is asked to repeat, paraphrase and/or summarize what the first person said; and enabling at least in part an instruction to be provided to the user, wherein the user is asked to identify needs of the first person that are not explicitly stated by the first person.

Another optional example embodiment provides a method of computerized training, comprising: presenting to a user a first presentation of a first speaker speaking using a first speaking style and a first script via a computerized training system; presenting to the user a second presentation of the first speaker speaking using a second speaking style and the first script via the computerized training system so that the user can evaluate the effect of speaking style on a listener; and causing at least in part the user to be queried as to whether the first speaker was more effective in the first presentation or the second presentation and why, wherein the user is to verbally respond and is not provided a choice of answers from which to select.

Another optional example embodiment provides a method of computerized training, comprising: presenting to a user a first presentation of a first speaker speaking using a first speaking style and a first script via a computerized training system; presenting to the user a second presentation of the first speaker speaking using the first speaking style and a second script via the computerized training system, wherein the first script and the second script provide substantially the same information using at least in part different wording so that the user can evaluate the effect of wording on a listener; and causing at least in part the user to be queried to verbally articulate: whether the first speaker was more effective in the first presentation or the second presentation, and why the first speaker was more effective in the first presentation or the second presentation.

An optional example embodiment provides a method of computerized training, comprising: presenting to a user a first presentation of a first speaker speaking using a first speaking style and/or a first verbiage via a computerized training system; presenting to a user a second presentation of a second speaker speaking using a second speaking style and/or a second verbiage via the computerized training system; causing at least in part the user to be queried as to whether the first speaker or the second speaker was more effective and why; storing the user response to the query in computer accessible memory; and causing at least in part the user to be queried to verbally explain why the first speaker or the second speaker was more effective.

An optional example embodiment provides a method of computerized training, comprising: causing at least in part a first presentation to a user of a first speaker speaking using a first speaking style, a first script, and having a first appearance via a computerized training system; causing at least in part a first presentation to the user of the first speaker using a second speaking style, a second script, and/or a second appearance; and causing at least in part the user to be queried as to whether the first speaker was more effective in the first presentation or the second presentation and why.

Another optional example embodiment provides a method of training a user via an interactive electronic training system, the method comprising: providing for display to a trainee via an interactive electronic training system terminal information regarding a real or simulated person, wherein a first portion of the information is presented via a structured form including a plurality of data fields having corresponding data and data field names, and wherein a second portion of the information is formatted as notes including a plurality of sentences; at least partly causing the trainee to be instructed to verbally identify one or more needs of the person based on the information; at least partly causing an indication to be stored in computer readable memory as to whether the trainee correctly identified at least a first need; at least partly causing the trainee to be instructed to verbally identify at least one item that appropriately corresponds to the first need; at least partly causing an indication to be stored in computer readable memory as to whether the trainee correctly identified at least a first item, wherein the first item is a product and/or service, that appropriately corresponds to the first need; at least partly causing the trainee to be instructed to verbally explain why the first item corresponds to the first need; and at least partly causing an indication to be stored in computer readable memory as to whether the trainee correctly explained why the first item corresponds to the first need.

An optional example embodiment provides an interactive electronic training system comprising program code stored in computer readable memory, that when executed is configured to: provide for display to a user information regarding a real or simulated person; provide an instruction related to having the user verbally identify one or more needs of the person based on the information; store an indication in computer readable memory as to whether the user correctly identified at least a first need; provide an instruction related to having the user verbally identify at least one item that appropriately corresponds to the first need; store an indication in computer readable memory as to whether the user correctly identified at least a first item, wherein the first item is a product and/or service, that appropriately corresponds to the first need; provide an instruction related to having the user verbally explain why the first item corresponds to the first need; and store an indication in computer readable memory as to whether the user correctly explained why the first item corresponds to the first need.

An optional example embodiment provides a method of training a user via an interactive electronic training system, the method comprising: providing information regarding a real or simulated person for display to a trainee via an interactive electronic training system terminal; at least partly causing the trainee to be instructed to identify one or more needs of the person based on the information; at least partly causing an indication to be stored in computer readable memory as to whether the trainee correctly identified at least a first need; at least partly causing the trainee to be instructed to identify at least one item that appropriately corresponds to the first need; at least partly causing an indication to be stored in computer readable memory as to whether the trainee correctly identified at least a first item, wherein the first item is a product and/or service, that appropriately corresponds to the first need; at least partly causing the trainee to be instructed to verbally explain why the first item corresponds to the first need; and at least partly causing an indication to be stored in computer readable memory as to whether the trainee correctly explained why the first item corresponds to the first need.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIGS. 1B-M illustrate example user interfaces.

DETAILED DESCRIPTION OF PREFERRED EMBODIMENTS

Figure 1A:
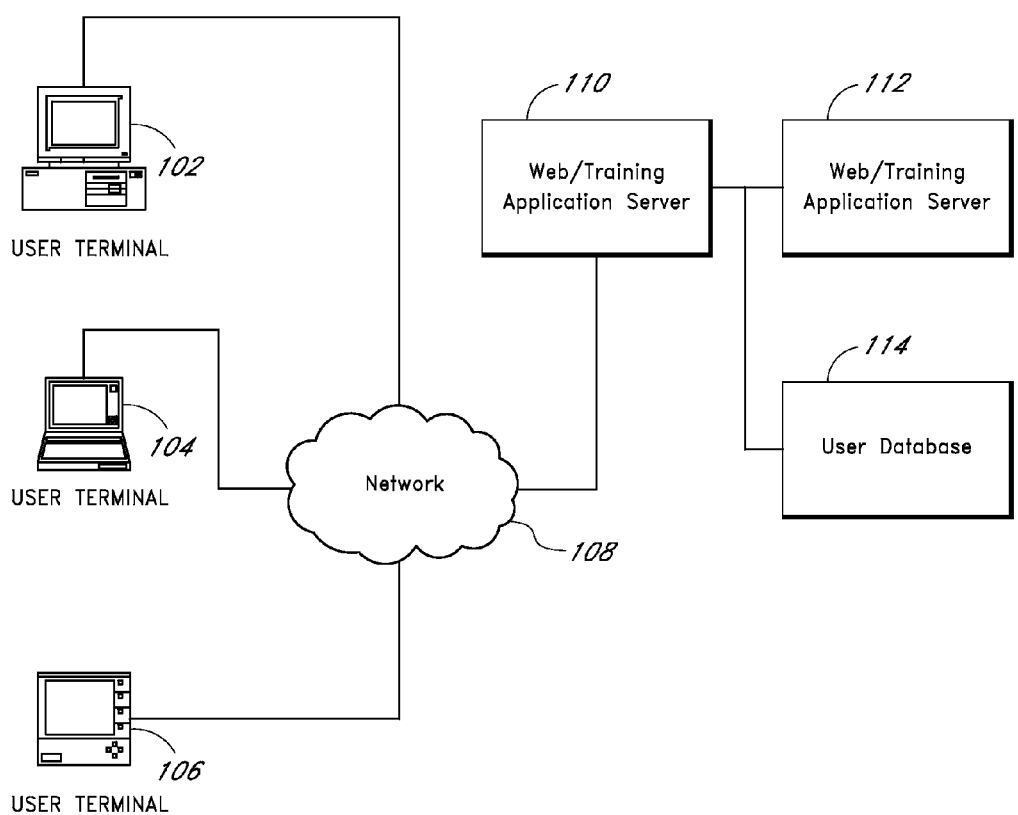
FIG. 1A illustrates an example networked system that can be used with the training system described herein.

The present invention is related to interactive training. In certain embodiments users are trained to identify correct actions, errors and/or opportunities. Certain embodiments can be used to enhance performance with respect to capitalizing on opportunity clues within conversations. Certain embodiments can be used to teach people to enhance their performance with respect to a variety of skills by enhancing their communication mastery, including their listening mastery, listening comprehension, learning comprehension and/or memory retention.

Certain embodiments engage a trainee's cognitive and psychomotor functions using training techniques involving verbal communications. By way of illustration, in certain example embodiments, a trainee is trained and/or assessed by having the trainee view a purpose-built training segment (e.g., wherein significant or highest priority needs are built into the segment, such as common errors, common missed opportunities, as opposed to mere random recordings of actual events) including a person (real or animated) in a simulated situation providing a communication. The trainee may be asked to verbally identify certain types of information being overtly and/or inferentially provided by the communication. In addition, the trainee may be asked to verbally identify how certain information should be responded to and/or the trainee is asked provide a simulated real-world response to the person in the training segment. Thus, by having the trainee both mentally determine how to respond to information and by having the user verbally provide the response in a real world fashion, both cognitive and psychomotor functions and engaged, which further act to enhance the trainee's thinking skills and better embed the training. Further, by utilizing real world "unprompted" verbal answers vs. multiple-choice or true/false approaches in certain optional embodiments, true knowledge and skill acquisition is tested rather than "prompted knowledge", wherein the trainee selects a right answer (e.g., in a multiple choice test) presented to the trainee. These verbal answers are articulated by the trainee before the trainee is exposed to the answers. Further, certain embodiments utilize verbal answers to build fluid verbalization skills, as compared to certain conventional training systems, in which a trainee types in an answer (e.g., in sentence form). "Verbal" training much more closely resembles common real world interactions, which are verbal in nature, as compared to training which relies solely on typed-in answers.

The inability to listen hinders good communication, thereby causing personal or business relationships to falter and often causing missed opportunities (e.g., converting prospects into customers, customer anger, positive buying signs, acquiescence during a negotiation, etc., sometimes referred to herein as missing opportunity clues). For example, certain embodiments teach customer service personnel how to listen with comprehension and what to listen for when dealing with customers, including tones, styles, and interpretations of customer communications.

By way of illustration, certain embodiments can be utilized in the business field to teach trainees to sell or market services or products via a variety of delivery channels to a variety of different types of prospects, such as customers. By way of further illustration, certain embodiments can train people to coach other people with respect to the acquisition of certain skills. Further, certain embodiments can be utilized to teach management to better communicate with and lead lower level personnel.

In addition, certain embodiments can be utilized in people's personal life to teach families interaction skills and generally enhance the listening effectiveness of people in personal human relationships and interactions. For example, certain embodiments can be utilized to train parents parenting techniques, and to teach spouses, significant others, siblings, children, and other relatives and/or friends relationship and interpersonal skills. Certain embodiments can be utilized to train employee trainers/coaches. Certain embodiments can be used to teach public speaking and/or listening to public speakers.

In addition to providing training, certain embodiments may be used to certify that a person has mastered certain tested skills (e.g., based on the person achieving a certain score on certain training sessions). Certain embodiments may be used to test potential employees to determine and assess their current knowledge and skill levels (e.g., by evaluating potential employees' scores on certain training sessions).

As described herein, in certain embodiments, different animated, situation specific role-playing simulation modules are used to train trainees (e.g., managers, employees, teachers, doctors, lawyers, travel agents, bankers, spouses, children, actors, singers, etc.) to improve their listening comprehension and/or their ability to respond to others effectively. Scenarios may be include one or more participants, and optionally may present the interactions of participants in a story-based manner. Advantageously, learning in the context of a story better helps people code and retain information as compared to rote learning.

Unlike certain conventional training systems which only present the correct way to perform, in an example embodiment of a training system, the user is instructed to verbally identify both correct and incorrect occurrences. Error-based learning can significantly contribute to enhanced performance. For example, the user may be instructed to identify the errors and/or opportunities embedded throughout the module's role-play simulation. The user may also be asked to verbally identify what was done correctly by participants in the simulation. Thus, a variety of real world situations can be presented via one or more modules, preferably with sufficient interactivity so as to engage the user's interest and reduce or eliminate training boredom.

For example, a sales and service module may include an "employee" who makes "real life" errors and misses opportunities while interacting with a prospect or customer. The module may further present an opportunity and the trainee may be asked to identify the opportunity, even if it was not missed by another actor. By way of further example, a management/coaching module (e.g., used to train managers or coaches) may include a scenario in which a manager/coach who makes "real life" errors in managing and coaching subordinate employees, and who misses opportunities in interacting with one or more of her or his subordinate employees. For example, a module may provide a presentation of a banker interacting with a client. In the module, once the client leaves, a manager or other coach provides suggestions, criticisms, and/or identifies errors to the banker. The trainee then needs to identify errors, opportunities (whether or not missed by a scenario participant), and/or poor word choices (optionally including inappropriate interruptions) with respect to the coach in the module, and to verbally state why they reached those conclusions, why it is important to correct the errors, and how to correct the errors. These error corrections are verbally stated in the first person. Thus, a virtual role play/rehearsal occurs. Example opportunities may relate to significant life events, such as moving, purchasing a home, birth of a child, marriage, divorce, etc. Such life events often indicate that the affected person will need to take advantage of different financial services (e.g., loans, opening of new accounts, investments, etc.).

After viewing the module, the trainee then needs to verbally identify errors, opportunities (whether or not missed by a scenario participant), and/or poor word choices (optionally including inappropriate interruptions) with respect to the coach in the module.

By discovering errors and opportunities and verbally responding to the same, optionally at the rate of speed of the real world, users will be able to learn what errors they are personally making and how they sound, how to correct them, and/or how to identify opportunities and how to capitalize on opportunities. By having users verbally identify correct actions (e.g., where the proper questions are asked and responses given by a simulation participant), concepts and techniques on which the user is being trained will be further reinforced. In certain embodiments, users will be asked to provide responses, analysis, and/or identification in substantially real-time with respect to scenario events. This element of acting in substantially real-time enhances the quality of learning, the speed of learning, and learning engagement.

In order to enhance trainees' ability to better understand the impact and/or meaning of certain voice tones, and to enable them to better "read between the lines," a module can test the trainee on what the trainee has heard. Certain embodiments also teach users how to listen carefully and focus on what is being communicated to them and to focus on specific words. The presented "real life" situations, and the optional interactivity required from users, train users to actively listen.

By way of example, certain modules optionally include role-plays that contain phrases where the ability of "reading between the lines" and understanding "what is meant" is needed to correctly answer certain quizzes. Users may listen to the role-play, in which characters make self-revealing statements. That is, statements that reveal something about themselves (e.g., something that may be related to potential financial needs).

Optionally, role playing characters will make statements that verbalize something different then what they may actually feel or think, wherein the statements may nonetheless provide a hint or indication as to what the character is thinking, and the user will be tested on their ability to hear and analyze the foregoing. Optionally, users may need to first verbally identify subtle phrases and then participate in a verbal quiz where they are asked to reach the proper conclusions about what is "going on between the lines" and "what is meant". Users may then be verbally asked to verbally discuss appropriate next steps and how to capitalize on "hidden opportunities". Users may be tested on their ability to verbally identify and recall/repeat significant phrases spoken during the training session, which simulates what users need to do in the real world. Users can be trained on how to act and what to say when a customer is not interested in a product or service being offered.

Thus, the methods and processes described herein enable users to improve their listening skills to better hear and comprehend what others (e.g., customers, clients, or prospects) are saying. Additionally, using systems and methods described herein, users can be trained to enhance their observational skills, and to spot subtle and unintentional clues provided by customers, clients, and prospects. For example, a clue might relate to an opportunity (sometimes referred to as an opportunity clue) indicating a current and/or future need. For example, the need may be one that can be addressed via one or more products or services that a sales person or customer relations person can provide/sell.

Further, using systems and methods described herein, users can be trained to better capitalize on opportunities presented in dealings with others. Additionally, certain systems and methods described herein teach trainees to identify needs, including stated needs, unstated needs, and/or needs that customers (or others) are not even aware of. In this regard, it teaches users to anticipate and infer the needs of others. Still further, as discussed above and in greater detail below, using systems and methods described herein users can be trained to better identify how to identify and correct errors/incorrect statements and/or questions in interactions with others. Users can be trained to better analyze the needs of customers, clients, and prospects. Further, the systems and processes described herein can train users in how to better recommend services or products to customers, and to overcome customer objections to taking advantage of such services or products. Thus, users are optionally trained in how to better negotiate sales, manage sales, close sales and/or to make referrals to others. Users can optionally be trained to improve their presentation skills, as well as the style and content of their conversations, and the enhanced skills, for example, can be utilized throughout the educational marketplace.

Certain example embodiments provide users with a level of control with respect to what training materials the user will use in order to obtain a desired set/type of knowledge (e.g., in the cognitive domain). For example, the user optionally can select a training module and/or a portion or chunk of a training module for a training session. Optionally, the training system can be used on-demand, when convenient for the user.

Further, certain example embodiments incrementally increase the difficulty of the training, starting from relatively easy training (e.g., asking the user to identify easy to spot errors, problems with style, opportunity clues, missed opportunities, fairly easy to identify opportunities, etc.) and progressing to more difficult training (e.g., asking the user to identify more complex or subtle errors, problems with style, opportunities, missed opportunities, etc.), thus enhancing the user in their cognitive domain and affective domain (e.g., enhancing the user's abilities and attitude by building user confidence). The user may be asked to verbally identify other occurrences within a conversation, such as, by way of example, an indication of a customer need, positive buying signs, acquiescence during a negotiation, other opportunity clues, customer anger, etc. The training is interactive and optionally requires more than one of the five senses (e.g., hearing, seeing, etc.) as well as speech to accomplish the training. For example, during a training session a user may need to watch people acting in a given scenario, listen to what the people are saying, and then verbally identify errors, opportunity clues, missed opportunities, and the like.

Certain embodiments train users in critical thinking and in taking an idea or issue to its logical conclusion. For example, a trainee may be asked identify opportunity clues in a communication by a person in a training segment (e.g., customized to address opportunities that trainee's employer wants the trainee to learn to identify), where the person says something, has a facial expression, or body stance, that communicates information that is not in the form of a direct question or is in the form of a direct question but which also reveals information regarding the person asking the question. The trainee may then be asked to verbally describe why the clue is a clue, why the opportunity is important, or other related questions. The trainee may then be asked how the opportunity should be responded to or capitalized on. Thus, optionally, the trainee's mind is trained to specifically seek out and identify the opportunities that trainee's organization/employer desires their employees to capitalize upon.

Certain embodiments utilize a part, a whole, or a whole-part or a whole-part-whole learning methodology where the learning process becomes an iterative cycle. First, in whole, whole-part, or whole-part-whole learning the user is trained and optionally tested to master a whole skill. Then, in whole-part or whole-part-whole learning, the skill is broken down into elements and the user is trained and optionally tested on the individual elements. Then, in the case of whole-part-whole learning, the user is again trained and optionally tested on the whole skill. By way of example, the user can be trained to identify opportunities, such as hidden opportunities, that are frequently missed and which could lead to beneficial results (e.g., the sale of additional products or services).

Example embodiments will now be described in greater detail. Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networks of interactive televisions or of telephones, and other protocols may be used as well. Satellites and the like can also be used to relay communications between the training system and users.

In addition, unless otherwise indicated, the functions described herein are preferably performed by executable code and instructions stored in computer readable memory and running on one or more general-purpose computers. However, the present invention can also be implemented using special purpose computers, other processor based systems, state machines, and/or hardwired electronic circuits. Further, with respect to the example processes described herein, not all the process states need to be reached, nor do the states have to be performed in the illustrated order. Further, certain process states that are described as being serially performed can be performed in parallel. Portions of the different techniques and processes can be applied to or combined with other techniques and processes described herein.

Similarly, while the following examples may refer to a user's personal computer system or terminal, other terminals, including other computer or electronic systems, can be used as well, such as, without limitation, an interactive television, a networked-enabled personal digital assistant (PDA), other IP (Internet Protocol) device, a cellular telephone or other wireless terminal, a networked game console, a networked digital audio player (e.g., a player, such as an iPOD, a Zune, or other digital player, that can play one or more of the following formats and/or different formats: MP3, AC-3, ATRAC, WMA, Oog Vorbis, RealAudio, ACC, WAV, etc.), other audio device, a networked entertainment device, and so on.

Further, while the following description may refer to a user pressing or clicking a key, button, or mouse to provide a user input or response, the user input can also be provided using other apparatus and techniques, such as, without limitation, voice input, touch screen input, light pen input, touch pad input, and so on. Similarly, while the following description may refer to certain messages or questions being presented visually to a user via a computer screen, the messages or questions can be provided using other techniques, such as via audible or spoken prompts.

An example embodiment utilizes a computerized training system to enhance a trainee's listening comprehension, learning comprehension and/or memory retention. For example, the training can be delivered via a terminal, such as a stand-alone personal computer. The training program may be loaded into the personal computer via a computer readable medium, such as a CD ROM, DVD, magnetic media, solid state memory, or otherwise, or downloaded over a network to the personal computer.

By way of further example, the training program can be hosted on a server and interact with the user over a network, such as the Internet or a private network, via a client computer system or other terminal. For example, the client system can be a personal computer, a computer terminal, a networked television, a personal digital assistant, a wireless phone, an interactive audio player, or other entertainment system. A browser or other user interface on the client system can be utilized to access the server, to present training media, and to receive user inputs.

As will be described in greater detail below, in one embodiment, a training system presents a scenario to a user via a terminal, such as a personal computer or interactive television. The scenario can be a pre-recorded audio and/or video scenario including one or more segments. The scenario can involve a single actor or multiple actors (e.g., a human actor or an animated character) in a monologue or dialogue (e.g., based upon a purpose-built script) relevant to the field and skill being trained. By way of further example, the scenario includes a single avatar speaking directly to the trainee as if having a conversation with the trainee. By way of illustration, the actors may be simulating an interaction between a bank teller or loan officer and a customer. The simulated interaction can instead be for in-person and phone sales or communications. By way of further example, the actors may be simulating an interaction between a parent and a child or a teacher and a student. By way of still further example, a single actor, such as one representing a public speaker (e.g., someone giving a monologue or speech to a live audience and/or an audience that will see and/or hear a recording of the speech, or someone providing one side of a conversation) can be represented. By way of yet further example, the scenario can include a person talking to a call center representative with only one person speaking. Optionally, rather than using actors to read a script, the pre-recorded scenario can involve a real-life unscripted interaction.

Optionally, the user is provided with the ability to intervene and stop the pre-recorded scenario to identify an error by an actor in handling the presented situation and/or an opportunity presented in the scenario. For example, the user can intervene and stop the scenario by pressing a key, giving a voice command or otherwise.

In an example embodiment, embedded or otherwise associated with the audio track and/or video track is digital metadata that identifies where an error or opportunity occurs in the track, what the error or opportunity is, questions for the user (such as verbal questions needing verbal responses, such as free form questions to which the user is to provide a natural language response) regarding the error or opportunity, and the correct answers to the questions.

Optionally, a given pre-recorded segment is not repeated the same day, or within a predetermined duration, to better ensure that a user is consistently challenged by different scenarios. Optionally, pre-recorded segments can be repeated periodically, and/or repeated in response to a user scoring below a predetermined threshold for a corresponding segment.

An example training process will now be described in greater detail. A user can launch and optionally log into a training system program. Optionally, during the log-in process a user identifier and/or password is provided to the training system so that the system can automatically select the appropriate training module for the user and store the user's interactions and/or score in a database in association with the user identifier.

Optionally, the system can present with a selection of modules, such as segments or training sequences and the user selects the desired segment or sequence. Optionally, a training administrator can select and specify the segments to be presented to the user. Optionally, the system automatically selects which segment is to be presented.

Before presenting the segment, text, audio, and/or video, instructions are presented to the user which explain to the user the purpose of the selected training module, the different interactive possibilities that exist within the selected training module, how the user is to interact with the training program, and scoring process. Optionally, a pre-study session is presented that relates to the material to be tested, and then the user can view the selected segment, which results in perfect or a high level of alignment between the information taught and the information tested, as compared to many conventional training systems.

The user clicks on a "start" button (or takes other appropriate initiation action) and the training module's audio and/or video segment begins playing on the user's terminal. The video can include real or animated figures that articulate or appear to be "articulating" the pre-recorded audio track. For example, the simulation can be generated using Macromedia Flash or using other applications. The training segment can be two to five minutes in length, or other length. Within the pre-recorded audio track optionally are preprogrammed opportunities and/or errors.

The user is queried regarding the material to be tested (e.g., via verbal questions provided by a trainer, an avatar presented by the training system, a recording of a trainer, a speech to text system, and/or text) and is asked to verbally respond, (e.g., without having a selection of answers presented from which the user is to choose).

Optionally, the user can be prevented or not provided with the ability to rewind or play back sections for a "do over" until the entire segment is completed and initially scored. Optionally, the user can be provided with the ability to rewind or play back sections for a "do over" prior to the entire segment being completed or initially scored.

Once the segment is complete and the user's scores are entered into the system by the trainer, the system totals the user scores and presents the user's score for the segment. Optionally, the user can be provided with the scores of others for the segment and/or the user ranking relative to other users.

Optionally, the user repeats the particular audio and/or video pre-recorded segment within a specified period of time, such as 24 hours, with peers and/or coaches to solidify and advance the learning. The trainer/coach can ask the user the same or similar questions presented to the user when the user previously went through the segment. The user is to verbalize the correct answers without prompting via multiple choices, and/or true/false statements. The user performance (e.g., the number of correct answers, the number of opportunities identified, etc.) is stored in computer readable memory (e.g., automatically, in response to the coach entering the user performance information into a form or otherwise). The system can then calculate and display a score. "Microscoring" is optionally provided, wherein if the trainee fails to answer a first question in a series of questions, the trainee is appropriately scored for the failure, but the answer is then provided to the trainee so that the trainee can answer (and be scored on) subsequent questions in the series.

Preferably, although not necessarily, the user participates in a new scenario each day or each working day. Such multiple scenario continuous training (which avoids boredom and adds novelty to the training) provides enhanced training and retention as opposed to single event training. This creates compressed positive experiences, which are a by-product of the purpose-built modules as compared to certain conventional training systems which use solely random, actual interactions.

Optionally, one or more of training processes/sessions described herein can be presented in the form of a game to help keep the trainee's interest and/or to enhance the training impact. For example, each time the trainee receives a score above a specified threshold, something pleasing happens (e.g., a certain tune is played, a certain image/video is displayed, a piece of an electronic puzzle is awarded, the trainee earns points/weapons/attributes that can be used in an electronic game, etc.). Optionally, the training can be presented in a format wherein the trainee must answer questions correctly (e.g., receive a predetermined score) in order to defeat an adversary (e.g., a simulated robot or alien).

Optionally, group training is provided by the training system in a competitive manner, further engaging users' attentiveness. For example, multiple users can view a given scenario or corresponding user terminals at substantially the same time. The users can compete, wherein the first user that correctly identifies a given error and/or opportunity wins or is awarded a highest score with respect to identifying the given error and/or opportunity. Optionally, relatively lower scores can be provided to those users who later correctly identified the given error and/or opportunity, wherein higher scores are provided to those who more quickly identified the given error and/or opportunity.

At the completion of a group training session or sub-session, the scores can be totaled for each participating user and the scores can be presented to the users, optionally ranked in accordance with the scores.

FIG. 1 illustrates an example networked training system including a Web/application server 110, used to host the training application program and serve Web pages, a scenario database 112, that stores prerecorded scenario segments (such as those described herein), and a user database 114 that stores user identifiers, passwords, training routines for corresponding users (which can specify which training scenarios are to be presented to a given user and in what order), training scores, and user responses provided during training sessions. The training system is coupled to one or more trainee user terminals 102, 104, 106 via a network 108, which can be the Internet or other network. The illustrated system can be used to execute the processes and host the interface described herein.

Certain embodiments enable a trainee to access training sessions on demand, via a computer and/or portable video/audio player as compared to only having access within a scheduled classroom setting as with many conventional systems. The training software/modules can be hosted locally on a trainee terminal or remotely and accessed over a wired and/or wireless network.

For time management purposes and to deal with interruptions, certain embodiments include a book-marking function which allows a trainee/trainer to "pause and resume" the training process.

Example training processes will now be described with reference to the figures. In certain example processes discussed below, the user responds verbally to questions immediately, on the spot to another human/facilitator located adjacent to the user.

The use of a live facilitator (e.g., sitting next to the trainee in front of the same screen) can enhance the positive emotional tension for the trainee, resulting in an increase in the release of adrenalin from the adrenal glands, which can further enhance training retention because of the immediate presence of the facilitator. Adrenalin appears to code retention to a greater degree. Live facilitator provides emotional simulation because it mimics the interaction the trainee would have in the real world (e.g., which a customer, supervisor, employee, family member, etc.). The substantially immediate feedback a facilitator provides (verbally and/or via a text presentation using a training terminal) to a trainee can enhance training as compared to a strictly e-learning scenario. Such human engagement between the facilitator and trainee can increase the trainee engagement and motivation (e.g., the facilitator can provide encouragement, and the trainee may desire the approval of the facilitator). Many conventional systems lack such a purpose built training process involving a trainee and a facilitator. Optionally, however, the training can be performed solo, without a trainer or facilitator. However, unlike other conventional solo training systems, an example embodiment of the solo training system optionally includes the user providing verbal responses.

In solo training, questions/prompts are optionally provided by the system textually and/or audibly. The trainee's verbal answers are optionally recorded electronically by the system and optionally transcribed by the system into text. In solo mode, the system optionally provides scoring forms for display to the trainee, the scoring forms including the correct answers and a check box (or other input mechanism), where the trainee can "self score" by indicating whether the trainee provided the displayed (correct) answer/response. Optionally, the system displays and/or prints out the transcript of the trainee's answers and/or plays back the trainee's answer during the self-scoring process so that the trainee can perform a comparison of the trainee's answers with the displayed answers. Optionally, the system itself performs the scoring by comparing the transcribed trainee's answer with one or more correct answers to determine if the trainee correctly responded with the correct answer. Thus, while certain embodiments herein may be discussed with reference to trainee and trainer, the processes discussed herein can also be performed by the trainee, without participation of a trainer.

The facilitator is provided with the correct answers so that the facilitator can immediately grade the user or discuss the user's response and the segment to provide immediate verbal and/or non-verbal feedback to the user, and to provide substantially immediate accountability. This also lowers the facilitator's anxiety intellectually (because the facilitator does not have to know the right answers without reference to the training system) and emotionally (because the trainer does not have to confront the trainee with the trainee's wrong answers, nor does the trainer have to challenge the trainee with the questions). Furthermore, anxiety is reduced because the scoring is objective (as opposed to subjective) even though the answers are verbal. In addition, optionally, trainees can self-score.

The facilitator, who can be a fellow employee or manager of the trainee, a parent (or parents) of a child (who is the trainee), a teacher of a student trainee, optionally gains knowledge and performance improvements because the facilitator is learning and is engaged in the training as well. Thus, a dual-learning process is engendered. Discussions on the training subject matter and the viewed scenarios between the facilitator and the trainee further enhance the dual-learning process.

However, while certain embodiments are described as employing a trainer/facilitator in the immediate presence of a trainee, optionally instead or in addition a remote trainer/facilitator can be used (e.g., via voice, video conference, webinar (web-based seminar), electronic white board, or otherwise). Optionally, when the trainee and trainer are using different terminals (e.g., because they are not co-located), answers to questions are first presented on the trainer's terminal display, and are only presented to the trainee in response to a trainer action. Optionally, rather than using a facilitator, certain training can be performed solo, without the local or remote presence of a facilitator.

By way of example, the requests/questions described below can be presented (e.g., via text and/or a voice prompt) to the user via the training terminal, or the trainer can read the request from a trainer terminal or printout. By way of example, the user response can be provided orally. As discussed elsewhere herein, such oral interaction may better facilitate the training process as compared to written multiple choice or true/false testing, as such oral interaction does not present the correct answer in the question, better simulates real world condition, and enhances the positive emotional tension and engagement.

Certain embodiments optionally break out scoring assessments, providing for substantially immediate feedback, accountability and reinforcement. An example embodiment optionally scores by category and sub-category. Therefore, the example embodiment provides the trainee substantially instant feedback on a sub-category basis, and total feedback for the "full" category (e.g., including the summation of scores for the sub-categories). This substantially instant evaluation enables the pinpointing of areas where improvement is needed, optionally including improvement in the ability to articulate the correct answers/content, as well as the assessment of speed/fluency and style/confidence. Furthermore, a trainee's performance can be self-scored and/or "distance scored" by remote facilitators.

Figures 2, 4A:
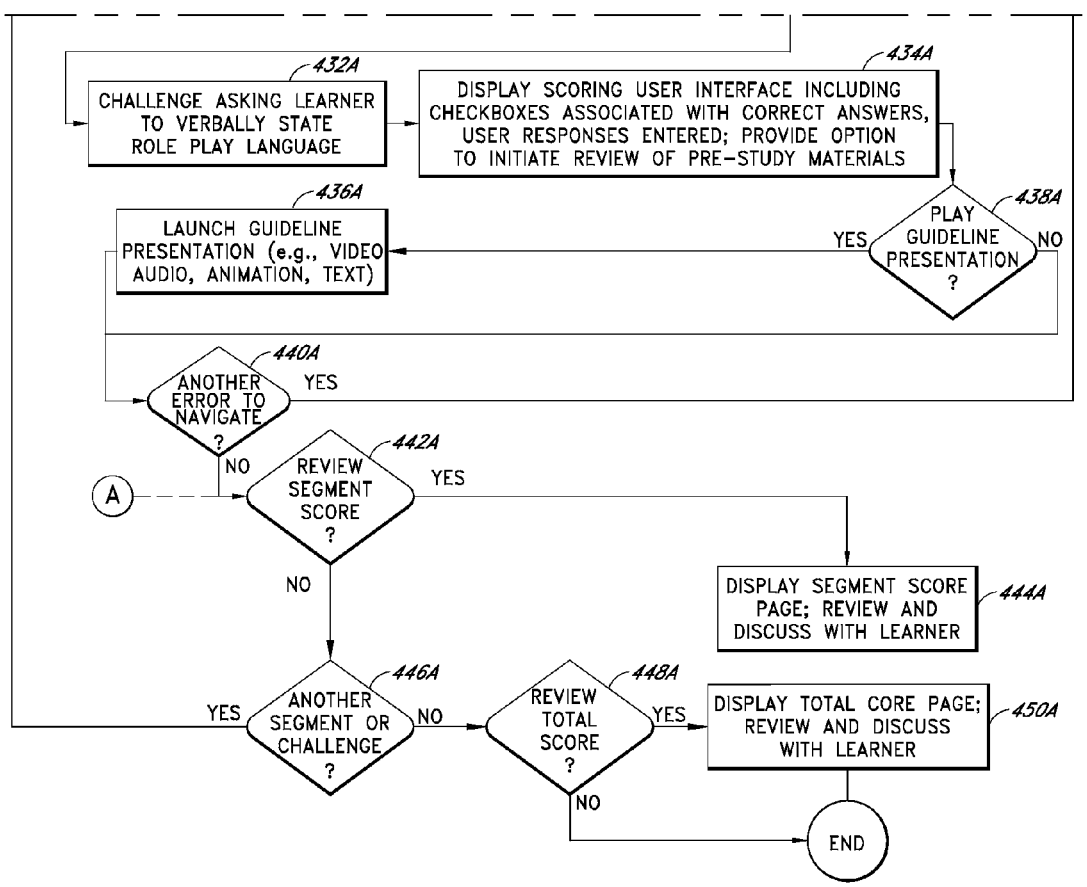
FIGS. 4A-N illustrate example processes flows.

FIG. 4A illustrates an example training process. Optionally, the interactions between the user and the trainer/facilitator in the following process may be performed verbally (e.g., where the trainee responds verbally, and the trainer provides verbal and/or non-verbal instructions, questions, etc.). Advantageously, as discussed above, such a "verbal" approach more closely simulates real world conditions and will in many instances better enhance training. Further, using such a "verbal" approach (where the question does not include a possible answer to the question), a user is not able to guess a correct answer from a selection of potential answers (e.g., as is the case in multiple choice and true/false questions). Thus, optionally, rather than prompting the user to answer questions regarding a segment scenario via multiple choice and true/false questions, the user is queried verbally and is asked to respond verbally.

In this example training process, testing is performed after selected portions or chunks of a scenario. Optionally, the portions do not have to be performed in a specified order. Different chunks/segments can be used to train different skills (e.g., how to avoid different types of errors, how to identify and respond to different types of opportunities, etc.). Optionally, the process, or portions thereof, may be used to test for listening mastery (e.g., the ability to repeat or paraphrase what was said, retention of what was said) and listening comprehension (the ability to understand what was said). Listening mastery and comprehension can enhance emotional intelligence (the ability to understand and assess what someone is feeling and to deal with those feelings). For a given portion, the user/trainee is asked to identify a participant error, explain why it is an error, and explain what the participant should have done differently. Optionally, in addition or instead, the user is asked to repeat the guideline language presented during a pre-study session (e.g., in their own words or mimicking as closely as possible the original guideline language) in order to correct the error.

Certain embodiments described herein provide tutorials, such as learner tutorials which may explain how to run a given module (e.g., what to click, how to navigate, how to score, how to go back, etc.). Certain embodiments provide optional pre-study learning sections and results summary sections, which can be accessed for initial learning and for reinforcement purposes and can optionally be printed out in hard copy. Optionally, the results summary sections are available during utilization of a training module, within training module segments, as well as at the end of a training module for substantially instant reinforcement purposes. The pre-study sessions may generally relate to some or all of the following: the content for the lesson about to be taught (the training session that the user is about to undergo), and so the content of the pre-study session may vary based on the training session. For example, as appropriate, a pre-study session may instruct the user regarding products, services, responsibilities, interpersonal interaction in one or more settings, techniques, skills, overcoming objections, how to interpret customer body language; how to 'read between the lines'; how to recognize emotion on the customer's face; etc.

Optionally, the pre-study segment identifies key or important elements, and why the key elements are important. These key elements may also include style elements which are objectively clarified in the pre-study. The pre-study session may also be used by the trainee as a rehearsal for the tested part of the training. For example, the trainee may verbally repeat the key elements during the pre-study session. Optionally, the pre-study session may include example segments which the trainee can be queried on, so that the trainee will better know what to expect during the test portion of the training. Similar pre-study sessions may be included in other processes described herein.

During the process illustrated in FIG. 4A users may also be asked to identify what was done correctly and/or incorrectly by a participant and to explain why it was correct, incorrect, and/or important. The user may also be asked to verbally describe a participant's overall style, and to identify problems or advantages with respect to that style. The user may be asked to comment on correct and/or incorrect (e.g., appropriate and/or inappropriate) specific style elements and/or on a participant's tone. Optionally, the user may be queried with respect to the body language of one or more of the participants. Thus, the user may be tested on spoken and physical errors, and scored accordingly. The scoring results in this process, and optionally in other processes discussed herein and illustrated in the figures, may optionally be printed out substantially immediately after the scoring calculated and presented for review.

The user may optionally be challenged/queried and asked to verbally provide some or all of the following:
  identification of correct technique implementations in conversations (e.g., techniques that enhanced the persuasiveness of the verbal communication);
  identification of technique errors in conversations;
  identification of why it is important or critical to correct the errors;
  guideline language error-corrections;
  identification of correct style implementations;
  identification of incorrect style implementations;
  identification of appearance and/or grooming issues that detract from the verbal communication persuasiveness (e.g., clothing, hair style, makeup, jewelry, glass style, etc.);
  identification of appearance and/or grooming issues that enhance the verbal communication persuasiveness;
  an explanation as to whether or not the communication was persuasive, effective, and/or clear as a whole, and whether the user would have been influenced by the communication and how.

At state 402A, the user and/or trainer log in to the training system. At state 404A, the system displays a welcome screen. The system receives a selection of a training module from a menu of training modules. For example, the different training modules may relate to different subject matter, such as different products and services. Optionally the system provides a description of the corresponding training objectives and a description of the training module. A user interface is displayed via which the trainee and/or trainer (which may be a peer) optionally selects a peer type (where the learner and/or partner indicates who their "learning partner" is for the session—a peer, their supervisor, someone whose principal job function is training, etc.).

At state 406A, a user interface is presented via which the trainee/trainer can instruct the system to display a tutorial for the learner/trainee. If an instruction is provided to launch the learner tutorial, the process proceeds to state 408A and the learner tutorial is launched. Otherwise, the process proceeds to state 410A. The tutorial explains to the learner how to utilize or run the module (e.g., what to click, how to navigate, how to score, how to go back, etc.).

At state 410A, a user interface is presented via which the trainer can instruct the system to display a tutorial for trainer (e.g., via a keyboard, mouse entry, voice command or other input). If an instruction is provided to launch the trainer tutorial, the process proceeds to state 412A and the learner tutorial is launched, and a review for the trainer is presented. Otherwise, the process proceeds to state 414A.

At state 414A a pre-study session is initiated. By way of example, the pre-study review can include a review of concepts, products, and/or services on which the user is being trained and/or tested. The pre-study session optionally covers elements, such as the concepts, information, and techniques that the trainee will be tested on, and so is aligned with the testing. For example, the elements may be:

relatively important or key concepts or steps;
why is it important to perform the identified steps;
guideline language that can be used to implement the steps.

By way of illustration, if the training is intended to trainee the trainee in selling cars, the trainee may be instructed that the following steps (or elements) should be performed when interacting with a customer:

1. Greeting
2. Inquiry into Customer Needs
3. Statement of In-Stock versus Custom Ordering Options
4. Offer to take a Test Drive
5. Statement of Financing Options
6. etc.

The pre-study session optionally includes text, graphics, videos, and/or animations. Optionally, the system is configured to print some or all of the pre-study materials (automatically, or in response to an instruction by the trainee and/or trainer) for review by the trainee and/or trainer.

In an example embodiment, if the trainee fully learns the pre-study content, the trainee should be able to perform the appropriate event identifications (e.g., correct actions and/or incorrect actions) and provide the corresponding explanations and answers. Optionally, the pre-study session is broken into segments that correspond to the scenario segments so that the pre-study segments are aligned (and optionally exactly aligned) with the scenario segments, enabling greater embedding of the subject matter. Thus, for example, if the training scenario includes a certain number of segments, the pre-study session optionally includes the same number of segments. Optionally, multiple segments can form an entire single conversation.

By way of further illustration, the pre-study session can display textually and/or play an audio/video-animation presentation of model answers which correspond to the model answers that will be expected and/or provided during the "testing" phase of the training. Optionally, the pre-study session includes, or is limited to teaching or a review of terminology that will be used in the training session (e.g., an explanation of such terms as "request", "opportunity clue", "opportunity", etc.).

The pre-study session may be presented via text, audio, and/or a video representation. If audio and/or video are provided, the trainee can hear and/or see the technique in its correct role played format without the exponentially different possible responses from customers, prospects, etc (e.g., "thank you, but I am not interested", "no need", "already have it covered", etc.). By using this "customer default" methodology, trainees can hear what they should do, without having to go off onto "branches of the tree". For example, the role model presentation may present a customer service person interacting with a customer, wherein the customer provides a neutral/negative response to each question asked by the service person. This enables the trainee to see a complete run through of role model techniques. Optionally, the trainer/trainee can instruct the system to print out all or a portion of the materials presented in the pre-study session. The process then proceeds to state 416A.

At state 416A, a user interface is presented via which the trainer/trainee can instruct the system to play a selected entire scenario/conversation (e.g., from a menu of scenarios/conversations) or predefined segments thereof. The user interface also provides a menu of selectable challenge areas.

If an instruction is provided to play a selected conversation or a segment thereof (e.g., a relatively short segment, such as one approximately between 15 to 30 seconds or between 30 and 90 seconds in length, or optionally longer or shorter), then at state 418A, the selected conversation or segment is played/displayed to the trainee (e.g., including video, animation, audio, and/or text). The process then proceeds back to state 416A, where another conversation can be selected.

If, at state 416A, a challenge area is selected (e.g., identify correct answers, identify incorrect answers, identify correct style, identify style errors, etc.), and the process proceeds to state 420A, where a challenge is presented. The trainee is asked (by the facilitator and/or the system) to verbally state an element. For example, the trainee may be asked to verbally identify all correct events (optionally of a specified type, such as with respect to information provided by a scenario participant, actions taken, style, tone, and/or demeanor, etc.) in the selected segment (or the entire scenario, if that had been selected at state 416A). The elements may be those covered during the pre-study session.

At state 422A, a scoring user interface is displayed. In this example, the answer(s) (corresponding to the challenge) are displayed with associated check boxes. The trainer and/or trainee checks off each challenge the trainee correctly responded to, which are then stored in computer readable memory. Optionally, a user interface is provided via which an instruction to play the guideline presentation can be given. This enables a review of the relevant portion of the pre-study session. Thus, "instant replay" is available. The process then proceeds to state 424A, or for certain challenge areas, optionally to state 442A.

At state 424A, the trainee is asked to verbally identify errors made by one or more scenario participants (e.g., errors of omission, errors of commission (a misstatement, interrupting the customer inappropriately/too often, offering an inappropriate good/service, etc.), errors of style, missed opportunities, etc.). At state 426A, a scoring user interface is displayed. In this example, the answer(s) (the errors that actually occurred in the scenario) are displayed with associated check boxes. The trainer checks off each challenge the trainee correctly responded to, which are then stored in computer readable memory. Optionally, a review of the relevant portion of the pre-study session is played back (e.g., automatically in response to the scoring, or in response to a manual instruction by the trainee/trainer).

If the trainee failed to identify the error, optionally the trainer (e.g., using information provided by the training system via the system display) will identify the error to the trainee. At state 428A, the trainee is asked to verbally explain why it is important to correct the identified error (e.g., error of omission, error of commission (a misstatement, interrupting the customer inappropriately/too often, offering an inappropriate good/service, etc.), error of style, missed opportunities, etc.). The trainee may optionally also be asked to verbally explain why what the participant did (e.g., said) or did not do/say was an error. Thus, even if the trainee cannot correctly perform part of the testing (e.g., the trainee failed to identify an error), the trainee may still be required to answer subsequent related questions (e.g., why it is important to correct the error and/or explain why it is an error) to better facilitate the training. At state 430A, a scoring user interface is displayed. In this example, the answer(s) are displayed with associated check boxes. The trainer checks off each challenge the trainee correctly responded to, which are then stored in computer readable memory. Optionally, at state 430A, a review of the relevant portion of the pre-study session is played back. Thus, "instant replay" is available.

At state 432A, the trainee is asked to verbalize what a scenario participant should have said. The user may be requested to verbalize a correct answer using the model answer/guideline/role model language presented earlier. Optionally, the user may be asked to use, as best as possible, the actual model language used (e.g., in the first person), or the user may be asked to paraphrase the model language (e.g., in the first person).

For example, when the participant is dealing with a customer, one or more products or services may need to be identified by the trainee that would correspond to a need indicated by the customer. Optionally, at this point the trainer can enter a corresponding score via the trainer terminal which is stored by the system.

At state 434A, a scoring user interface is displayed. In this example, the answer(s) are displayed with associated check boxes. The trainer checks off each challenge the trainee correctly responded to, which are then stored in computer readable memory. At state 438A, a user interface is provided via which an instruction to play the guideline presentation can be given. This enables a review of the relevant portion of the pre-study session. Thus, "instant replay" is available. If an instruction is provided to playback the guideline presentation, the process proceeds to state 436A. At state 436A, the system presents a model answer/guideline language as to what the participant should have said. The guideline language can be displayed to the user on the training terminal screen and/or verbalized by the terminal (e.g., with or without a video component include actors/animation). The role model guideline answer, that provides guideline language for the correct way to deliver techniques and information, and/or can be specifically related to the errors. Many conventional systems lack such role model guideline language training, and in particular, guideline language that provides language that corrects an error presented in a scenario.

This is in contrast to certain conventional techniques that simply playback a recorded real conversation between a call center operator and a customer (e.g., recorded for quality and training purposes) and asks a group of trainees to explain what the call center operator could have done better. However, such a recording may not present the more important common errors and/or opportunities that the training should emphasize. By contrast, the training system described herein can present purpose-built scenarios and model answers that specifically embed appropriate and important/critical errors and/or opportunities with which to train users. Further, rather than just hearing guesses by other trainees as to what could have been done better, a facilitator can provide the complete correct answers/best practices, without leaving out information, as answers are preprogrammed.

At state 440A, the system determines whether there are additional errors to navigate. If there are still additional errors to navigate (e.g., where the trainee is asked to explain why it is important to correct the error, why a previously identified error is an error, etc.), the process proceeds back to state 426A. If the error identification has been completed, the process proceeds to state 442A, where a user interface is provided via which an instruction can be provided to the system to display the trainee's score for the scenario (or a segment thereof). If the system is so instructed (e.g., by the trainee/trainer) the process proceeds to state 444A, where the score is calculated and presented by the system. The trainee and facilitator/trainer can discuss the trainee's score for the portion/section, and review the correct events and errors in the scenario, and the trainee's identification and explanation of the same.

At state 446A, a determination is made as to whether there are remaining scenario segments to be played (e.g., remaining conversations with additional elements to be identified) and/or additional challenges to be performed. If there are, the process optionally proceeds back to state 416A, and the process is again performed with respect to another scenario segment.

Otherwise, optionally, the trainee is asked to describe the style of one or more scenario participants. The trainee's response is stored in system memory.

At state 448A, a user interface is provided via which an instruction can be provided to the system to display the trainee's total score for the scenario. If the system is so instructed (e.g., by the trainee/trainer) the process proceeds to state 450A. At state 450A, scoring information is calculated and provided to the trainee, the trainer, and/or other personnel via a monitor, a printout, and/or otherwise. Optionally a portion can be repeated, or an entire scenario including several portions can be presented uninterrupted or with interruptions for questions and the like. The trainee and facilitator/trainer can discuss the trainee's score for the entire module. The pre-study session, or portions thereof, and a results summary section can be accessed (e.g., via a computer terminal, a printout, or otherwise) by the user later for reinforcement purposes. The process ends at state 452A.

Optionally, in the above example, or in other example processes described herein, a user may first be asked to listen to/view a complete conversation, and is then tested on the complete conversation (e.g., without rehearing the conversation first). Optionally, in addition or instead, a user may be asked to listen to/view a segment of a conversation, and substantially immediately afterwards asked questions specifically on that segment. Optionally, a user may be asked to listen to/view a complete conversation, and then is presented with segments of that same conversation, wherein the user is tested after each segment regarding the segment. The segments can be played back sequentially, randomly, or in a different order. Optionally, the user and/or trainer can select a particular segment so that the user does not have to be tested on each segment. Optionally, the user can be scored on the particular segment, the complete conversation, or on both a segment basis and a complete conversation basis.

Figures 2, 4B:
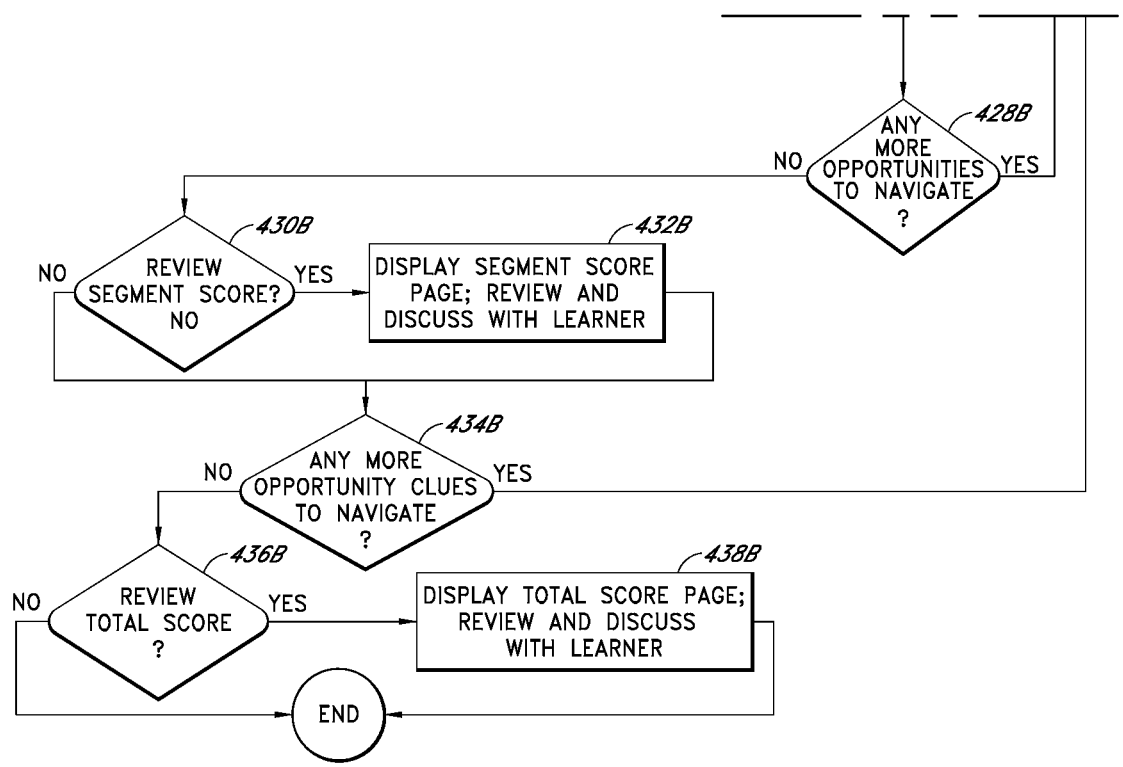

FIG. 4B illustrates another example process directed to opportunity clues and missed opportunities. The user/trainee may be asked (e.g., by the trainer reading a challenge from a user interface presented by the system, by the system articulating the challenge, by the trainee reading the challenge from a user interface present by the system, or otherwise) to verbally identify opportunity clues and/or missed opportunity clues, explain why it is an opportunity clue/missed opportunity clue, the importance of the opportunity clue/missed opportunity clue, why it is important to properly address the opportunity clue/missed opportunity clue, and explain what the participant should have done to capitalize on the opportunity clue, optionally using the pre-study language. By having the user focus on the "why", a needs-driven cognitive process is engendered, wherein the user is encouraged to better understand the opportunity presented, how that opportunity reflects a participant need, and then how to successfully respond to that need (e.g., with the appropriate product or service). An opportunity clue is a statement by a person that indicates (even if not explicitly stated or meant to be communicated) that an opportunity exists to provide the person with a product, service, solution, or recommendation. Optionally, in this example embodiment, optionally, rather than prompting the user to answer questions regarding a segment scenario via multiple choice and true/false questions, the user is queried verbally and is asked to respond verbally (e.g., with a free form answer). As previously discussed, such a "verbal" approach more closely simulates real world conditions and will in many instances better enhance training and facilitate transferability. Further, using such a "verbal" approach, a user is not able to guess a correct answer from a selection of potential answers presented to the user, as is the case with multiple choice and true and false question.

As described herein, the user may be verbally asked to identify an opportunity, state why it is an opportunity, and how the opportunity should be responded to. Such an in-depth approach facilitates training a user in approaching opportunities in an organized, methodical way to better ensure that the user can adequately respond to such opportunities in the real world, and better locks in training. For example, such an approach can help a trainee focus on a customer's (or other party) needs, rather than just jumping to offering a product or service in response to identifying the existence of an opportunity.

Thus, the approach discussed above teaches a user to identify and better understand an incorrect handling of a customer (or other party) or potential opportunities rather than simply having the user jump to the "right way" and/or solutions, thus the user is trained to think consultatively.

At state 401B, the process begins, and the trainee and/or trainer log into the training system. At state 402B, the system displays a welcome screen. The system receives a selection of a training module from a menu of training modules. For example, the different training modules may relate to different subject matter, such as different products and services. Optionally the system provides a description of the corresponding training objectives and a description of the training module. A user interface is displayed via which the trainee and/or trainer (which may be a peer) optionally selects a peer type (where the learner and/or partner indicates who their "learning partner" is for the session—a peer, their supervisor, someone whose principal job function is training, etc.).

At state 404B, a user interface is presented via which the trainee/trainer can instruct the system to display a tutorial for the learner/trainee. If an instruction is provided to launch the learner tutorial, the process proceeds to state 406B and the learner tutorial is launched. Otherwise, the process proceeds to state 408B.

At state 408B, a user interface is presented via which the trainer can instruct the system to display a tutorial for trainer. If an instruction is provided to launch the trainer tutorial, the process proceeds to state 410B and the learner tutorial is launched, and a review for the trainer is presented. Otherwise, the process proceeds to state 412B.

At state 412B, a tutorial/review that teaches terminology that will be used in the training session (e.g., "opportunity clue", "missed opportunity", "hidden need", etc.) is presented. Optionally a pre-study session is provided, which, for example, may list potential opportunity clues that might apply to the scenario they are about to view, explanations as to why the opportunity clues are opportunities, and potential products, services, solutions, and/or recommendations that correspond to the opportunities.

At state 414B, a user interface is presented via which the trainer/trainee can instruct the system to play a selected entire conversation (e.g., from a menu of conversations) or predefined segments thereof. The user interface also provides a menu of selectable challenge areas.

If an instruction is provided to play a selected conversation or a segment thereof (e.g., a relatively short segment, such as one approximately less than 30 seconds or 15 seconds in length, or shorter or longer), then at state 415B, the selected conversation or segment is played/displayed to the trainee (e.g., including video, animation, audio, and/or text). The process then proceeds back to state 414B, where another conversation can be selected.

At state 416B, the trainee is asked to verbally identify opportunities clues in the scenario. At state 418B, a scoring user interface is displayed. In this example, the answers (corresponding to the opportunity clues that occurred in the scenario) are displayed with associated check boxes. The trainer checks off each opportunity clue the trainee correctly identified, which are then stored in computer readable memory.

At state 420B, the trainee is asked (e.g., verbally asked by a trainer sitting with the trainee) to verbally identify/explain why an opportunity clue is an opportunity. At state 422B, a scoring user interface is displayed. In this example, the answers (corresponding to correct reasons why the opportunity clues in the scenario are opportunities) are displayed with associated check boxes. The trainer checks off each reason the trainee correctly identified, which are then stored in computer readable memory.

At state 424B, the trainee is asked to verbally list/state the relevant products and services available from the trainee's employer/provider that correspond to one of the reasons (e.g., the trainee is asked what products/services/solutions/referral (a referral to another service provided within or outside of the trainee's company that can provide the customer with relevant services and/or products) address the opportunity). At state 426B, a scoring user interface is displayed. In this example, the answers (corresponding to appropriate products/services/solutions corresponding to the opportunities indicated in the scenario) are displayed with associated check boxes. The trainer checks off each product/service/solution the trainee correctly identified, which are then stored in computer readable memory.

At state 428B, a determination is made as to whether there are additional opportunities to navigate. If not, the process proceeds back to state 426B, and the trainee is prompted to identify additional potential products, services, solutions, and/or recommendations. If the opportunities have been identified, the process proceeds to state 430B. A user interface is presented via which the trainer/trainer can indicate whether the score for the just completed segment is to be displayed to the trainee and/or trainer. If an indication is provided that a review is to be conducted, the process proceeds to state 432B and the segment score is calculated by the system and displayed to the trainee/trainer. The trainer reviews the score and segment with the trainee, including a review of the opportunity, and the trainee's identification and explanation of the same.

At state 434B, a determination if there are additional opportunity clues to navigate. If there are additional opportunity clues to navigate, the process proceeds back to state 418B. Otherwise, the process proceeds to state 436B. A user interface is presented via which the trainer/trainer can indicate whether the total score is to be displayed and review conducted. If an indication is provided that a review is to be conducted, the process proceeds to state 438B and the total score is calculated and displayed to the trainee/trainer. The trainer reviews the score and module with the trainee.

Optionally, during the scoring process, a trainee can receive "partial credit". Thus, even if a trainee does not receive a positive score for a question (e.g., for failing to provide a correct answer within a set of questions), the trainee can get credit for answering other related sequential questions in the set of questions. Advantageously, a wrong answer to one in a set of question optionally does not deprive the trainee of the chance to correctly answer and learn from the other related questions. For example, if the trainee fails to identify "what opportunity", the trainee can still receive a positive score if the trainee is able to correctly explain why it is an opportunity and/or explain to capitalize on the opportunity (e.g., the next correct steps to take, identification of the products or services that should be offered, etc.).

Optionally, there can be a mix of horizontal and vertical questions. For example, the trainee can be asked to first identify all errors, opportunities, and/or correct actions in a segment (horizontal questioning). As the trainee responds, the trainee is scored on how many questions the trainee correctly identified. The questions to the trainee can then dig down on each of the correct actions/errors/opportunities (e.g., by clicking on a next control) and answering the "vertical questions" (e.g., "why is it an error or an opportunity", "how should the opportunity be capitalized on"/"how should the error be fixed", etc.). Advantageously, using this process, the trainee can optionally be allowed to view the trainer's screen as the answers are not displayed to the trainer until the trainee has first provided the corresponding answer.

Optionally instead, a trainee will first be asked to list all opportunity clues first, then for the listed opportunities, explain why each one is an opportunity, and then for each listed opportunity explain how the opportunity should be responded to. Thus, in this embodiment the question flows are horizontal in nature, rather than vertical.

Optionally a scenario portion can be repeated, or an entire scenario including several portions can be presented uninterrupted or with interruptions for questions and the like.

Optionally, a scenario is targeted on very specific items. Therefore, the scenario may not always be full conversations. This may enhance the time effectiveness of the training because of the smaller "learning chunks", and enables the training to focus upon the specific areas where the trainee employer believes trainees need the most or significant improvement and/or where the employer would gain the most or significant value. For example, a segment or learning chunk may be less than 30 seconds, less than 1 minute, less than 3 minutes, 3-5 minutes, 5-10 minutes, 10-20 minutes, 30-45 minutes, or other appropriate length (e.g., as determined by the subject matter, the current abilities or job level of the trainee, etc.). The length of the scenarios can be gradually increased to gradually improve a trainee's attention span and listening comprehension. The length of the learning and listening chunks are optionally based upon user tolerance studies (e.g., that indicate how long a person at different ages and job functions are able to pay attention to a conversation), and/or repeat rates or frequency of chunk utilization with respect to a given user (e.g., how often they have gone back to repeat a given section). Thus, "snapshot" scenarios are utilized in this example both for time management purposes and to enhance focus and engagement of the user/trainee.

As previously discussed, optionally, some or all of the training sessions discussed above utilize a trainer/facilitator during the training session, although optionally training can be performed without a trainer/facilitator being present. Thus, optionally, the training sessions combine computer-based learning with a human facilitator who participates throughout or during at least a portion of the training session, and who can help guide and train the user. Optionally, the facilitator works with a trainee in a one-on-one situation, although optionally the facilitator works with more than one trainee at a time.

Optionally, the use of a computer-based training system enables the use of a relatively "untrained" facilitator, because the training system guides the facilitator, provides the facilitator with the questions/prompts for the trainee, and the substantive knowledge on which the trainee is being trained. In addition, the optional computer-based scoring further eases the burden on the facilitator. Thus, an example embodiment includes "artificial intelligence" with respect to the question and answer flows. This approach can significantly reduce training costs and provide for a relatively much larger pool of facilitators. Further, because correct answers are pre-programmed and available to the facilitator, a relatively untrained facilitator can score trainee answers objectively, even when those answers are provided verbally. Advantageously, the facilitator is not put in the position of being the one subjectively deciding that the trainee has not performed well. Rather, the computer takes on the role of the "bad guy". Therefore, even a child can be a facilitator for another child.

Certain trainees' recollection of a conversation (or a segment thereof) may differ from the correct answers presented via the training system. This may result in a trainee doubting and challenging the correct answers. In order to objectively demonstrate to the trainee that the trainee failed to identify an opportunity, a missed opportunity, an error, or a correct action, optionally objective evidence is provided to the trainee by replaying the corresponding segment to prove what occurred in the segment (e.g., in response to a manual instruction by the trainee or trainer, such as by optionally activating a scenario replay button).

In addition, optionally during scoring and/or when the trainee is answering, the trainer may activate a pre-Study button or other control (e.g., a pre-study replay button) which causes the model answer from the pre-study segment that corresponds to the answer being scored to be replayed for quick reference/verification. This enables the trainer to verify for or prove to the trainee what was said, role modeled, and/or textually presented during the pre-study session. Thus, easy access for alignment between the pre-study segment and questions is provided without multi-step navigation. By way of illustration, a pre-study replay control may be provided when testing/scoring the trainee's response to what was done correctly during a training sequence, what where the errors, why is it important to correct the errors, as well as to provide the correct guideline language. This further facilitates the practice of real world language.

Furthermore, scoring objectivity is enhanced and scoring subjectivity is reduced in scoring the answers because of the pre-programming and because questions for the trainee are optionally formulated in a focused manner, with purposely limited scope per question. A larger scope of training is optionally achieved through the combining of multiple questions and modules.

Optionally, as discussed above, the questions are asked without the answers being presented on the training system display until the trainee answers the questions. Therefore, there is no need to conceal the display from the trainee.

Optionally, the answers and scoring are verbal, but presented in a text form, audio and/or audio/video-animation form for the facilitator via the training terminal (who may not otherwise know the answers), so that the trainee does not have access to the answers before verbalizing the answers. For example, optionally the training terminal can be positioned so that the facilitator can view the questions and/or answers, and the trainee cannot (e.g., the facilitator can turn the terminal display so that the trainee cannot observe it; the trainee can be told to turn/move to a location where they cannot observe the screen, but not so far so that the facilitator and learner cannot verbally interact; the facilitator can have a separate display than the trainee). Thus, optionally, the trainee needs to articulate an identified opportunity clue, missed opportunity, or error. Therefore, unlike multiple choice questions, true/false questions, or yes/no questions, where a trainee can guess an answer, the open-ended questions discussed above are very unlikely to be correctly answered by guessing. Instead, the system trains real learning and real recall, as compared to multiple choice and true false testing, where the answer is presented to the trainee within the questions.

Further, optionally, after the trainee identifies a first opportunity clue, a missed opportunity, or error, prior to asking for the trainee to identify the next, opportunity clue, missed opportunity, or error, the trainee is asked why the first identified opportunity, missed opportunity, or error is an opportunity, missed opportunity, or error, and then is asked how to capitalize on the opportunity or how to fix the error.

Optionally, if the trainee cannot articulate all of the opportunities/missed opportunities/errors, the facilitator then provides those that were missed (e.g., lets the trainee view them on the screen or articulates them to the trainee).

Because of the verbal nature of the questions and the verbal, free form nature of answers in certain embodiments, which more closely emulates real-world interactions (as compared to simple multiple choice/true-false testing), a trainee is more easily able to transfer the learned skills and knowledge to a real world environment, where the trainee interacts with people in a verbal, free form environment.

As discussed above, training questions can be presented horizontally, vertically, or using a mixture of horizontal and vertical questioning. For example, a trainee may be presented with an entire conversation first, and is then asked to identify all of a certain event type (e.g., all errors or all opportunities) in the conversation, while being graded on the number of events the user was able to correctly identify. The user may then be asked further questions regarding the events (e.g., if the event is an error, explain why it is in error and how to avoid the error). Instead, the trainee may be asked to identify a first of the events, and then answer one or more questions about the event. Once the user has answered questions regarding the event, the user is then asked to identify the next event and to answer questions regarding the next event, and so on.

By way of further example, a segment may be played and the trainee is tested on the segment before the next segment is played. The segments can be played sequentially or out of order. By way of still further example, the entire conversation may first be played, and then, before being questioned, the conversation is replayed on a segment by segment basis, wherein the trainee is questioned after a corresponding segment regarding the segment. By way of yet further example, the entire conversation may first be played, and then, before being questioned, selected segments of the conversation are replayed (e.g., where the selected segments may be out of sequence and wherein the selected segments combined optionally do not include all the segments), wherein the trainee is questioned after a corresponding segment regarding the segment.

By way of further illustration, as similarly described above, optionally the trainee can listen to an entire scenario conversation or proceed directly to specific segments within the conversation. Optionally, the trainee first listens to an entire scenario, can take notes on viewed opportunity clues, missed opportunities, and/or errors, and then review and be tested on the scenario a segment at a time. Thus, certain example embodiments provide a built-in segmented approach, as well as a "total conversation" approach. Optionally, a given segment is a self-contained "learning module". Therefore, the facilitator can stop the training session (e.g., if there is not sufficient time to complete the entire scenario), and then come back and pick up at the next segment. Further, the segment approach enables the facilitator and trainee to focus on segments where the trainee needs to improve and/or that are considered to be more important. In addition, optionally the performance can be scored for each segment.

Optionally, the training processes described above can be performed periodically, on an ongoing basis using the same, similar, or different scenarios/segments of the same or different lengths (e.g., optionally in increasing length to help increase a trainee's attention span). For example, a trainee can be presented with a training segment, every day, week, month, 6 months, year, or other period to reinforce the trainee's skills. Different situations, opportunities, and/or errors can be presented to enhance learning.

An example scenario will now be described in greater detail. The following scenario relates to a banker interacting with a prospect. Errors made by the banker are identified. The user is asked to identify why the errors are errors and/or why it is important to correct the error, and what should the banker have done differently. In addition, example model/guideline banker language is provided to the user which would be more appropriate than the language used by the banker.

| Banker | Prospect | Appropriate Guideline Language |
|---|---|---|
| Okay Mr. Jenkins, your checking account is now opened. I'm so glad you decided to bank with XYZ Bank. We do consider ourselves to be a little different here at XYZ bank. | Karl Jenkins. Really? How so? | |
| Well, we pride ourselves on building relationships with our clients versus many other banks out there who sometimes only know you as just an account number. | Yeah, that's true. I had that experience at my bank in Texas. | |

-continued

| Banker | Prospect | Appropriate Guideline Language |
|---|---|---|
| As a financial services representative here, I make it my standard practice to maintain an understanding of my clients' overall financial picture so that I'm best positioned to make proactive recommendations to help you be more financially successful. | Great! | |
| I'd like to conduct a Client Service Review right now if that's okay. (Error PB1) | Well, I'm not sure. Just what is the Client Service Review? I'm not sure I understand how it will help me. | Banker: What I will do is ask some questions in a few areas to make sure we understand your current financial needs and your financial needs for the next 6 to 12 months. The whole process will take about 10 minutes depending on the complexity of your financial situation. May I conduct a Client Services Review right now? Prospect: Okay. I actually have a little extra time, but I do have an appointment that I will need to leave for in 15 minutes. Banker: That's just fine. I'll do a time check with you at about 7-8 minutes to make sure we keep to your available time. |
| The process will help me look for ways to help you make more money, as well as save money, save time, and find added convenience in your banking relationship with our bank. Can we get started? (Errors PB2 and PB3) | Oh, now I understand. I've never had anyone do this for me before. I do have the time right now, so let's get started. | Error PB2 Banker: The process will help me look for ways to help you make more money, as well as save money, save time, and find added convenience in your banking relationship with our bank. Everything we discuss will be kept totally confidential and the process is free. Do you mind if I take some notes while we chat? Prospect: I've never had anyone do this for me before. I do have the time right now, so let's get started. Error PB3 Banker: The process will help me look for ways to help you make more money, as well as save money, save time, and find added convenience in your banking relationship with our bank. Everything we discuss will be kept totally confidential and the process is free. Do you mind if I take some notes while we chat? Prospect: I've never had anyone do this for me before. I do have the time right now, so let's get started. |
| Borrowing (Credit) Great! So first, let's take a look at any borrowing needs that you may have. (Error PB4) | Okay. | Banker: Great. Well, since you came in to open a checking account, I think it makes sense to begin by exploring your day-to-day banking transaction needs to see where we might be able to help you. Prospect: Okay. Banker: What other transactional accounts do you have with any other financial institutions? |
| I'm wondering if you or anyone in your family may have spoken about any needs to borrow money anytime within the next six to twelve months? (Error PB5) | Hmmm. I can't think of anything we would need to borrow for. | Banker: One way in which I help my clients is by making sure they have access to funds for any major purchases they may be making. I'm wondering if you or anyone else in your family may have spoken about any needs to borrow money within the next six to twelve months? Prospect: Well, my wife and I have been talking about moving out of our apartment and buying a house sometime in the next 3 to 6 months. We've been saving for a down payment for a few years. |
| Have you thought about purchasing a house? | Well, my wife and I have been talking about moving out of our apartment and buying a house sometime in the next 3 to 6 months. We've been saving for a down payment for a few years. | |
| Excellent. This is an area I think we can help really streamline the borrowing process so that it is fast and easy for you. We could meet with your real estate agent when you're ready to start looking and work with them to get your home loan all lined up. | That would be great. Since this is our first time buying a house, we can use all the help we can get. | |

| Banker | Prospect | Appropriate Guideline Language |
| --- | --- | --- |
| Well we can definitely help! Let's move on to the deposit and investment area. (Error PB6) | Okay. | Banker: How about any other needs to borrow that may be within that next 6-to-12-month time frame. It could be buying a new car, perhaps paying for a long overdue vacation, maybe paying for that evening college class. Prospect: No, not that I can think of. The house will keep us pretty busy. |
| Deposit & Investment Let's now focus on your savings for the future. What amounts do you have on deposit, such as in a savings account, with other institutions? We may be able to get you a higher rate of return than another institution. (Error PB7) | Well, I do have my savings account at my Bank back in Texas, and am thinking about transferring my money here and opening up a Savings Account with you guys soon. In fact, before our meeting, I picked up a brochure and looked at some of the savings accounts you offer, but I haven't made up my mind on any one of them yet. | Banker: Let's now focus on your current and future deposit and investment needs. We may be able to get you a higher rate of return on your deposits, or investments, simplify your banking by consolidating accounts, or helping you plan for retirement. May I ask, what amounts do you currently have on deposit or as investments with other financial institutions, including retirement accounts? Prospect: Well, I have my savings account at my Bank back in Texas, and am thinking about transferring my money here and opening up a savings account with you guys soon. In fact, before our meeting, I picked up a brochure and looked at some of the savings accounts you offer, but I haven't made up my mind on any one of them yet. |
| Okay. Well, when you decide on the one, you want to open, just give the branch a call, or stop in and someone will help you set one up. (Error PB8) | Great! Thanks. | Banker: I can definitely assist you in figuring out which savings account would be best suited to meet your needs. I can also refer you to one of our Investment specialists who can identify alternative investment options providing a higher rate of return on your savings. In the next six to twelve months are you expecting any additional income that could be invested? Maybe a raise, a bonus, or proceeds from a sale? Prospect: No, I'm not expecting any additional money. |
| Alright, let's continue on into the next area. (Error PB9) | Okay. | Banker: Also, we want to be able to plan how to invest any new funds that may be available to you now or in the future. Are you expecting any additional income such as a raise, bonus, or sales proceeds during the next six to twelve months? Prospect: No, I'm not expecting any additional money. |
| Day-to-Day Banking Services Okay, Mr. Jenkins, in order to help simplify your finances, could you tell me if you have any other checking accounts with your Bank in Texas? (Errors PB10 and PB11) | No this is the only checking account I have. You know, you said this review would take about 10 minutes, and it has been 8 minutes. I have to get going to another appointment. Are we just about finished? | Error PB10 Banker: Okay, Mr. Jenkins, by understanding your needs in the day-to-day banking services area, we may be able to simplify your financial matters and provide you with the convenience of one-stop banking by consolidating accounts. Prospect: Okay. Error PB11 Banker: Tell me, how many different checking accounts, savings accounts, or credit cards do you have elsewhere in addition to what you have at the bank in Texas? Prospect: I have a savings account at the Texas Bank that I am thinking about transferring to this bank. |
| Yes, actually I am. I'll just take a few minutes to summarize my recommendations. (Errors PB12 and PB13) | | Error PB12 Banker: I do have the area of insurance and other financial services to go over with you to ensure I have a complete picture of your financial health; however, we can schedule another time to finish our review. I have availability tomorrow afternoon. Would 2:00 p.m. work for you? Prospect: That time will work for me. Error PB13 Banker: You are right; it has been 8 minutes and I definitely want to keep my commitment to get you out on time for your next appointment. I do have the area of insurance and other financial services to go over with you to ensure I have a complete picture of your financial health; however, we can schedule another time to finish our review. Before we do this though, I would like to take just a few minutes if this is okay with you to go over my initial recommendations, and then see what might be some appropriate next steps. Is this okay? Prospect: Yes, that would be fine. |

-continued

| Banker | Prospect | Appropriate Guideline Language |
|---|---|---|
| Borrowing Recommendations I have several thoughts in terms of recommendations based on the needs we've discussed here today. Let's start with the area of borrowing; you indicated you and your wife will be looking to buy a home within the next 6 months. Since it is never to earlier to get the mortgage approval process in motion, I really think it would be wise for you to speak with our mortgage lending specialist. My colleague's name is Sam O'Neill. I've had several of my clients work with him. | You know, that does sound like a good idea. | |
| Why don't you go ahead and give Sam a call. You can reach him through the bank receptionist. (Error PB14) | Okay . . . | Banker: Sam works out of our office several days during the week. I know he's going to be here in two days, on Friday. Could we arrange a time on Friday for you and your wife to meet Sam, here at the bank? What time would work for you? Prospect: We can probably be here around 10:00 a.m. Banker: Great! I will check with Sam to make sure this time works for him. Either he or I will call you back to confirm. What's the best number to reach you at? Prospect: 555-2824. |
| Deposits and Investments Recommendations Now in terms of your deposits and investments, you mentioned the savings account at your bank in Texas. You may want to consider placing this money in a vehicle other than a savings account where you can earn a higher rate of return. I really think it would be wise for you to speak with our investment specialist. Her name is Ann Smith. She can help you go over all the options available to you as you prepare to move the money from your bank in Texas. | Oh, that sounds like an excellent idea. I've been thinking lately about what we need to do to begin planning for retirement. I know it is many years away, but I see how my parents struggle and I don't want that for my wife and me. | |
| Ann can definitely help you. She has worked on retirement plans for my husband and me, and did an excellent job. Ann works out of our office on Wednesdays. I know she's going to be here 1 week from today, next Wednesday. Could we arrange a time next Wednesday for you and your wife to meet Ann, here at the bank? What time would work for you | Next Wednesday will be good. We can probably be here around 4:00 p.m. | |
| Well, I hope you've seen value in our discussion? (Error PB15) | Ah, yes I have. Thank-you for offering to review my financial situation. | Banker: Great! I will check with Ann and double-check that this time works for her. Either she or I will call you back to confirm the appointment. Since the appointment is a week away, I will give a reminder call a few days before the appointment, say on Monday. What's the best number to reach you at? Prospect: 555-2824. |
| You are very welcome. It was my pleasure and welcome to XYZ Bank. (Error 16) | Thanks! | Banker: You are very welcome. It was my pleasure. As a matter of fact, I'm always looking for ways to help others in the same way and I'm wondering if you might know anyone else who would benefit from a similar level of service? Prospect: No, not really. Banker: What about a work colleague, family member? Maybe a friend? Prospect: No, no one at this time. Banker: Well if you do think of someone, please feel free to give them my name and telephone number. Welcome to XYZ Bank. |

The following table illustrates example questions regarding the foregoing scenario that are provided to the user/trainee. A user/trainee may be asked to identify an error, explain why it is an error, and explain what the banker should have done differently. The user/trainee may also be asked to describe the banker's overall style (e.g., including the correctness and/or incorrectness of the style), and to identify problems or advantages with respect to the banker's style. Optionally, the user/trainee may be queried with respect to the body language of the banker and/or the prospect (e.g., "does the banker's body language appear to radiate confidence or a lack of confidence", "does the prospect look uncomfortable with the banker's questions or answers," etc.) The user's responses can be separately scored and/or a cumulative score can be calculated, stored, and reported.

The questions can be orally asked and/or displayed by the training terminal or asked by a trainer. The user/trainee can be asked to verbally respond and/or the user can be asked to type in a response via the terminal or select a response in a multiple choice and/or true/false format. The following table includes a "portion" column indicating what portion or sub-portion of the scenario the event occurs (e.g., beginning, middle, end). An Error ID column lists an identifier associated with the error being tested on. The user is queried as to why an event is an error and what the banker should have differently. Model answers are provided. In addition, model guideline language is provided for what the banker should have said.

| Portion | Error ID | State one/another Technique Error that you heard the Banker make. | Why is that an error? | What should the banker have done differently? | Appropriate Guideline Language |
|---|---|---|---|---|---|
| Beg. | PB1 | The Banker does not thoroughly explain the process of a Client Service Review. | The Banker does not explain to the Prospect fully what a Client Service Review entails and therefore, would be less likely to agree to the process. | The Banker should have . . . 1. Explained that the process entails answering some questions in a few areas. 2. Explained the process should take about 10 minutes. | Banker: What I will do is ask some questions in a few areas to make sure we understand your current financial needs and your financial needs for the next 6 to 12 months. The whole process will take about 10 minutes depending on the complexity of your financial situation. May I conduct a Client Services Review right now? Prospect: Okay. I actually have a little extra time, but I do have an appointment that I will need to leave for in 15 minutes. Banker: That's just fine. I'll do a time check with you at about 7-8 minutes to make sure we keep to your available time. |
| Beg. | PB2 | The Banker does not explain the Client Service Review is free. | The prospect may not agree if they believe the process has a fee associated with it. | The Banker should have . . . 1. Explained that it is cost free. | Banker: The process will help me look for ways to help you make more money, as well as save money, save time, and find added convenience in your banking relationship with our bank. Everything we discuss will be kept totally confidential and the process is free. Do you mind if I take some notes while we chat? Prospect: I've never had anyone do this for me before. I do have the time right now, so let's get started. |
| Beg. | PB3 | The Banker does not explain the Client Service Review is confidential. | The prospect may not agree if they believe the information shared could be communicated to others. | The Banker should have . . . 1. Explained that it is confidential. | Banker: The process will help me look for ways to help you make more money, as well as save money, save time, and find added convenience in your banking relationship with our bank. Everything we discuss will be kept totally confidential and the process is free. Do you mind if I take some notes while we chat? |

-continued

| Portion | Error ID | State one/another Technique Error that you heard the Banker make. | Why is that an error? | What should the banker have done differently? | Appropriate Guideline Language |
|---|---|---|---|---|---|
| | | | | | Prospect: I've never had anyone do this for me before. I do have the time right now, so let's get started. |
| Middle 1 | PB4 | The Banker starts with the borrowing (credit) category. | According to the Prospect, their main goal was opening up a Checking Account, and the Banker's first question about borrowing (credit) needs is an unnatural transition. | The Banker should have . . . 1. Asked the Prospect a day-to-day banking services needs question first. | Banker: Great. Well, since you came in to open a checking account, I think it makes sense to begin by exploring your day-to-day banking transaction needs to see where we might be able to help you. Prospect: Okay. Banker: What other transactional accounts do you have with any other financial institutions? |
| Middle 1 | PB5 | The Banker did not explain the benefits of asking questions in the borrowing (credit) category before asking a question. | The prospect has no context for why asking a question in the borrowing (credit) category could have relevance for them. | The Banker should have . . . 1. Explained that understanding the Prospect's needs in the borrowing (credit) category can ensure access to funds for major purchases. | Banker: One way in which I help my clients is by making sure they have access to funds for any major purchases they may be making. I'm wondering if you or anyone else in your family may have spoken about any needs to borrow money within the next six to twelve months? Prospect: Well, my wife and I have been talking about moving out of our apartment and buying a house sometime in the next 3 to 6 months. We've been saving for a down payment for a few years. |
| Middle 1 | PB6 | The Banker left the borrowing (credit) category prematurely. | The Prospect may still have Credit Needs, though he may not think about them in terms of borrowing money and may need additional prompting to disclose the information. | The Banker should have . . . 1. Asked additional prompts, such as any plans to buy a car, go on a holiday, pay for tuition, and/or pay for taxes. | Banker: How about any other needs to borrow that may be within that next 6-to-12-month time frame. It could be buying a new car, perhaps paying for a long overdue vacation, maybe paying for that evening college class. Prospect: No, not that I can think of. The house will keep us pretty busy. |
| Middle 2 | PB7 | The Banker did not fully explain the benefits of asking questions in the deposit and investment category before asking a question. | The prospect has no context for why asking a question in the deposit and investment category could have relevance for them. The Prospect may have other funds on deposit besides a savings account that the Banker did not uncover. | The Banker should have . . . Explained the benefits of asking questions in the deposit and investment category: 1. Making them money 2. Saving them money 3. Simplifying finances by consolidating 4. Planning for retirement. | Banker: Let's now focus on your current and future deposit and investment needs. We may be able to get you a higher rate of return on your deposits, or investments, simplify your banking by consolidating accounts, or helping you plan for retirement. May I ask, what amounts do you currently have on deposit or as investments with other financial institutions, including retirement accounts? Prospect: Well, I have my savings account at my Bank back in Texas, and am thinking about transferring my money here and opening up a savings account with you guys |

| Portion | Error ID | State one/another Technique Error that you heard the Banker make. | Why is that an error? | What should the banker have done differently? | Appropriate Guideline Language |
|---|---|---|---|---|---|
| | | | | | soon. In fact, before our meeting, I picked up a brochure and looked at some of the savings accounts you offer, but I haven't made up my mind on any one of them yet. |
| Middle 2 | PB8 | The Banker leaves the decision of choosing a savings account in the Prospect's hands. | It is the Banker's responsibility to assess which savings account would best suit the Prospect's needs. The Banker should capitalize on the opportunity for the bank rather than risk losing the account by leaving it in the Prospect's hands. | The Banker should have . . . 1. Informed the Prospect that she could open the right savings account today. 2. Referred the Prospect to the Bank's investment specialist. 3. Asked about new funds such as a raise, bonus, sale proceeds, etc., in the next six to twelve months. | Banker: I can definitely assist you in figuring out which savings account would be best suited to meet your needs. I can also refer you to one of our Investment specialists who can identify alternative investment options providing a higher rate of return on your savings. In the next six to twelve months are you expecting any additional income that could be invested? Maybe a raise, a bonus, or proceeds from a sale? Prospect: No, I'm not expecting any additional money. |
| Middle 2 | PB9 | The Banker left the deposit and investment category prematurely. | The Prospect may still have. The Prospect needs additional prompting to disclose deposit and investment needs related to additional income. | The Banker should have . . . 1. Asked additional prompts, around additional potential income such as a raise, bonus, and/or sales proceeds. | Banker: Also, we want to be able to plan how to invest any new funds that may be available to you now or in the future. Are you expecting any additional income such as a raise, bonus, or sales proceeds during the next six to twelve months? Prospect: No, I'm not expecting any additional money. |
| Middle 3 | PB10 | The Banker did not explain the benefits of asking questions in the day-to-day banking services category before asking a question. | The prospect has no context for why asking a question in the day-to-day banking services category could have relevance for them. | The Banker should have . . . 1. Explained that understanding the Prospect's needs in the day-to-day banking services category can simplify financial matters. 2. Explained that understanding the Prospect's needs in the day-to-day banking services category can provide the convenience of one-stop banking by consolidating accounts. | Banker: Okay, Mr. Jenkins, by understanding your needs in the day-to-day banking services area, we may be able to simplify your financial matters and provide you with the convenience of one-stop banking by consolidating accounts. Prospect: Okay. |
| Middle 3 | PB11 | The Banker asks about checking accounts at the | The prospect may also have other checking accounts | The Banker should have . . . 1. Asked the | Banker: Tell me, how many different checking accounts, savings |

-continued

| Portion | Error ID | State one/another Technique Error that you heard the Banker make. | Why is that an error? | What should the banker have done differently? | Appropriate Guideline Language |
|---|---|---|---|---|---|
| | | Texas Bank only. | outside of the Texas Bank, but the Banker has not asked about them. | Prospect about any other transaction accounts that they may have at all other financial institutions. 2. Asked the prospect about other transaction accounts that they may have with the Texas Bank. | accounts, or credit cards do you have elsewhere in addition to what you have at the bank in Texas? Prospect: I have a savings account at the Texas Bank that I am thinking about transferring to this bank. |
| Middle 3 | PB12 | The Banker skips the insurance and other financial services category. | The insurance category is a significant area that needs to be covered in order to meet all of the Prospect's needs. | The Banker should have . . . 1. Suggested getting together another time to complete the review. 2. Explained the importance of covering the insurance and other financial services category to ensure having a full picture of the client's financial health. | Banker: I do have the area of insurance and other financial services to go over with you to ensure I have a complete picture of your financial health; however, we can schedule another time to finish our review. I have availability tomorrow afternoon. Would 2:00 p.m. work for you? Prospect: That time will work for me. |
| Middle 3 | PB13 | The banker does not acknowledge the prospects concern about going longer than 10 minutes. | Since time is short, another option to complete the Client Services Review needs to be presented to the prospect. | The Banker should have . . . 1. Acknowledged the time overage. 2. Explained they would like to schedule a time to complete the Client Services Review 3. Explained they would take just a few minutes to briefly go over recommendations and next steps. 4. Acknowledged the time overage and suggested getting together another time to complete the review. 5. Asked permission from the prospect to continue by | Banker: You are right; it has been 8 minutes and I definitely want to keep my commitment to get you out on time for your next appointment. I do have the area of insurance and other financial services to go over with you to ensure I have a complete picture of your financial health; however, we can schedule another time to finish our review. Before we do this though, I would like to take just a few minutes if this is okay with you to go over my initial recommendations, and then see what might be some appropriate next steps. Is this okay? Prospect: Yes, that would be fine. |

-continued

| Portion | Error ID | State one/another Technique Error that you heard the Banker make. | Why is that an error? | What should the banker have done differently? | Appropriate Guideline Language |
|---|---|---|---|---|---|
| End | PB14 | The Banker does not follow through by arranging a date and time for the prospect to meet the mortgage lending specialist . . . | The bank may miss an opportunity by leaving contact with the mortgage lending specialist in the hands of the prospect. | going over the banker's recommendations. The Banker should have . . . 1. Scheduled a tentative date and time for the prospect to meet the mortgage lending specialist. 2. Explained they would confirm the date and time with the mortgage lending specialist and then contact the prospect to confirm the appointment. 3. Gotten contact information. | Banker: Sam works out of our office several days during the week. I know he's going to be here in two days, on Friday. Could we arrange a time on Friday for you and your wife to meet Sam, here at the bank? What time would work for you? Prospect: We can probably be here around 10:00 a.m. Banker: Great! I will check with Sam to make sure this time works for him. Either he or I will call you back to confirm. What's the best number to reach you at? Prospect: 555-2824. |
| End | PB15 | The Banker does not indicate how the proposed date and time will be confirmed with the investment specialist. | The prospect may show up for the appointment and the investment specialist may not know about the appointment. | The Banker should have . . . 1. Explained they would confirm the date and time with the investment specialist and then contact the prospect to confirm the appointment. 2. Gotten contact information. | Banker: Great! I will check with Ann and double-check that this time works for her. Either she or I will call you back to confirm the appointment. Since the appointment is a week away, I will give a reminder call a few days before the appointment, say on Monday. What's the best number to reach you at? Prospect: 555-2824. |
| End | PB16 | The Banker does not ask for a referral (an offer to assist). | 1. The banker may miss an opportunity to assist someone else. 2. The banker may miss an opportunity to build their network. 3. The banker may miss an opportunity to build the banks book of business. | The Banker should have . . . 1. Offered to assist others in the same way they assisted the Prospect. | Banker: You are very welcome. It was my pleasure. As a matter of fact, I'm always looking for ways to help others in the same way and I'm wondering if you might know anyone else who would benefit from a similar level of service? Prospect: No, not really. Banker: What about a work colleague, family member? Maybe a friend? Prospect: No, no one at this time. Banker: Well if you do think of someone, please feel free to give them my name and telephone number. Welcome to XYZ Bank. |

Another scenario will now be described. The following scenario includes a 39 second conversation between a banker and a prospect regarding a savings account that includes missed opportunities,

| Banker | Prospect |
|---|---|
| Welcome to Breakthrough Performance Bank. I'm Kevin Johnson. How can I help you? | I'm interested in opening a savings account. (Request Identified) |
| Certainly. I can do that for you. May I have your name, please? | Tom Lopez. |
| Thank you, Mr. Lopez. Do you currently have any accounts at our bank? | No, I don't. I noticed the advertisement on your front door for the interest bearing checking account. I like the interest rate (OPT ID 1). |
| Do you live nearby? | Not yet, but I'm here for a week looking at some homes. I think I found a really nice condominium in the center of town (OPT ID 2) (OPT ID 3). In fact, I've decided to start my own consulting business here. (OPT ID 4) |
| That's fantastic. Congratulations. | Thank you. I'm looking forward to this change. |

A. Opportunity Identification Loops

The following illustrates an example segment or entire session, illustrating how each opportunity clue is covered (identification of opportunity, why it is an opportunity, and how the opportunity can be addressed by a given product/service) before proceeding to the next clue.

| # | OPT ID | Request | Clue | Needs → Products/Services |
|---|---|---|---|---|
| 1 | | Open a Savings Account. | | Savings Account |
| 1 | OPT ID 1 | | Likes the interest offered on the interest-bearing checking account. | High interest bearing accounts → Interest bearing checking account<br>Higher returns → Investment products/services |
| 1 | OPT ID 2 | | Looking for homes and thinks he found a condominium in the center of town. | Help with financing the house → Mortgage loan<br>Protect loan → Mortgage Insurance<br>Protect home contents → Home contents insurance |
| 1 | OPT ID 3 | | Moving to the area soon. | Transfer accounts here<br>Transactional accounts → Checking account, direct deposit, savings account, money market account, safe deposit box<br>CDs<br>Account protection → Overdraft protection<br>Link to Overdraft Credit facility<br>Facilities to pay bills from account and withdraw cash → Automatic Bill Pay; ATM/Debit card<br>Access to account by telephone → Telephone banking<br>Access to account by Internet → Online Banking |
| 1 | OPT ID 4 | | Will be starting his own business. | Access to borrowing → Business lines of credit and loans<br>Financing for office space → Mortgage or other loan<br>Transactional services → business checking account, payroll processing, business ATM/Debit, direct deposit, business savings account |

As previously discussed, certain embodiments can significantly improve the trainee's/learner's ability to listen and comprehend what others say and mean, and thus their listening comprehension, and can improve the learner's short term memory. Further, certain embodiments can aid learners in becoming more emotionally intelligent by training them to better understand others.

By way of example, the training system can interactively develop and enhance the learner's ability to focus, pay attention to and accurately restate/paraphrase/quote/summarize what others say and mean, by playing a scenario segment and asking the learner to summarize, repeat or paraphrase what was said by one or more of the people in the scenario. The training system can also train the learner how to prioritize what one or more of the people in the scenario (e.g., indicate that relative importance of what was said). Such training will also improve or sharpen the learner's short-term memory by helping the learner to retain for longer periods what was initially in their short-term memory. Similarly, the learner's long term memory can be enhanced. Optionally, the learner may be instructed to, encouraged to, allowed to, and/or prohibited from taking notes while watching/listing to a scenario. Optionally, the training will aid the learner in concentrating on the more significant utterances of scenario participants when taking notes so that the notes are more useful and relevant. Thus, they learn how to prioritize what types of notes should be taken. Skills and memory enhancement provided by such training can be utilized in many fields, in business and in personal situations, by the young and the elderly.

Many people, whether in or outside of business settings, are not very effective listeners, and often do not listen to and respond to the given reality presented in a conversation. Common memory deficits include difficulties in remembering names, facts, plans, and other information presented during a conversion. Indeed, many people forget within a very few seconds much of what was said to them during a conversation.

Therefore, many managers, especially those involved in and/or responsible for servicing customers, express a desire for an improvement in their managers' and employees' listening effectiveness. Further, many people would like to improve their ability to listen and retain what they heard in social and personal situations.

Listening effectiveness can include not only "paying attention," but also hearing, interpreting and truly understanding what is both said and "meant" by the speaker. As similarly discussed above, this may include "listening between the lines" and picking up subtle meanings from what is being communicated, as well as being able to "read" the expressions and body language, tonal expressions, and/or style (e.g., verbal style, such as a style that indicates emotion, such as anger, wistfulness, hesitancy, lack of self assurance, etc., wherein the style can include frequent pauses, repeated phrases, high volume, rapid speech, etc.) of the individual/group who is being listened to, and reaching conclusions based upon some or all of the foregoing. Problems in listening effectiveness can also be reflected in a person's inability listen to what is being communicated by another/others and then to quote and/or restate in the person's own words what the person "believes" she or he heard.

Certain embodiments train users in improving their listening and general communication effectiveness, their ability to pay attention, focus on certain words, read between the lines, their emotional intelligence, as well as their ability to critically analyze what has been said, to prioritize the importance of what was said, to summarize what was said, and their observational skills. Further, certain embodiments train users in effective note taking. For example, by training users how to remember what was said, prioritize what was said, and summarize what was said, users can take more accurate, shorter notes. Thus, users will have more time to pay attention to a speaker rather than becoming distracted by the note taking process itself.

Certain embodiments enhance a trainee's ability to accurately restate what has been said/meant, as such an ability will build credibility and trust from the point of view of the "speaker" with respect to the listener. In particular, the credibility and trustworthiness of the listener will be enhanced, as the speaker will have evidence (in the form of the listener's ability to accurately restate what the speaker has said and meant) that the speaker has "truly been heard".

Often when people state something, they are not communicating what they really mean. If a person makes a statement, and that statement is repeated back to them, the person would often realize that the statement failed to communicate what was intended. Thus, by being able to accurately restate what was literally said in a real world environment (e.g., where the trainee is speaking with a real customer and restating what the customer said), to the extent that the trainee's restatement does not accurately reflect what the speaker meant (even if the restatement does accurately reflect what was literally said), the restatement still provides the speaker/customer with the opportunity to "correct" or clarify their prior statement as a result of hearing what they had said expressed by another person.

The ability to enable the speaker to correct or clarify what was said after hearing a restatement is particularly helpful in ensuring that the listener does not reach incorrect conclusions based on a misunderstanding of what the speaker said and/or meant.

Further, in training a user to be able to accurately restate what is heard, the user's ability to utilize their short term memory is enhanced as is their ability to coordinate their short term memory with their articulation of what they have recently heard. The user's ability to restate facts, names (e.g., of people introduced at a meeting or dinner party), and other information is thereby significantly increased.

Thus, rather than merely telling people, such as employees, children, spouses, teachers, an interactive training system teaches users how to listen. Example applications include but are not limited to the following:

Business situations (e.g., business person listening to customer);
Social situations;
Parents listening to children;
Children listening to children;
Spouse listening to spouse;
Teacher listening to children;
Child listening to teacher;
Other social, business, education situations.

The communication comprehension techniques, processes and systems described herein can be used to teach "street smarts". For example, a user can be trained to help a minor identify (e.g., from information that can be inferred from the content of a speakers communication, the speaker's tone, verbal style, body language, etc.) and avoid or neutralize a coercive situation regarding, by way of example, drugs, sex, skipping homework, illegal activities, gangs, etc.

Users can be similarly trained to be aware of what causes arguments, hostile debates, escalation into violence, etc., identify when a situation is tending toward one or more of the foregoing, and to neutralize or avoid such escalation. By way of further example, users can be trained to more effectively negotiate by identifying clues provided by a negotiating partner indicating how the partner truly feels about a current offer, whether the partner is frustrated, impatient, pleased, etc. By way of yet further example, users can be trained to mediate or perform conflict resolution between two or more people.

The training can include "challenging" a user after viewing at least a portion of a training segment regarding the contents of the training segment. By way of example, a challenge includes one or more of the following queries:

direct questions;
a request that the user summarize what was said or specified portions thereof;
a request that the user paraphrase/restate what was said or specified portion thereof;
a request that the user identify and/or prioritize what was the most important and/or least important communication(s) uttered by a training character, and provide as explanation as to why it is the most/least important, what evidence supports the conclusion (e.g., both in terms of words and verbal style) regarding the importance level;
describe that the user thought of the style and/or word choice of the speaker;
explain what the speaker meant, even it not directly expressed;
explain what led the user to the conclusion regarding what was meant (e.g., in terms of what the speaker said, the speaker's tone, the speaker's body language), etc.

Example embodiments of a listening comprehension system will now be described in greater detail. The example system will enhance the trainee's ability to:

listen for and repeat back literal facts and information (e.g., names, numbers, directions, dates, financial amounts, future plans, historical information, etc.), optionally in their own words (e.g., paraphrasing); and/or listen for what is meant (if not literally stated) and to "listen (read) between the lines", in order to enhance the trainees ability to gain a true understanding of what the speaker meant.

As similarly discussed above with respect to other example processes, a scenario can include a single participant (e.g., speaking in a monologue directly to the learner) or can include several participants conversing (e.g., in a social setting, such as at a party or dinner, at a business meeting, etc.). For example, a participant can be or play the part of a manager, a subordinate, a fellow employee, a customer, a prospective customer, a family member, a teacher, a student, a doctor, a patient, a neighbor, a friend, an acquaintance, etc. A scenario can include one or more avatars/animated figures, video footage of a real person, and/or can include an audio track without a video/animation. Optionally, a pre-study session (e.g., directed to key elements), such as discussed above, is not provided.

In an example embodiment, after a scenario/communication ends, the learner is asked to verbally state what the learner heard. For example, the learner may be asked (e.g., via a prompt provided by the system verbally and/or via a screen display, by a facilitator, via a printed handout/book, or otherwise) to verbally (and/or in writing) state what the learner believes are the key points (the more significant facts, information, etc.) expressed by the speaker(s). In addition or instead, the learner may be asked to restate/paraphrase/quote what was said in the conversation. Optionally, the learner is asked to state the names of the participants mentioned during the scenario and/or other specific factual information stated during the conversation (e.g., phone numbers, dates, etc.).

After the listener restates, paraphrases, and/or quotes what was said, some or all of the scenario/conversation that corresponds to what the listener is restating/paraphrasing/quoting can be replayed (e.g., in response to facilitator and or learner instruction). This enables the listener to hear/see how correct or incorrect the restatement/paraphrase/quote was. Further, the replay enables the facilitator to discuss the listener's performance. Similarly, if the listener has stated the names of scenario participants, the system can display images/animations/videos of the participants stating their name (or other facts) and/or with the participants' name displayed to the listener.

As similarly discussed above with respect to other training processes (some or all of which may be combined herewith), the correct answers-key points are pre-programmed, stored in memory, and displayed via a terminal to the facilitator for scoring/discussion so that the facilitator does not simply provide subjective scoring and optionally does not need to be previously trained in order to score the listener. Optionally, the facilitator/scorer can immediately provide the listener with scoring information and let the learner know how well they have done.

By way of illustration, optionally for a given restated/quoted/paraphrased statement by the learner, the facilitator/scorer asks the learner what was actually "meant" by the speaker (e.g., based on the choice of words, verbal style (which may indicate that the speaker means the opposite of the literal language), vocal inflections, vocal amplitude, use of sarcasm, enthusiasm, exaggeration, etc.). The facilitator can compare the learner's response with pre-programmed answers stored on the system and displayed to the facilitator.

The facilitator can then score the learner's response based on how closely the learner matched the pre-programmed answers.

Optionally, the facilitator/scorer then asks the learner to state (e.g., to verbally state) the order of importance of what they have heard from one or more scenario participants. The facilitator/learner can then score the learner's ordering based on pre-programmed answers as similarly described above. Optionally, the facilitator/scorer then asks the learner to justify/explain this order of importance. The facilitator/learner can then score the learner's explanation based on pre-programmed answers as similarly described above.

Optionally, in order to emulate more closely real world conditions, a scenario is presented in relative short segments (e.g., 10 seconds to 1 minute), that are complete in and of themselves, and the learner is queried as similarly described above after a given segment. Optionally, in order to gradually increase a trainee's retention capabilities, the length of the scenarios presented to the trainee are gradually increased, wherein the trainee is queried/tested after a given segment.

For example, optionally, initially, the scenarios presented to the trainee are relatively short (e.g., 10 to 15 seconds, or 5 to 30 seconds, etc.) in length, as referred to as micro-scenarios, also referred to as scenario snapshots. As the learner's brain is "trained" to retain and/or better comprehend what is said during training scenarios, increasingly longer scenarios (e.g., 15 seconds to 1 minute, 30 seconds to 5 minutes, 5 minutes to 30 minutes, etc.) are presented by the system to the trainee to increase retention capabilities.

Scored questions can involve asking the learner to re-state what they heard, such as:
What was said during the conversation?
What were the key elements of the conversation?
What was important to the speaker?
What did they mean by what they were saying?
Why are they telling you this information?
What was the speaker's overall style?

Optionally, after a scenario is played, the user is queried with a first set of questions as similarly discussed above, and then after a delay, some or all of the first set of questions is repeated to further test the trainee's retention. As similarly described above with respect to shorter-term memory training, after the trainee answers one or more questions regarding a scenario/segment some or all of the scenario/conversation that corresponds to what the listener is restating/paraphrasing/quoting/explaining can be replayed. Similarly, if the trainee has stated the names of scenario participants, the system can display images/animations/videos of the participants stating their name and/or with the participants' name displayed to the trainee.

Short drills can be provided periodically (e.g., approximately every 15 seconds or other interval) during a scenario conversation, wherein the trainee is asked to restate/paraphrase/quote and then clarify what the trainees believed was "meant" by something said during the scenario.

Optionally, a longer conversation is broken into shorter segments which are then presented to the trainee, and the trainee is asked to paraphrase/restate/quote after each segment. Optionally, additional questions are provided to the trainee at the end of the entire conversation to train the trainees and assess the trainee on what they retain after several minutes or greater amounts of time have passed.

Optionally, the trainee may take notes during a scenario for reference while answering questions and/or to better retain what heard. Thus, appropriate note-taking behavior will also be mastered, as well as the ability to recall and restate without notes.

Optionally, the trainee is only allowed or encouraged to take notes during scenarios of situations where it would be appropriate to take notes in the real world (e.g., business meetings, meetings with clients, listening to a lecture, etc.) and not during scenarios of situations where it would be inappropriate to take notes in the real world (e.g., dinner parties or dates).

Figure 4C:
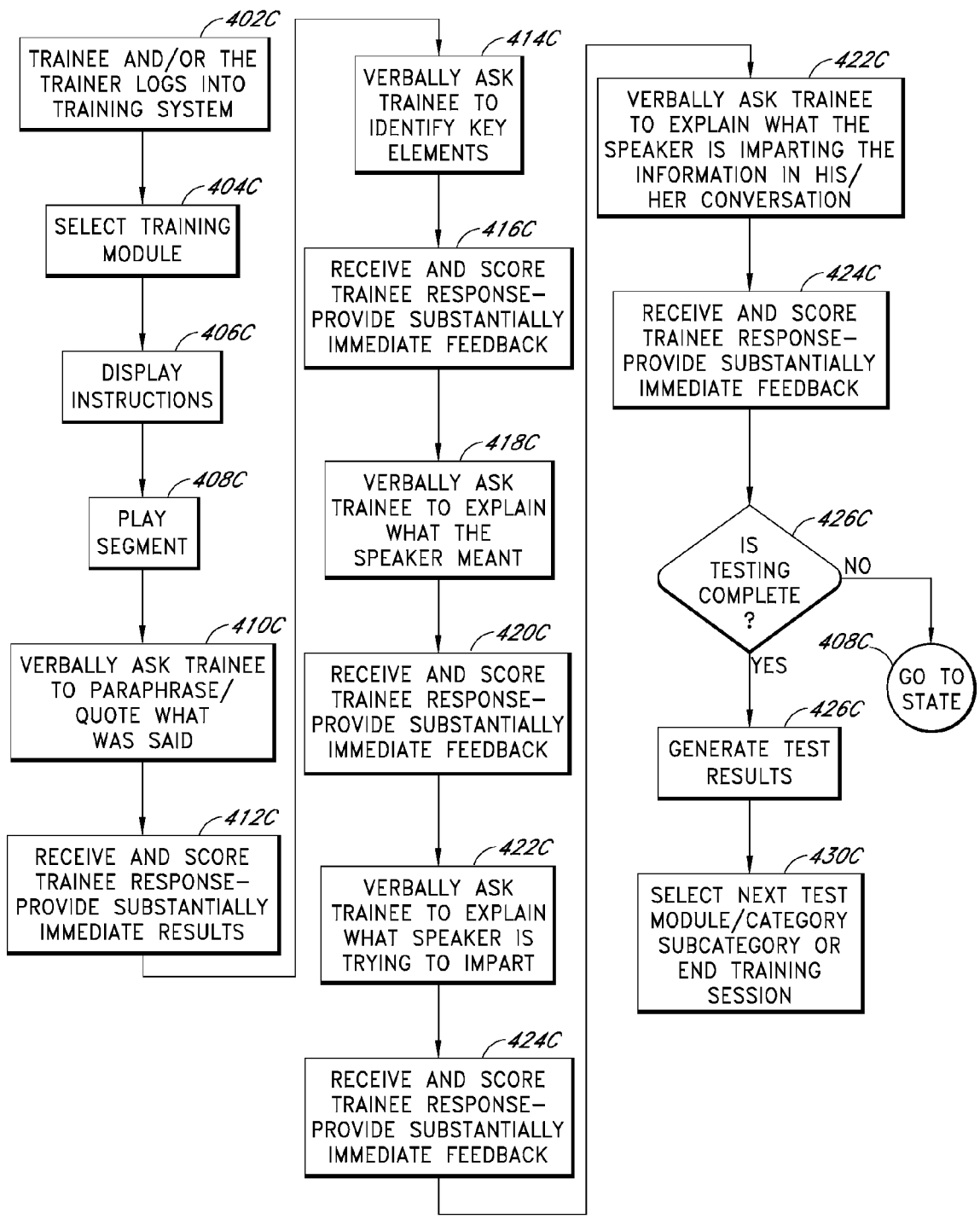

FIG. 4C illustrates another example process. In this example process, the trainee is drilled so as to enhance the trainee's ability to retain what was heard, to accurately restate/paraphrase/quote what others say and mean, by playing a scenario segment and asking the trainee certain types of questions.

At state 402C, the trainer/facilitator and/or user/trainee logs into the training system. At state 404C, a training module is selected (e.g., by the facilitator, the trainee, or automatically by the system). For example, the module can relate to a situation the trainee may often encounter (e.g., a business or social situation). At state 406C, training instructions are displayed by the system to the facilitator and/or the trainee (e.g., explaining what will be presented to the trainee, what the trainee will be expected to do, how the trainee will be scored, etc.). Optionally, a pre-study segment is provided including model answers that are aligned to what the trainee is to be tested on.

At state 408C, a first module segment, including one or more speakers, is displayed to the trainee. Optionally, the first segment is relatively short in length. After the first segment is played, at state 410C, the trainee is asked to verbally paraphrase/quote what was said by one or more of the segment speakers. At state 412C, the facilitator scores the trainee's ability to paraphrase/quote what was said by referring to preprogrammed answers displayed by the system. Optionally, the facilitator verbally provides the score to the trainee substantially immediately. Optionally, the facilitator also enters the score into the training system, which stores the score in memory for later reporting.

At state 414C, the trainee is asked to verbally identify/state key or more important elements of what one or more of the speakers said. The trainee may also be asked why the elements are important. The trainee's answers should correspond with statements provided in the pre-study segment. At state 416C, the facilitator scores the trainee's ability to identify/state those elements by referring to preprogrammed answers displayed by the system. Optionally, the facilitator verbally provides the score to the trainee substantially immediately. Optionally, buttons or other controls are provided that when activated, cause the corresponding pre-study segment portion to be played back. Optionally, the facilitator also enters the score into the training system, which stores the score in memory for later reporting.

At state 418C, the trainee is asked to verbally explain what one or more of the speakers or other segment participants meant (e.g., by reading between the lines, listening to tone, style, and/or by reading speaker body language or facial expressions). At state 420C, the facilitator scores the trainee's ability to explain what one or more of the speakers meant by referring to preprogrammed answers displayed by the system. Optionally, the facilitator verbally provides the score to the trainee substantially immediately. Optionally, the facilitator also enters the score into the training system, which stores the score in memory for later reporting.

At state 422C, the trainee is asked to verbally explain what one or more of the speakers is trying to impart. At state 424C, the facilitator scores the trainee's ability to explain what one or more of the speakers are trying to import by referring to preprogrammed answers displayed by the system. Optionally, the facilitator verbally provides the score to the trainee substantially immediately. Optionally, the facilitator also enters the score into the training system, which stores the score in memory for later reporting.

At state 426C, the trainee is asked to verbally describe one or more of the speakers' style. At state 428C, the facilitator scores the trainee's ability to verbally describe the one or more of the speakers' style by referring to preprogrammed answers displayed by the system. Optionally, the facilitator verbally provides the score to the trainee substantially immediately. Optionally, the facilitator also enters the score into the training system, which stores the score in memory for later reporting.

Optionally, the segment is replayed to the trainee so that the trainee can better understand errors made by the trainee in providing the answers/descriptions discussed above.

At state 430C, a determination is made as to whether the module has been completed. If it has been completed, the process proceeds to state 432C, and the system generates a test report, which may be provided (electronically and/or via a hardcopy printout) to the facilitator, the trainee, a manager, and/or other recipient. At state 434C, the training ends or another module is selected.

If, at state 430C, a determination is made that the module has not been completed, the next segment is selected (which is optionally longer than the proceeding segment in order to further exercise the trainee's memory and increase the ability to effectively listen to longer conversations), and the process proceeds back to state 410C.

Figures 2, 4D:
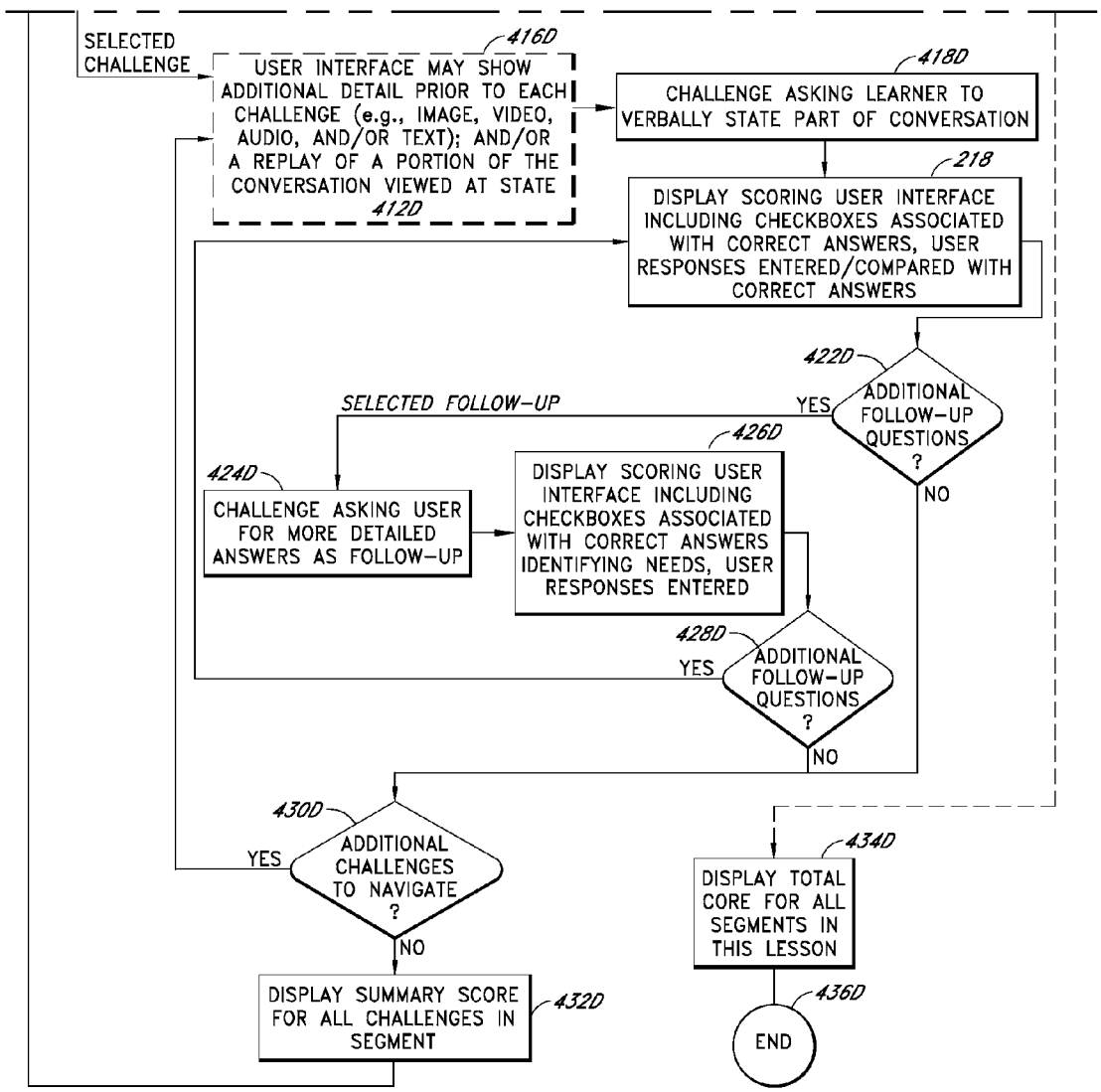

FIG. 4D illustrates example training processes for enhancing listening mastery. The process begins at state 400D, and the trainee and/or trainer log into the training system. At state 401D, the system displays a welcome screen. The system receives a selection of a training module from a menu of training modules. For example, the different training modules may relate to different subject matter. Optionally the system provides a description of the corresponding training objectives (related to listening mastery) and a description of the training module. A user interface is displayed via which the trainee and/or trainer (which may be a peer) optionally selects a peer type (where the learner and/or partner indicates who their "learning partner" is for the session—a peer, their supervisor, someone whose principal job function is training, etc.).

At state 402D, a user interface is presented via which the trainee/trainer can instruct the system to display a tutorial for the learner/trainee. If an instruction is provided to launch the learner tutorial, the process proceeds to state 404D and the learner tutorial is launched and displayed by the system to the trainee (e.g., explaining what will be presented to the trainee, what the trainee will be expected to do, how the trainee will be scored, etc.). Otherwise, the process proceeds to state 406D.

At state 406D, a user interface is presented via which the trainer can instruct the system to display a tutorial for the trainer. If an instruction is provided to launch the tutorial, the process proceeds to state 408D and the trainer tutorial is launched (e.g., explaining what will be presented to the trainee, what the trainee will be expected to do, and how the facilitator should score the trainee, etc.). Otherwise, the process proceeds to state 410D.

At state 410D optionally a pre-study session is conducted, wherein a variety of pre-study user interfaces are displayed. The pre-study session can, for example, provide general information regarding products or services that will be discussed during the training scenario. The pre-study session optionally includes text, graphics, videos, and/or animations. Optionally, the system is configured to print some or all of the pre-study materials (automatically, or in response to an instruction by the trainee and/or trainer) for review by the trainee and/or trainer.

At state 412D, a user interface is presented via which the trainer/trainee can instruct the system to play a selected entire conversation (e.g., from a menu of conversations) or predefined segments thereof. The user interface also provides a menu of selectable challenge areas.

If an instruction is provided to play a selected conversation or a segment thereof (e.g., a relatively short segment, such as one approximately less than 30 seconds or 15 seconds in length, or shorter or longer), then at state 414D, the selected conversation or segment is played/displayed to the trainee (e.g., including video, animation, audio, and/or text). The process then proceeds back to state 412D, where another conversation can be selected.

If, at state 412D, a challenge area was selected, the process proceeds to state 416D, where, optionally, a user interface provides a replay of a selected scenario section and/or additional information prior to presenting the challenge. By way of example, a description may be provided explaining the context of the scenario (e.g., a career counselor with be discussing career recommendations with a student, or a bank customer is establishing a new account, etc.). The information may be presented using text, graphics, videos, and/or animations. Optionally, the system is configured to print some or all of the content (automatically, or in response to an instruction by the trainee and/or trainer) for review by the trainee and/or trainer. At state 418D, a challenge is presented. The trainee is asked (by the facilitator and/or the system) to verbally state in a literal fashion, optionally using the third person, what was said in a portion of the conversation by one or more of the segment speakers. For example, the challenge may be a direct question regarding what the speaker said (e.g., where does he live, how many children does he have, what services or products he is looking for, when did he move, etc.). Optionally, in addition or instead, the trainee is instead or in addition asked to verbally paraphrase/summarize what was said (e.g., using sentences), what was meant, why the trainee thinks that is what was meant (e.g., provide evidence of what was meant), in words, sentences, etc. Optionally, the system will ask a series of direct questions.

At state 420D, a scoring user interface is displayed. In this example, the answer(s) (corresponding to the challenge) are displayed with associated check boxes. The trainer checks off each challenge the trainee correctly responded to, which are then stored in computer readable memory.

At state 422D, a determination is made as to whether a follow-up question it to be asked. For example, a follow-up question may relate to identifying evidence that was presented during the conversation (e.g., by one or more speaker's use of words and/or verbal style) that supports the trainee's answer. If there are follow-up questions, the process proceeds to state 424D, where the follow-up questions are asked. At state 426D, a scoring user interface is displayed. In this example, the answer(s) (corresponding to the follow-up questions) are displayed with associated check boxes. The trainer checks off each question the trainee correctly responded to, which are then stored in computer readable memory.

At state 428D, a determination is made as to whether there are additional follow-up questions, and if so, the process proceeds back to state 420D. Otherwise, the process proceeds to state 430D, and a determination are made as to whether there are additional challenges to navigate, and if so, the process proceeds back to state 416D. Otherwise, the process proceeds to state 432D, and the scores and/or a summary thereof (e.g., a grade score or overall point score) are calculated and presented with respect to the conversation or segment challenges presented during the process. The process then proceeds back to state 412D. If, at state 412D a determination is made that the challenges have been completed, a "total score" user interface is presented. When activate, the "total score" user interface causes the process to proceed to state 434D. At state 434D, the score total(s) and/or a summary thereof (e.g., a grade score or overall point score) is calculated and presented with respect to all of the segment challenges presented during the process. At state 436D, the process ends.

The following is an example illustrative "script" of a listening mastery module, including questions (e.g., direct questions regarding information explicitly stated by a customer and questions regarding meaning, paraphrasing, and conclusions with respect to the customer's statements), for the trainee and answers which can be used by the trainer in scoring the trainee:

Direct Questions Part 1

1. Listen to the Female Client Monologue:
Well, I'm moving here with my family. (normal)
I currently bank with ABC Bank back home in England. My entire family has banked with ABC bank for decades, but it does not seem like they are a big player here . . . (wistfully) So I'm considering this bank. I'm also looking for office space around this area . . . so this would be the most convenient branch to do most of my banking with. (emphasize the convenience of the bank location)

2. Answer these questions:
a. What is the Prospect looking for?
   Correct Answers:
   i) The prospect is looking for office space;
   ii) The prospect is looking for a bank.
b. Where is the prospect from?
   Correct Answer:
   i) The prospect is from York
c. How long has the prospect's family banked with ABC Bank?
   Correct Answer:
   i) The prospect's family has been banking with ABC Bank for decades.
d. Why is the prospect considering the bank she is conversing with?
   Correct Answer:
   i) The prospect is considering this bank because it is convenient, B. Direct Questions Part 2

3. Listen to the Female Client Monologue:
Our home will be in the King's Way area. We just put in an offer on a house there. We fell in love with it immediately.
It's a gorgeous area. My daughter and I are moving out here because of my husband's travel business. His business has found room to expand in the London area, so we're all following him.
For me . . . it won't make a difference as far as my company is concerned. (sounds insecure)
My business is pretty virtual. I have four designers working for me back in Northeast England, up in York, so I can work from anywhere.
Our specialty is layout design and fixturing. My clients are Marks and Spencer, Sainsbury, and so on. We look at our retail customers' buying patterns and then try to help them adapt to their trends.
I have noticed that the trends in King's way and this area of the country are different than in Northeast England. Maybe it's the difference in climate. (sounds concerned)

4. Answer the following questions:
a. What is the prospect's husband's business?
   Correct Answer:
   i) The prospect's husband is in the travel business.
b. Why are the prospect and her family moving to London?
   Correct Answer:
   i) The prospect's business is expanding
c. What is the prospect's specialty?
   Correct Answer:
   i) the prospect's specialty is layout design and fixturing
d. Where can the prospect work and why?
Correct Answers:
   i) the prospect can work anywhere
   ii) The prospect's business is virtual
e. Who are the prospect's clients?
   Correct Answer:
   i) The prospect's clients include Marks and Spencer, Sainsbury, and others
f. Specifically, what does the prospect's company do?
   Correct Answer:
   i) The prospect's company looks at retail customer's buying patterns and helps its clients adapt accordingly
g. What has the prospect and her husband done with respect to their move?
   Correct Answer:
   i) They have put an offer on a house in King's Way
h. Where are the prospect's employees located?
   Correct Answer:
   i) The prospect's employees are in the Northeast.
C. Direct Questions Part 3
5. Listen to the Female Client Monologue:
I've looked at several banks today. I noticed your bank has the most branches around.
I also noticed that you offer a 4 percent interest bearing current account. That's pretty good for a current account. (sounds a little too casual—downplay this)
I wouldn't mind opening that up today; can I do that over the phone?
6. Answer the following questions:
a. What is the prospect's objective with respect to this bank?
   Correct Answer:
   i) The prospect is attempting to open a current account
D. Meaning, Paraphrasing, and Conclusion Questions
7. Listen to the Female Client Monologue:
I currently bank with ABC Bank back home in England. My entire family has banked with ABC bank for decades, but it does not seem like they are a big player here . . . .
So I'm considering this bank.
8. Answer the following questions:
a. What do you think she meant?
   Correct Answer:
   i) the prospect is expressing loyalty to ABC Bank;
   ii) The prospects wishes ABC Bank had branches in this area
b. What led you to believe that the prospect was expressing loyalty?
   Correct Answers:
   i) Words: "Our entire family has banked with ABC Bank for decades;
   ii) Verbal Style: the prospect sounded wistful
c. What led you to the conclusion in a-ii? Words: but it does not seem like they are a big player here
9. Listen to the Female Client Monologue:
We look at our retail customers' buying patterns and then try to help them adapt to their trends. I have noticed that the trends in King's way and this area of the country are different than in Northeast England. Maybe it's the difference in climate.
10. Answer the following questions:
a. What do you think the prospect meant?
   Correct Answer:
   i) The prospect does not have expertise in this area of the country; initially, she it not quite sure she will be effective in the London marketplace.
b. What led you to your conclusion?
   Correct Answer:
   i) Words: I have noticed that the trends in King's way and this area of the country are different than in Northeast England. Maybe it's the difference in climate. Verbal style: the prospect sounded concerned.
11. Answer the following question:
Based upon information from the entire conversation, paraphrase/restate in the first person the three reasons why she is considering opening an account at this bank and at this branch.
   Correct Answer:
   i) You said this would be the most convenient branch to do the majority of your banking; you noticed that this branch had the most branches in the area; you liked the 4% interest bearing checking account.
12. Answer the following questions:
a. Based on the paraphrased responses, which of these is least important to the prospect?
   Correct Answer:
   i) Least important: 4% interest bearing current account
b. What led you to this conclusion?
   Correct Answer:
   i) Words: she said 4% was Ok for a current account;
   ii) Verbal style: de-emphasized the current account;
   iii) Verbal style: Emphasized the convenience of the branch location.

Optionally, a series of listening modules may be assembled into a specific set of concentration. As a trainee completes the set with no errors, and can verbally respond correctly to each and every challenge presented in the set, the system will generate a "certificate of mastery" (e.g., an indication stored in a database and/or a printed certification) for the area of concentration. The trainee can be designated a Listening Master (or other such title, such performance master, opportunity master, product master, etc.) in that discipline or area and optionally may act as a trainer in that area to others.

Thus, certain embodiments described herein can be used to teach people to enhance their performance with respect to a variety of skills by enhancing their listening comprehension, learning comprehension and/or memory retention of what is heard and meant, as well as how to utilize the information thus obtained.

Certain embodiments further enhance a user's communications abilities with respect general speaking, public speaking, debating, convincing, persuading and other proactive verbalizations. Embodiments described herein are used to enable and/or train users to recognize correct and incorrect verbal communication techniques of others (e.g., in word choice, style, etc.) and related visual issues, to thereby improve their own communication techniques and reduce/eliminate similar errors.

Certain embodiments have a segment presented with one or more speakers, and the user is asked to identify and/or explain what worked or did not work with respect to how a speaker communicated, correct and incorrect techniques and/or styles of one or more speakers, why it is important to change a technique or style, how a verbal communication should have properly been performed, etc.

Certain example embodiments sequentially present at least two versions of the same communication, also referred to as parallel avatar processes. By way of example, the system can present (in two or more segment presentations) one or more speakers (which can be real people, human actors, or animated characters/avatars) expressing the same literal information using the same words but with different tones, body language, clothing and/or hair styling. This enables the user to judge the affect verbal tone, body language, clothing and/or hair styling can have on a speaker's verbal communications with a listener. Optionally, the system can present two presentations where the same speaker uses different words, but with the same appearance and verbal style so that the user can judge the effect of words, without being influenced by differences the speaker's appearance or verbal style. Optionally, the system can present two presentations where two different speakers are communicating the same information using different words, with different appearances and/or verbal styles. Further, by observing the speaker (e.g., the speaker's body language, clothing, hair), and the effect the speaker's body language, clothing, hair, etc. can have on a listener and on what is communicated to the listener, the user's observational skills are trained and enhanced. By way of further example, multiple presentations with speakers having different appearances can also be used to train and enhance the user's observational skills.

The user may be asked to identify and/or explain what worked or did not work with respect to how a speaker communicated, correct and incorrect techniques and/or styles of one or more speakers, why it is important to change a technique or style, how a verbal communication should have properly been performed, etc. The user may be asked to contrast the versions, and to identify explain why the tone, body language, clothing and/or hair styling of one speaker was more effective in communicating the same information than that of the other speaker.

In addition or instead, the system can present (in two or more segment presentations) a speaker (or speakers) having in each segment the same tone, body language, clothing and/or hair styling, expressing the same literal content, but using different words. This enables the user to judge the effect word choice can have on a speaker's verbal communications with a listener. As similarly described above, the user may be asked to identify and/or explain what worked or did not work with respect to how a speaker communicated, correct and incorrect word choices/techniques of one or more speakers, why it is important to change a word choice, how a verbal communication should have properly been performed, etc. The user may be asked to contrast the versions, and to identify explain why the word choice of one speaker was more effective in communicating the same information than that of the other speaker.

An example process for enhancing expressive communication will now be explained in greater detail by way of illustration and not limitation.

A pre-study session concerning key or important elements of verbally expressive communication is optionally provided. Typical communication problems are identified, such as poorly organized communications, confusing priorities, inappropriate redundancies, contradicting statements, flip-flopping (changing of positions), hesitations and style (mumbling, aggressive tone, insincere tone, flippant tone, sarcastic tone, dismissive tone, etc.) that can adversely affect a listener's confidence in the speaker, general style issues, etc. The pre-study session may be aligned with the training and testing to follow. Guideline/example language may be provided that is to be used in appropriate situations. For example, examples of certain types of greetings, certain types of information gathering questions, certain types of product or service descriptions may be provided.

One or more scenarios (which may be short or long in length) using one or more speaking human/avatar participants. The subject matter may or may not be of specific relevance to the user. For example, the subject matter and the speaker may be related to a person's employment (e.g., the speaker may be a bank representative and the subject may be financial services) so as to be relevant to user's everyday tasks, or the subject matter may be unrelated to the user's employment so that the user can focus on style, body language, word choice, and so on, without being distracted by the subject matter itself or worrying about the need to repeat the subject matter.

The user may optionally be challenged/queried and asked to verbally provide some or all of the following:
identification of correct technique implementations in conversations (e.g., techniques that enhanced the persuasiveness of the verbal communication);
identification of technique errors in conversations;
identification of why it is important or critical to correct the errors;
guideline language error-corrections;
identification of correct style implementations;
identification of incorrect style implementations;
identification of appearance and/or grooming issues that detract from the verbal communication persuasiveness (e.g., clothing, hair style, makeup, jewelry, glass style, etc.);
identification of appearance and/or grooming issues that enhance the verbal communication persuasiveness;
an explanation as to whether or not the communication was persuasive, effective, and/or clear as a whole, and whether the user would have been influenced by the communication and how.

The user's responses are optionally recorded (e.g., using voice recording, text to speech, or by manually transcribing the response (e.g., by typing it in via a keyboard)) and storing the responses in computer memory and/or on paper). A trainer, peer, and/or the user may then visually reference correct answers (e.g., stored on and presented by the training system), the user's response, and proceed to score/grade the user. The score/grade can then be stored in computer memory and/or elsewhere and provided to the user or other appropriate person.

An embodiment utilizing different forms of communicating the same main substantive content, so that the user can compare and contrast the different forms of communication and their impact, will now be described. The communications may be in the form of product and/or service presentations, or may be related to other subject matter.

In an example process, the same person/avatar is used in two (or more) different pre-recorded presentations to communicate certain information. The use of the same person/avatar in the two (or more) presentations can be used to eliminate variables that may cause the user to judge the communication based on the physical appearance of the speaker.

The presentations can be purpose-scripted and built for training or can be actual speeches (or portions thereof) or other verbalizations of public figures, politicians, military leaders, academics, debaters, well known speakers, etc.

Optionally, in each of the two presentations, the same speaker uses the same words (also referred to herein as the same script even if not originally scripted) with different styles (e.g., confident, hesitant, fast talker, deliberate/slow speaker), so that the user can focus on the differences in verbal style used in the communication. For example, a confident speaker tends not to use non-words of hesitation (such as "uh" or "um") and tends not to continuously pause (e.g., does not pause for 1 or 2 seconds in the middle of a sentence) while searching for a word to use. Thus, for example, a confidant speaker may use non-words of hesitation less than a certain about of times per a given time period (e.g., on the average, less than once every 30 seconds, less than once a minute, less than once every two minutes, etc.). A hesitant speaker, by contrast will tend to often use non-words (e.g., on the average, more than once every 30 seconds, minute, or other specified time period), and will often pause in the middle of a sentence (e.g. for a second or two, on the average, less than once every 30 seconds, less than once a minute), while searching for a word. Hesitant speakers often tend to mumble, fidget, and/or repeat themselves.

For example, two "speeches" (e.g., 30 seconds or other length) are delivered by the same speaker. The user is then challenged regarding the impact of the two versions, the specifics of why the impact was different, and how the less effective communicator could correct their verbal communication style. Optionally, the user is questioned after each of the two speeches regarding each speech in isolation, as similarly described above, rather than just by contrasting the two speeches. The user is optionally asked to identify and/or explain what worked or did not work with respect to how a speaker communicated, correct and incorrect word choices/techniques of one or more speakers, why it is important to change a word choice, how a verbal communication should have properly been performed, etc.

The user can then be scored using one or more of the scoring processes discussed above.

In addition or instead, an example process is used, wherein the same person/avatar (also referred to as the speaker) is used in two (or more) different pre-recorded presentations to communicate certain information. The speaker uses the same verbal tone and style in each presentation, but uses different words to express the same information. The use of the same person/avatar in the two (or more) presentations using the same style and tone can be used to eliminate variables that may cause the user to judge the communication based on physical appearance and tone, and allows the user to focus on the effect of word choices. As similarly described above, the presentations can be purpose-scripted and built for training or can be actual speeches.

For example, two "speeches" (e.g., 30 seconds or other length) are delivered by the same speaker using the same style and tone but different words. The user is then challenged regarding the impact of the two versions, the specifics of why the impact was different, and how the less effective communicator could correct their word choices. The user can be asked to identify confusing words and phrases, words that minimize or enhance the important of certain subject matter inappropriately, words that enhance or detract from the trustworthiness of what is said (e.g., evasive words, ambiguous words, etc.), poorly organized communications, confusing priorities, inappropriate redundancies, and so on.

The user can then be scored using one or more of the scoring processes discussed above.

In addition or instead, an example process is used similar to those discussed above, wherein the same person/avatar (also referred to as the speaker) is used in two (or more) different pre-recorded presentations to communicate certain information, but there are changes in both words and style/tone, even though substantially the same main content is being verbally provided. The user can be questioned as similarly discussed above with respect to word choices and style, and how the forging affect the clarity and impact of the presentation. The user can then be scored using one or more of the scoring processes discussed above.

In other embodiments two or more presentations can be provided, wherein one or more of the following elements can be held constant, and one or more elements can be varied.

Words

Verbal style and tone

Body language (hunched over, standing straight, standing/sitting, fidgeting, hands on table, hands in lap, hands clasped together, shrugs, eyes directed to listener, eyes averted or darting, standing in one place, moving around, shuffling feet, etc.)

Hair cut (e.g., long/short/traditional/out of the mainstream)

Hair coloring (natural looking, unnatural color, uneven dye, red/black/brown/purple, etc.)

Glasses (presence/absence/style)

Clothing (e.g., formality of clothing (tie/jacket/suit/sweatshirt/t-shirt/skirt/dress/pant suit, out of the mainstream etc.), color of clothing, condition of clothing (presses/rumpled/ragged/etc.))

Jewelry (e.g., ring/necklace/ankle bracelet/earrings/nose ring/use of studs/use of body piercings)

Tattoos

Accents

This enables the training process to isolate one or more speaker characteristics to that a user can focus on the affects of those characteristics and be questioned regarding the impact of the one or more changed element, and scored as similarly discussed above.

For example, in order to demonstrate the effect speaker clothing can have on a listener, all the foregoing elements may be held constant in two different presentations, except the clothing can be altered, where in the first presentation the speaker is dressed formally (e.g., wearing a suit), and in the second presentation the speaker is dressed informally (e.g., wearing a colored t-shirt and jeans). The user can then be questioned as to the effect the clothing change had on the impact or trustworthiness of the speaker's communication, as similarly described above.

Optionally, different people (real or in the form of avatars) speaking on the same or different subjects using the same or different language and/or styles are presented. The user is asked to compare and/or contrast the styles, language, and/or the resultant effect of the different speakers.

Optionally, a user interface is provided via which the user and/or trainer can specify which element is to be held constant, which element is to be changed, and how. For example, a menu of different people/avatars. appearance elements (e.g., hair styles, makeup, glasses, shirt, top, pants, skirt, dress, shoes, jewelry, etc.), speaking styles (e.g., confident, aggressive, low key, quiet, etc.), body language style (rigid, hunched, loose, etc.), and/or scripts are optionally presented to the user, trainer, administrator and/or other entity via which the elements to be used in different presentation versions can be defined. Thus, one or more of people, appearance, speaking styles, and scripts can be varied from presentation to presentations.

Figure 4E:
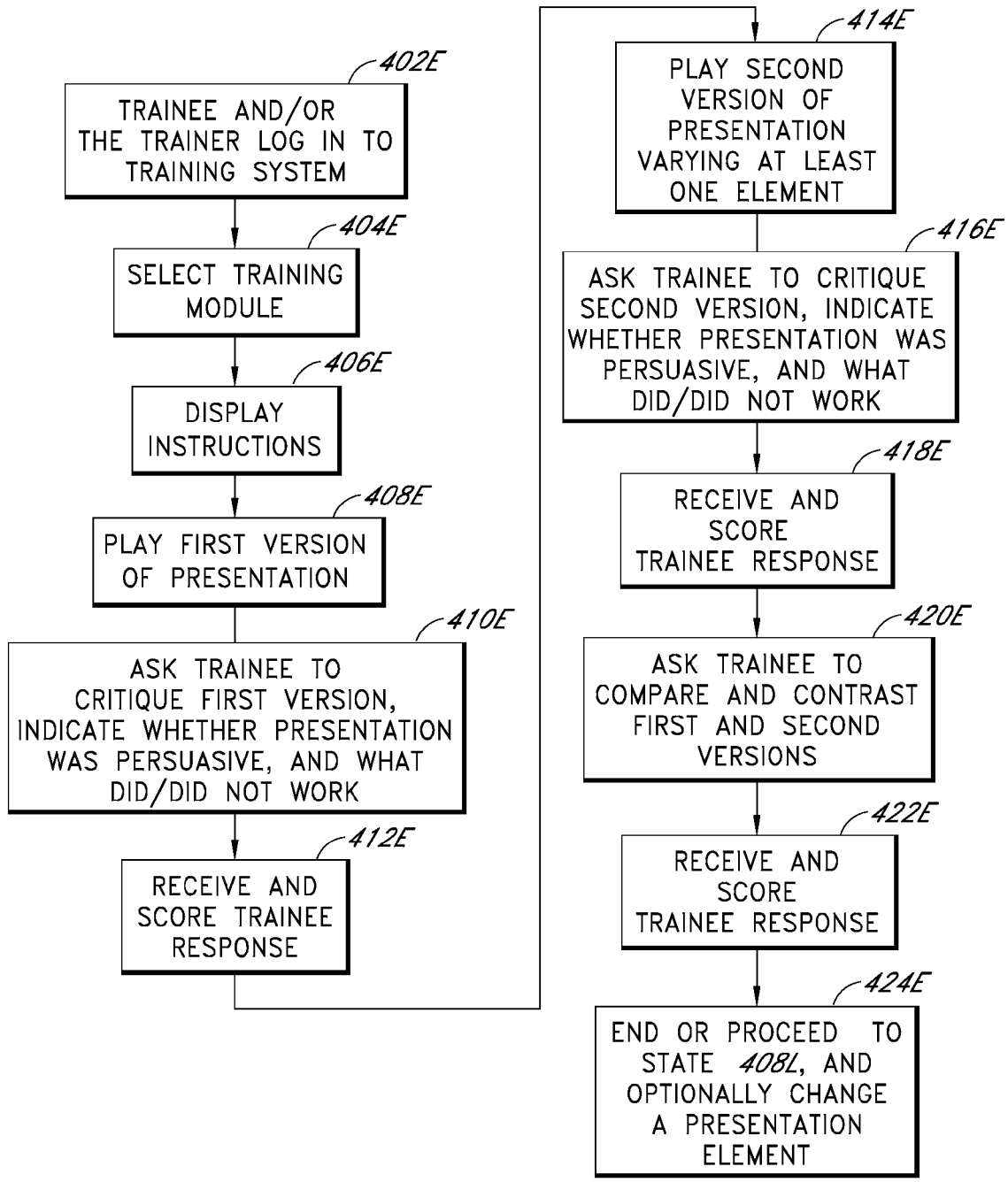

Referring now to FIG. 4E, At state 402E, the trainer/facilitator and/or user/trainee logs into the training system. At state 404E, a training module is selected (e.g., by the facilitator, the trainee, or automatically by the system). For example, the module can relate to a situation the trainee may often encounter (e.g., a business or social situation). At state 406E, training instructions are displayed by the system to the facilitator and/or the trainee (e.g., explaining what will be presented to the trainee, what the trainee will be expected to do, how the trainee will be scored, etc.). Optionally, a pre-study segment is provided including model answers that are aligned to what the trainee is to be tested on.

At state 408E, a first version of module segment, including one or more speakers, is displayed to the trainee. Optionally, the first segment is relatively short in length. At state 410E, the trainee is optionally asked to verbally perform some or all of the following and/or additional or different acts:

identify correct technique implementations in conversations (e.g., techniques that enhanced the persuasiveness of the verbal communication);
identify technique errors in conversations;
identify why it is important or critical to correct the errors;
provide guideline language error-corrections;
identify correct style implementations;
identify incorrect style implementations;
identify appearance and/or grooming issues that detract from the verbal communication persuasiveness (e.g., clothing, hair style, makeup, jewelry, glass style, etc.);
identify appearance and/or grooming issues that enhance the verbal communication persuasiveness;
explain whether or not the communication was persuasive, effective, and/or clear as a whole, and whether the user would have been influenced by the communication and how.

At state 412E, the trainee's answers are received and scored, with the score being stored in system memory.

At state 414E, optionally a second version of module segment is displayed to the trainee. At least one element is the same as in the first version (e.g., script, verbal style, clothing etc.) and at least one element is changed (e.g., script, verbal style, clothing etc.). The changed element(s) are optionally selected so that the trainee can better understand the effect those element(s) can have on a listener's perception of the speaker and what the speaker is communicating. At state 416E, the trainee is optionally asked one or more questions as similarly described above with respect to state 410E.

At state 418E, the trainee's answers are received and scored, with the score being stored in system memory.

At state 420E, the trainee is optionally asked to verbally compare and contrast the two versions. For example, the trainee may be asked regarding the impact of the communications being provided in the two versions, the specifics of why the impact was different, and how the less effective communicator could improve their performance, etc. At state 422E, the trainee's answers are received and scored, with the score being stored in system memory.

At state 424E, the process ends, or optionally the process can return to state 408E, and optionally at least one elements is held constant and at least one element is changed.

Thus, with respect to the example embodiments described above, certain preferred embodiments provide for verbal questions and verbal, free form answers. Thus, real-world interactions are more closely emulated (as compared to simple multiple choice/true-false testing), thereby enabling a user to better transfer learned skills to a real world environment, where the trainee interacts with people in a verbal, free form environment.

Still further, certain example preferred embodiments utilize a facilitator who can provide immediate feedback to the trainee. Optionally, the training system provides the facilitator with preprogrammed answers so that the facilitator can be relatively untrained. The presence of a human facilitator can provide positive emotional tension for the trainee, which can further enhance the retention of skills. Certain embodiments enhance listening comprehension.

Certain embodiments of the systems and processes disclosed herein address the problem of the inability of individuals to convert data into proper solutions/recommendations/sales, etc.

By way of explanation, individuals and/or organizations may be able to gather data, but unless they convert this data into practical outcomes, it is merely information for information's sake without a practical result. The presumption that if people acquire data, they will know what to do with that data is typically erroneous.

Furthermore, digitalized data has the capacity to be data mined so that automated recommendations can be made through various technologies. Unfortunately, data that is acquired verbally does not usually become digitalized so that it can be automatically "converted" into recommended outcomes/solutions. Additionally, even if it was, individuals and/or organizations often do not have this technology readily available, especially in venues where technology is not present.

Therefore, it is necessary for individuals to be able to convert data that they acquire verbally into proper recommendations/solutions. Furthermore, this also applies to data that is in written and/or digital and/or video/audiotape form, and for that matter, other forms that is presented to an individual who is supposed to convert this information to actionable ideas.

In fields such as financial services, most individuals, and especially part-time individuals, and/or in organizations with high turnover, there is an exposure to "symptoms" (e.g., data regarding a customer/prospect), but little time is spent on learning, and especially embedding, diagnosis and/or treatment recommendations. Also, conventionally there is not a mechanism for consistent repetition, drilling and reinforcement of symptom identification, proper diagnosis and treatment recommendations.

While financial planning software does exist, it is rarely used with respect to verbal interactions (e.g., with a customer/prospect) where new and/or additional information is acquired from customers and/or prospects. Furthermore, with respect to creating credibility in the eyes of a customer and/or prospect with respect to the individual that they are dealing with, if that individual cannot provide verbal responses, relatively rapidly and logically, credibility falls, as will sales and brand perception regarding the organization that that individual may be affiliated with.

The same principle applies to non-business situations. For example, it could apply to data/information that is gathered in consumer situations, including those between spouses/significant others, family members, etc., that require the individual(s) and/or groups of individuals who are receiving the information to be able to know what to do with the information.

Additionally, approaches are not currently available that provide a systematic methodology for "if/then" knowledge acquisition and the repetition and drilling of this knowledge, for embedding and continuous improvement purposes as disclosed herein.

Furthermore, conventional systems do enable "modules" to be added in this regard that are built based upon relevant current needs and/or all needs, and that could be accessed rapidly in an expandable learning management system database.

Also, when individuals know that they are not knowledgeable in particular areas, not only will their confidence be reduced and results of interactions be diminished, but their willingness to engage in discussions where they "know that they don't know" will also be reduced. For example, in business settings, individuals may avoid engaging in discussions that could put them into "intellectual harm's way" and thus reduce their capacity to sell, service, etc. Additionally in this regard, if individuals lack confidence and/or because they don't have the correct answers, the turnover of these individuals in an organization is increased. The opposite is also true. If these individuals feel confident because they are competent and/or because they generate better results because they know what to do with data, they are less likely to quit within a particular job family. This also holds true in the consumer marketplace and social situations where when people feel less effective, they engage less frequently and/or disengage and/or don't participate at all. This principle applies within the educational marketplace as well.

Therefore, certain embodiments optionally provide an automated "case history" approach to learning in this regard, including, but is not limited to, some or all of the following:

1. The ability to code "data cases" in a format that is relevant to the individual and/or user. For example, with respect to a bank, it optionally provides a data screen field which would show what the individual currently has with respect to financial products and services at the bank, and also screens that display additional information gathered and verbally reported in a format that reflects information that may or may not be available on the bank's database. This additional information can be, but is not limited to, customer/prospect needs and products and services they have at other financial institutions. Optionally, the data screens can be actual or emulated data screens corresponding to applications actually used when dealing with a customer (e.g., CRM data screens, account data screens, etc.).

2. The ability for learners to access this data and optionally print out this data, which represents the information upon which they will have to identify needs, produce recommendations and/or solutions.

3. This data is optionally segmented into mini and/or micro categories for focus and time management reasons. Thus, the user and/or organization can optionally select full cases or sub-sections of importance.

4. Once the user has reviewed the case information, they then proceed to the recommendations section where they are to answer questions based upon the case information.

As similarly discussed above with respect to certain embodiments, the user's responses are verbal, and these verbal responses are made prior to the users being exposed to the corresponding answers. Thus, again, it is based upon unprompted real knowledge acquisition versus the significantly less effective approach of prompted multiple choice and/or true-false answering.

5. Optionally, the user is to answer questions in several categories, including some or all of the following or different categories:
   i. To identify stated and unstated needs, opportunities, challenges, problems, etc., embedded in the case data.
      Thus, users need to learn to not only identify obvious needs, opportunities, challenges, problems, etc., but to also identify those that are not clear, subtle and/or optionally those that they anticipate may occur in the future, but are not directly stated in the case data.
   ii. For each identification of the above, the trainee is then queried on the proper recommendations, solutions, etc.
   iii. Thereafter, the trainee is asked to justify the recommendations, solutions, etc., that they provided based at least in part on case data.
      This third question category assures that the users are not merely guessing, but instead that they grasp the rationale for their answers.
      By undergoing such training, the skills learned will not only provide trainees with a greater sense of confidence, but by communicating this confidence via verbal answers, their credibility will be enhanced and the odds of individuals listening to the recommendations, et al., and the credibility for these recommendations, et al, will be significantly enhanced.

6. As similarly discussed elsewhere herein, users are optionally scored and/or micro scored in each category in which they are tested, and a final score is provided at the end of the module.

7. Additionally, the automated "case history" process optionally incorporates some or all of the other aspects of other embodiments described herein.

Thus, as will be described with reference to the figures, previously captured data, (e.g., including data obtained electronically by monitoring transactions associated with a customer and stored in a database, and verbal data obtained via a conversation with a customer, or a simulation of the foregoing) will be presented to the trainee. This simulates a real world environment where a customer service person (e.g., a banker), after meeting with a customer, reviews information obtain via a conversation with the customer and further reviews other data obtained from a database (e.g., a CRM or account database), in order to determine what goods, services, solutions, etc., would be appropriate to recommend to the customer. The foregoing example will be in the context of a customer of a financial institution (e.g., a bank), but other contexts can be used as well (e.g., medical, legal, education, family oriented contexts).

An initial display of assumptions may be presented to the trainee which instructs the trainee regarding the training session and informs the trainee what to expect. The case context is then provided. For example, the case context may provide a general description of the customer (e.g., a business of a certain size, how long the customer has been a client) and a description of the interaction with the customer (e.g., the stated interests or desires of the customer).

Next, a data screen is presented that optionally simulates/mimics a data screen of a CRM system or other system that the trainee uses in performing such tasks in the "real world". The data screen may provide such information as the customer name (which, if a business, may be the business name), the business principals, the type of business entity, date various accounts were opened, account balances, etc. The data screen may include a plurality of data fields (client name, checking account balance, savings account balance, etc.), with corresponding data field names (e.g., "client name", "checking account balance", "savings account balance", and/or verbally reported data, etc.).

Next information gathered via a conversation with the client is presented (or that mimics or simulates information gathered via a conversation). Optionally, the presentation of such information can be formatted so as to appear to be notes taken during the conversation (e.g., handwritten or typed notes), rather than presented via multiple pre-formatted data fields, wherein the data is retrieved from corresponding database fields. For example, the notes can be free form in nature, optionally with spelling errors, optionally, using one or more complete and/or incomplete sentences, and/or missing punctuation.

Such information can include additional information about the customer business (e.g., the line of business, how long they have been operating, their gross annual sales, their net income, their outstanding accounts receivable, the number of full time and part time employees, their management structure, information regarding their capital and rented assets and real estate, etc.), their future plans (e.g., planned purchases and/or rentals of real estate (e.g., build a new office and warehouse space), vehicles (e.g., purchase 4 new trucks), real estate, etc.), etc. Other types of information may relate to outstanding loan balances, lines of credit, savings account balances, checking account balances, investment account balances, retirement balances, insurance, use of cash and tax management products or services, etc. The foregoing information many relate to accounts at the trainee's place of employment or at or at other institutions. Still other types of information may relate to customer requests for advice, customer satisfaction with respect to services/products currently being utilized, and service needs. Similar information may be gathered with respect to the personal financial and need information of the person representing or acting as a customer agent. Optionally, the trainee can print out some or all of the foregoing information for reference during the question portion of the training.

Once the trainee has reviewed the information, the trainee (or facilitator) may select a test field (e.g., financing, cash management, investment and savings, retirement plans, insurance and risk management, tax management, advice, personal needs, employee services, service needs, educational needs, or other types of information where needs are stated or can be inferred and recommendations, actions, products, and/or services can be identified that respond to such needs, etc.).

With respect to the selected the test field, the trainee will be asked to verbalize stated and/or unstated needs of the customer related to the selected field (e.g., if the selected field is "financing" the trainee will be asked to verbalize and stated or inferred financing need of the customer). The facilitator will then score the trainee's answer. For example, a scoring form is presented that lists the relevant opportunities and the facilitator will check off (e.g., via a check field) the needs correctly identified by the trainee (e.g., purchase four new trucks). The trainee will then be asked to recommend a product or service that fulfills one of the needs (e.g., vehicle term loan for new trucks). The trainee will then be asked to explain why the recommendation is appropriate for the customer (e.g., vehicle loans should be paid over the expected life of the vehicles) and the facilitator will provide an indication via a scoring form that displays the correct answer as to whether the trainee provided a correct answer. The foregoing process may be repeated for each identified need. Other example needs and recommendations may relate to a need for investments and a recommendation of a type of investment, a need for a line of credit and a credit line recommendation, a need for a free checking account and a checking account-type recommendation, a need for a mortgage and a mortgage product recommendation, etc.

If the trainee failed to identify certain needs, the facilitator may identify the missed needs to the trainee, who will then still be asked to provide recommendations with respect to fulfilling the needs, and to explain why the recommendations are appropriate. Similarly, if the trainee failed to correctly provide a recommendation, the facilitator may identify the missed recommendation, and the trainee will be asked to explain why the recommendations are appropriate A scoring report is generated that reports how many stated needs the trainee correctly identified, how many unstated needs the trainee correctly identified, how many appropriate associated product/service/solution/recommendation the trainee identified, how many appropriate recommendations explanations the trainee provided, how many times the trainee identified appropriate advice to provide the customer.

Figure 4F:
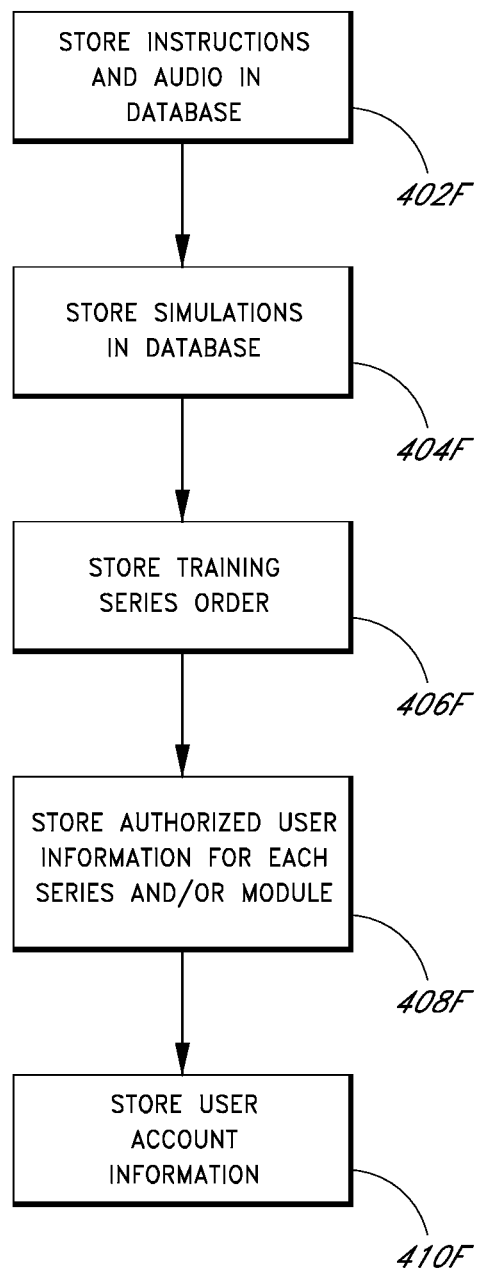
Figure 4G:
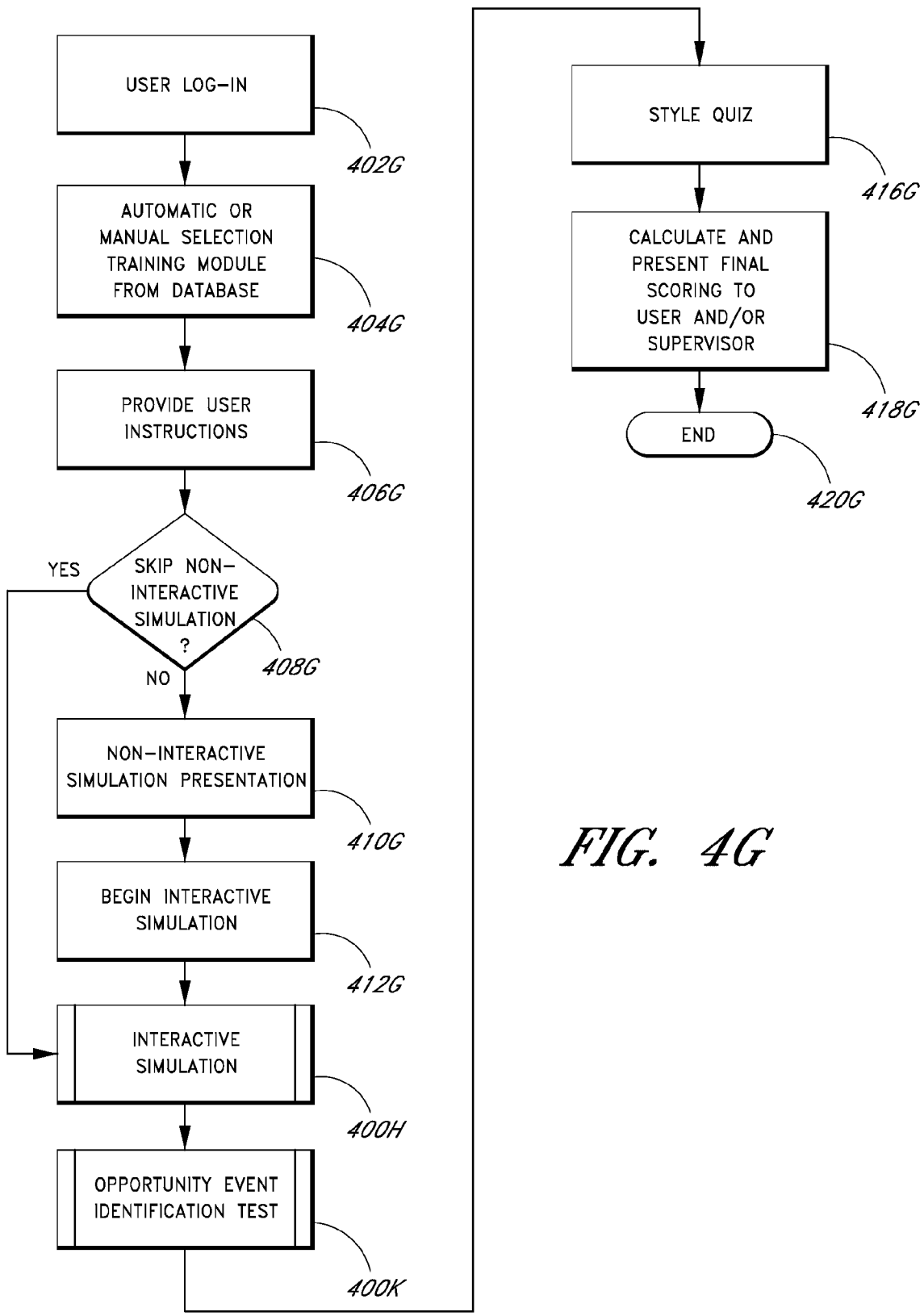
Figure 4H:
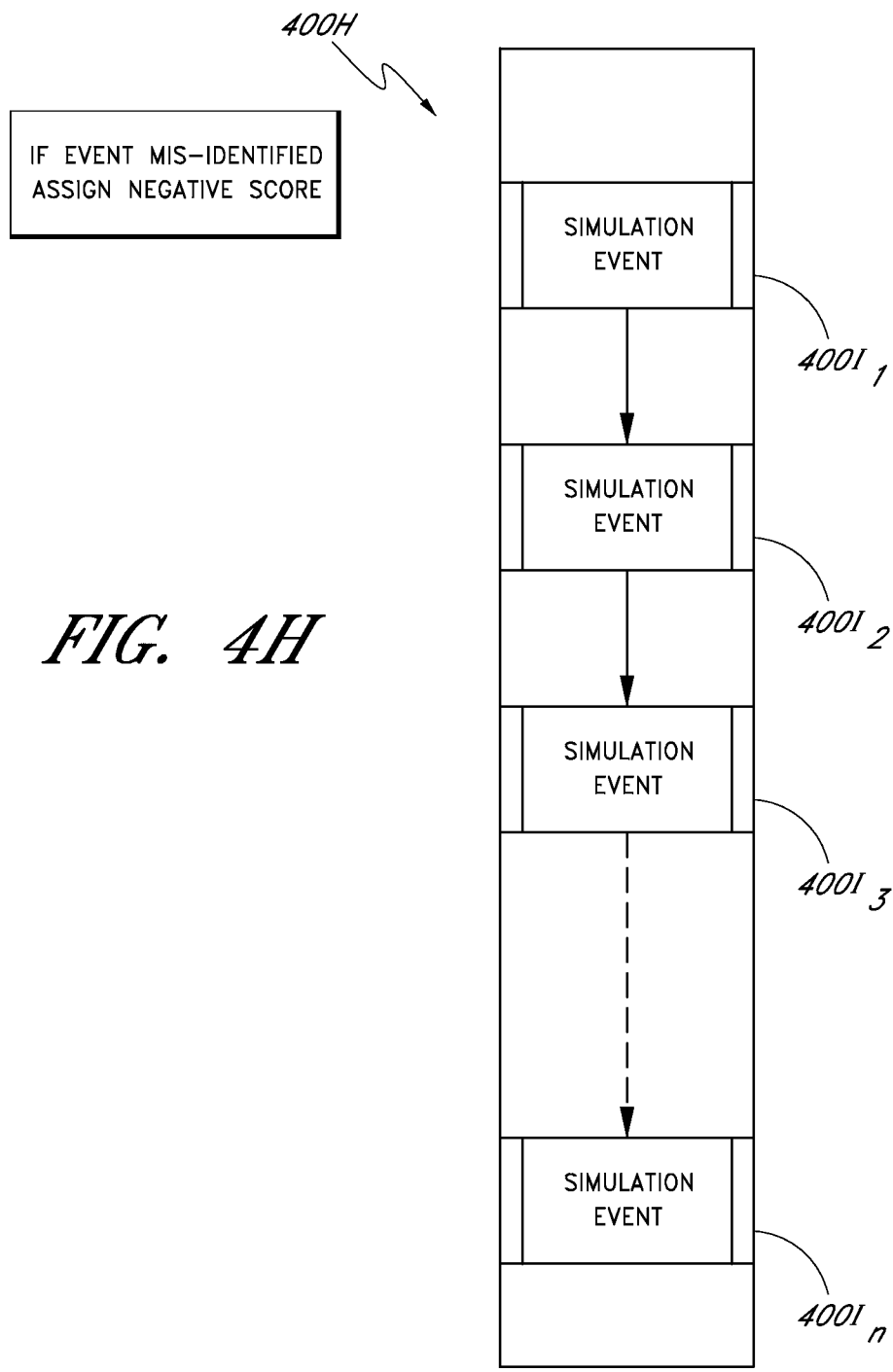
Figure 4I:
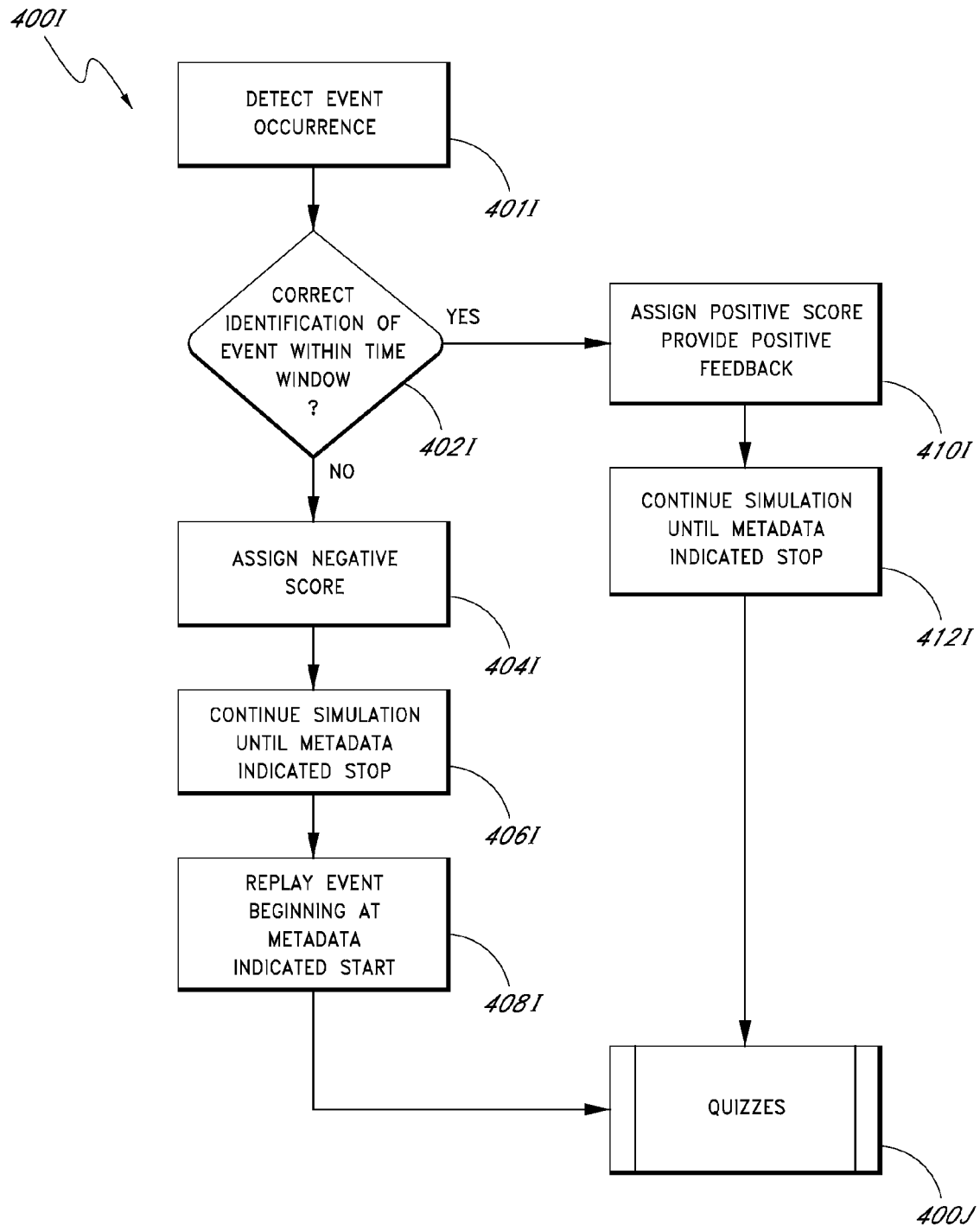
Figure 4J:
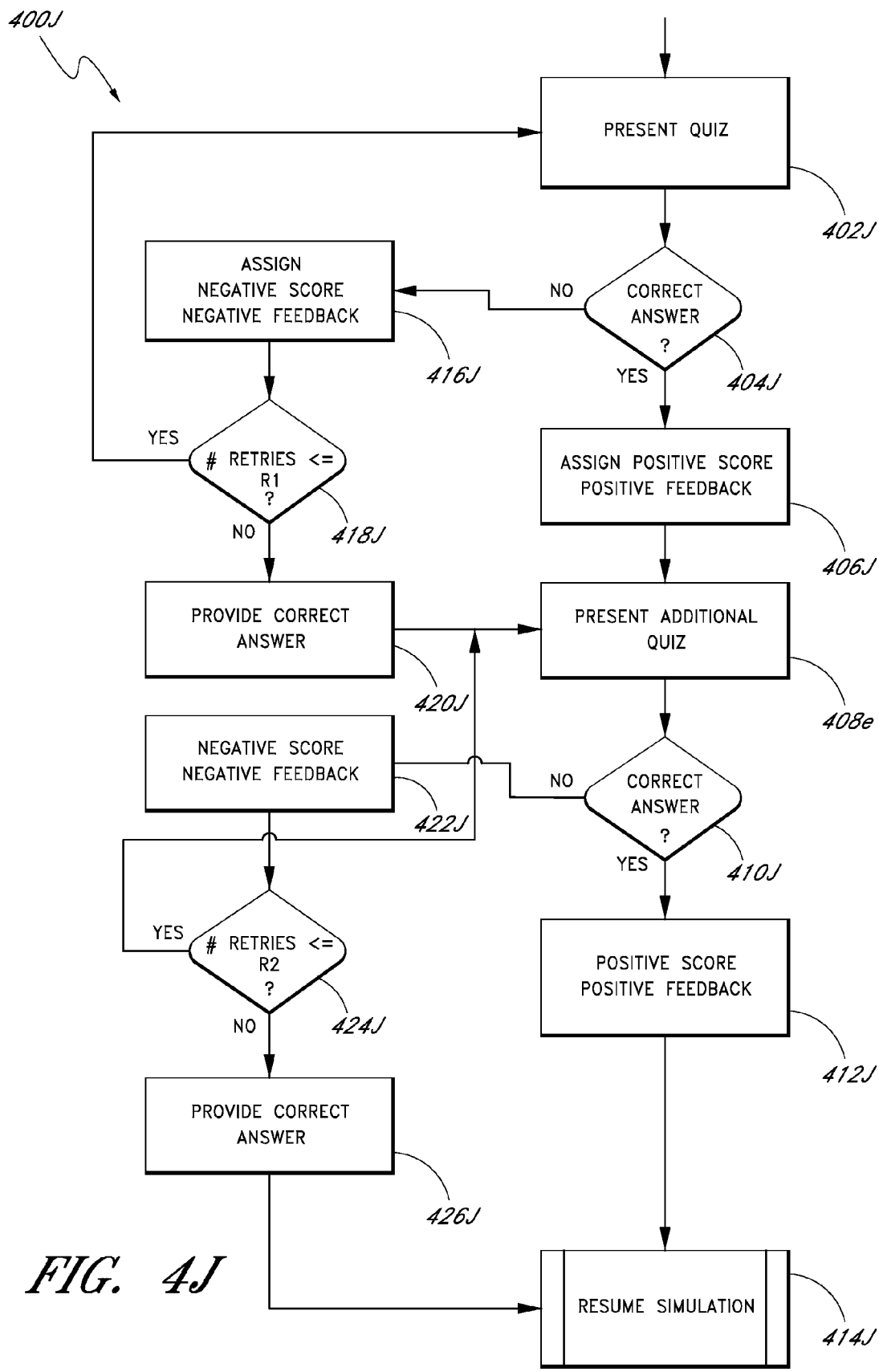
Figure 4K:
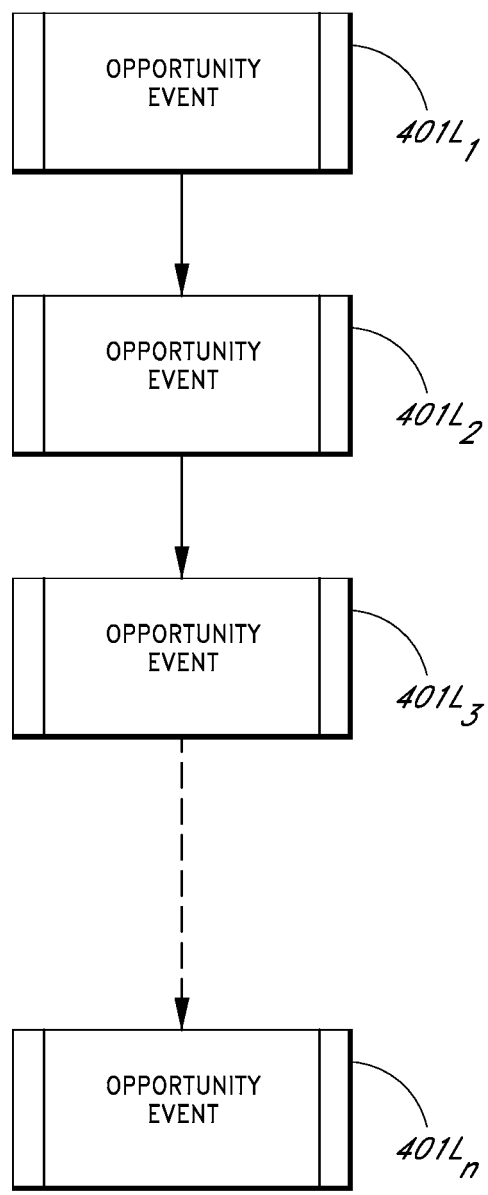
Figure 4L:
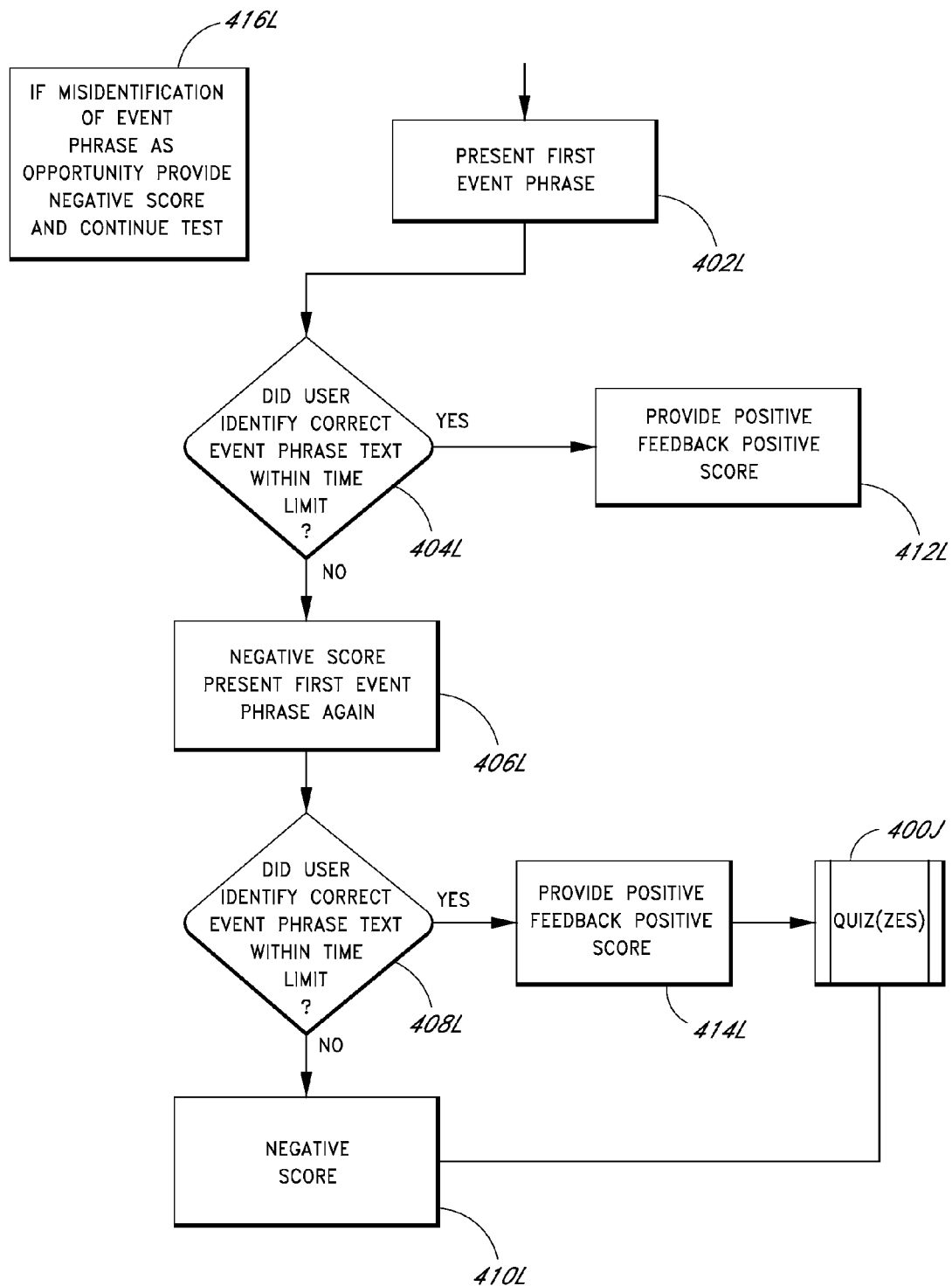
Figures 2, 4M:
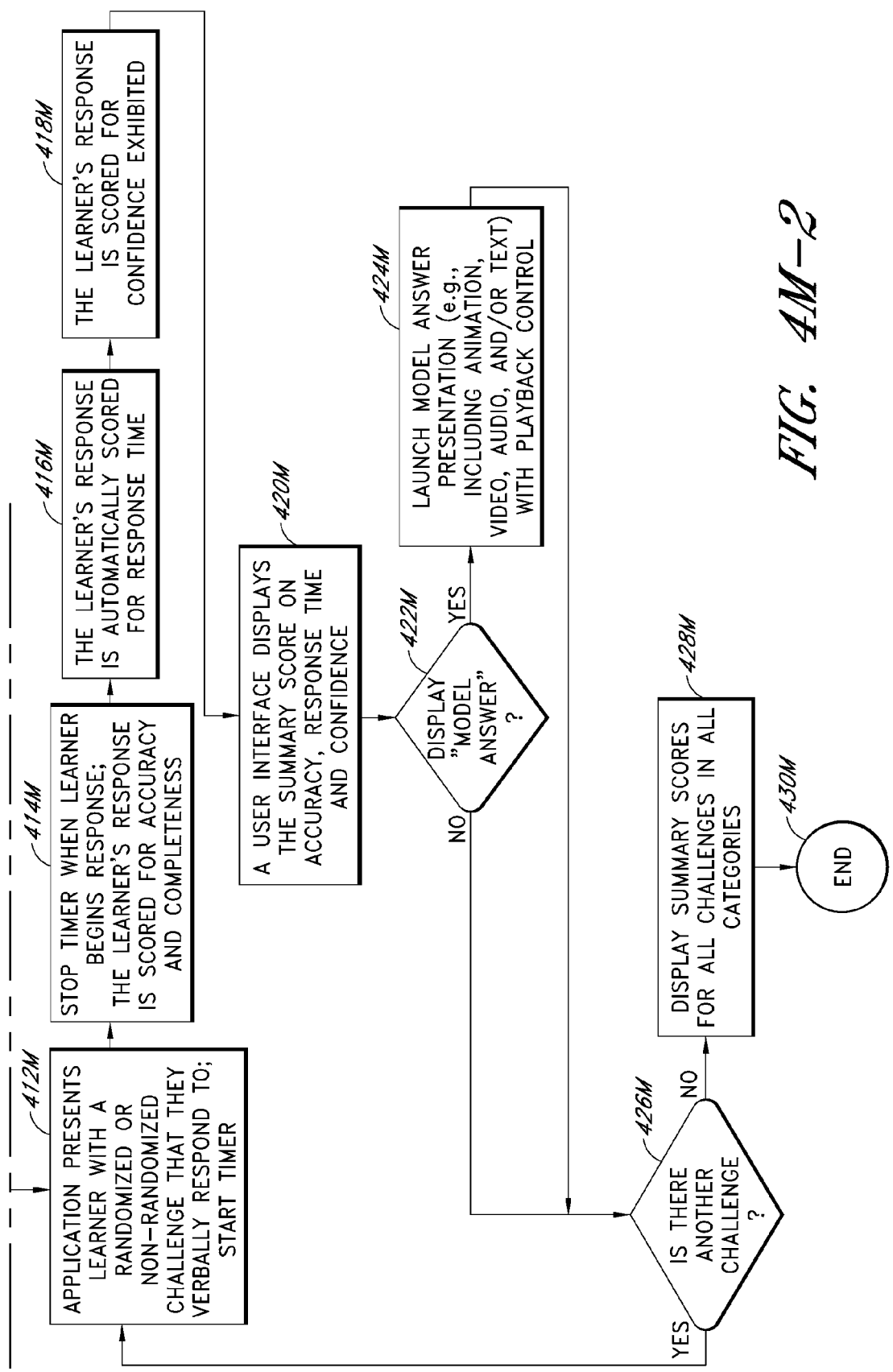
Figures 2, 4N:
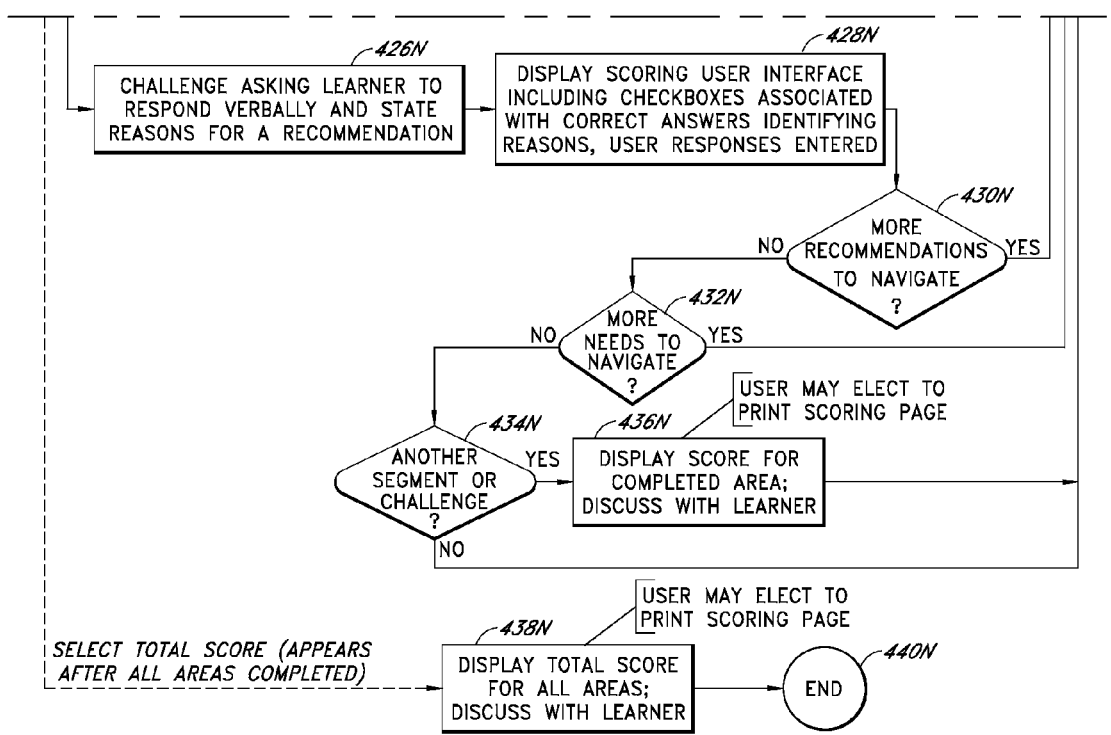

FIG. 4N illustrates an example processing using a case history approach. The process begins at state 400N, and the trainee and/or trainer log into the training system. At state 402N, the system displays a welcome screen. The system receives a selection of a training module from a menu of training modules. For example, the different training modules may relate to different subject matter. Optionally the system provides a description of the corresponding training objectives and a description of the training module. A user interface is displayed via which the trainee and/or trainer (which may be a peer) optionally selects a peer type (where the learner and/or partner indicates who their "learning partner" is for the session—a peer, their supervisor, someone whose principal job function is training, etc.).

At state 404N, a user interface is presented via which the trainee/trainer can instruct the system to display a tutorial for the learner/trainee. If an instruction is provided to launch the learner tutorial, the process proceeds to state 406N and the learner tutorial is launched and displayed by the system to the trainee (e.g., explaining what will be presented to the trainee, what the trainee will be expected to do, how the trainee will be scored, etc.). Otherwise, the process proceeds to state 408N.

At state 408N, a user interface is presented via which the trainer can instruct the system to display a tutorial for the trainer. If an instruction is provided to launch the tutorial, the process proceeds to state 410N and the trainer tutorial is launched (e.g., explaining what will be presented to the trainee, what the trainee will be expected to do, and how the facilitator should score the trainee, etc.). Otherwise, the process proceeds to state 412N.

At state 412N a case history is presented. For example, the case history can present the context or background regarding the scenario about to be presented and/or information regarding one or more scenario participants. For example, if the interaction relates to a customer looking for a new car and a sales person, the case history may provide information regarding the customer's current car, driving habits, credit rating, etc.

At state 414N, a user interface is presented via which the trainer/trainee can instruct the system to play a selected entire presentation (e.g., from a menu of presentations) or predefined segments thereof. The user interface also provides a menu of selectable challenge areas.

If an instruction is provided to play a selected presentation or a segment thereof (e.g., a relatively short segment, such as one approximately less than 30 seconds or 15 seconds in length, or shorter or longer), then at state 416N, the selected presentation or segment is displayed/played to the trainee (e.g., including video, animation, audio, and/or text). The trainee is instructed to verbally state needs identified in a specific area based on the presentation.

At state 418N, a scoring user interface is displayed. In this example, the answers (corresponding to the needs that were indicated in the scenario presentation) are displayed with associated check boxes. The trainer checks off each need the trainee correctly identified, which are then stored in computer readable memory.

At state 420N the trainee is challenged to verbally identify recommendations for a need identified based on the presentation. At state 422N, a scoring user interface is displayed. In this example, the answers (corresponding to appropriate recommendations that for identified needs) are displayed with associated check boxes. The trainer checks off each recommendation the trainee correctly identified, which are then stored in computer readable memory.

At state 426N the trainee is challenged to verbally explain/justify/provide reasons for the recommendations. At state 428N, a scoring user interface is displayed. In this example, the answers (corresponding to appropriate reasons for providing the recommendations) are displayed with associated check boxes. The trainer checks off each reason the trainee correctly identified, which are then stored in computer readable memory.

At state 430N, a determination is made as to whether there are additional recommendations to navigate. If there are, the process proceeds back to state 422N, otherwise the process proceeds to state 432N. At state 432N a determination is made as to whether there are additional needs to navigate. If there are, the process proceeds back to state 418N, otherwise the process proceeds to state 434N.

At state 434N, a determination is made as to whether there are additional challenges and/or segments to perform. If there are, the process proceeds back to state 414N, otherwise the process proceeds to state 436N. At state 436N, scores are calculated for the completed areas, and reported to the trainee, and the trainer discusses the scores and the trainee's strengths and weakness in responding to the various challenges with the trainee.

If at state 414 a determination is made that the trainee has completed the training in the areas to be covered in the training session, the process proceeds to state 438N. At state 438N, a total score is calculated and reported to the trainee, and the trainer discusses the scores and the trainee's strengths and weakness in responding to the various challenges with the trainee.

As discussed elsewhere herein, optionally, a customer/user can develop and add their own content to a training system and/or used preprogrammed content provided by another provider (e.g., customized or generic content).

Optionally, different aspects of the scenario are scripted using a generic or preprogrammed script (e.g., that can be used by different clients in a particular field) and/or a customized script (e.g., customized for a particular client using that client's nomenclature and process flows). A library of avatars may be selected by a user or administrator to "play" different parts in the scenario. For example, a list of titles associated with scenario may be presented (e.g., banker, customer; sales person, prospect; doctor, patient, wife, husband; manager, subordinate, etc.). In addition, a menu of avatars can be presented (e.g., of different genders, ages, ethnicities, clothing styles, etc.). A user can click on a participant title and on an avatar, and a scenario will use that selected avatar for the corresponding participant. Optionally, a user can select similarly select dialects, accents, and/or gender of voice to be used an avatar or without a visual presentation.

The system synchronizes the vocalization of the script with the avatar mouth and/or other motions (e.g., head, hand, arm motions). Text-to-voice technology may be used to convert the text to spoken words or a human can read and record the script and store it on the system. A menu is optionally provided via which a user (e.g., a trainee, trainer, or administrator) can select a script and/or voice recording stored on the system or a location accessible by the system.

Several example user interfaces will now be described. The various user interfaces are associated with different tools designed to provide focused training on different skill sets (although optionally a single tool can be used to provide training across several tool sets). Certain user interfaces can be used with certain of the processes discussed above.

Figure 1B:

FIGS. 1B-1E relate to performance drilling, wherein a user is drilled in responding quickly, accurately, and with confidence to challenges/statements made by others (e.g., customers/prospects). FIG. 1B is an initial interface describing the performance drilling training session and process the user is about to undergo. In this example, the user is informed that the user will be trained to enhance their ability to verbally respond to statements/challenges made by customers and potential customers (prospects). The user is informed that the training will involve pre-studying key-element response to challenges, verbally responding to simulated challenges from customers and/or prospect, and listening to simulated key-element responses to the challenges. In addition, a trainer selection user interface is provided via which the user or trainer can specify whether the trainer is a peer of the user (e.g., someone who has the same or similar position as that of the user being trained) or is a manager/supervisor.

Figure 1C:

FIG. 1C illustrates another user interface introducing a challenge section. In this example, the user interface explains that the user will be presented several randomized challenges (although other embodiments can present more or fewer challenges, and optionally the challenges are not randomized). The challenges will be based upon the product/service/solution descriptions (e.g., key elements) presented in the pre-study section. The user is instructed to verbally respond to the challenges as soon as the user hears the challenges. The user is informed that the user will be scored after a given challenge based on the user's accuracy in verbalizing key elements, the user's speed in providing a fluid, relevant, response, and the user's confidence in providing the response. The user is further informed that a scoring feedback summary will be presented to the user after completing the challenges.

Figure 1D:
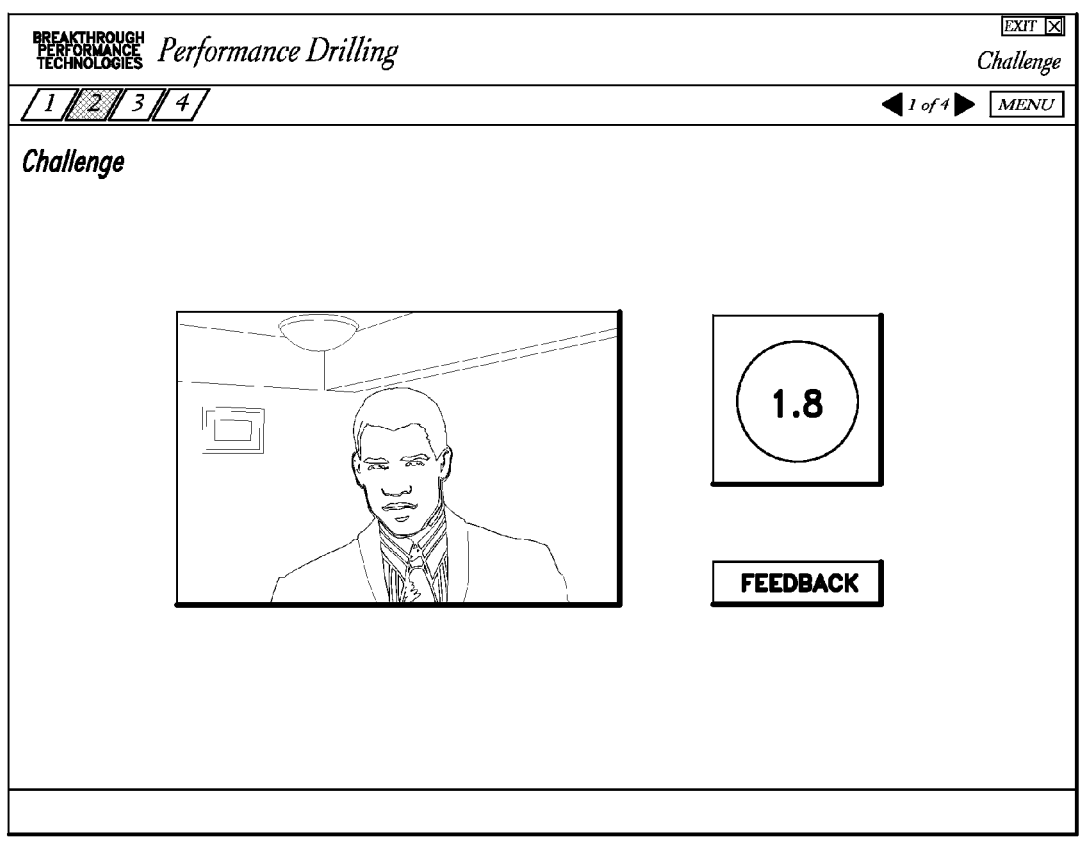
Figure 1E:
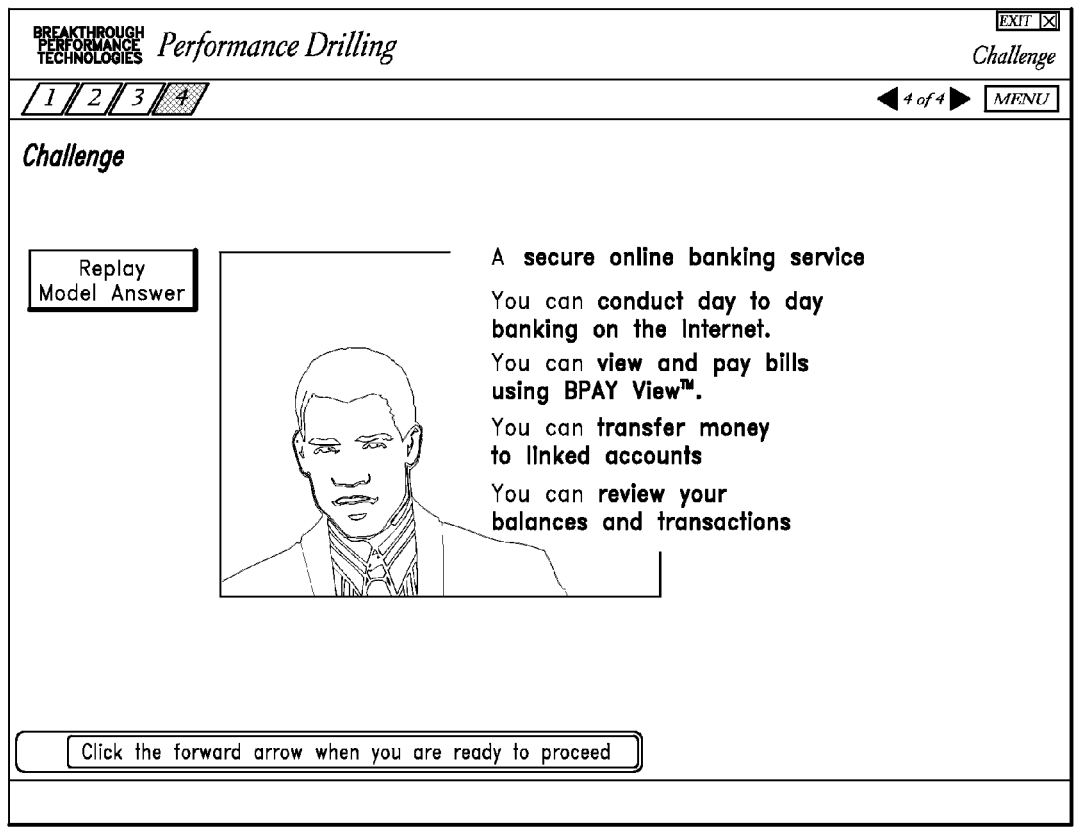

FIG. 1D illustrates a user interface including an animated character providing the challenges. The user interface further displays a feedback score based on scoring entered by a trainer for user responses to the challenges. FIG. 1E illustrates a user interface including an animated character speaking a model answer to a challenge. In this example, the spoken communication is also provided textually to further reinforce the teaching of the presented information and wording style. A "replay" control is provided, which when activated, causes the animated character to repeat the model answer (e.g., audibly with the textual reinforcement displayed). A "proceed" control is provided via which the user (and/or trainer) can instruct the system to proceed to the next segment.

Figure 1F:
Figure 1G:
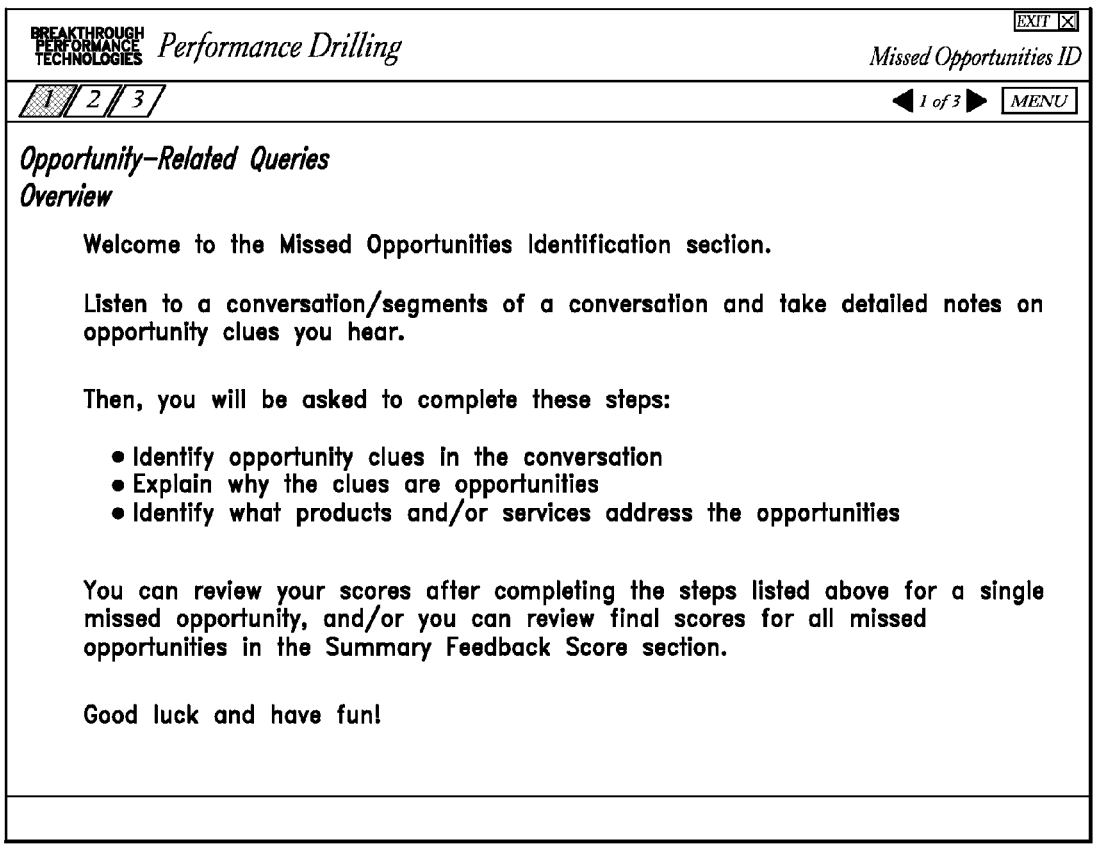
Figure 11:

FIGS. 1F-1H illustrate user interfaces that relate to identifying and appropriately responding to opportunities ("Preventing Missed Opportunities"). FIG. 1F is an initial interface describing the Preventing Missed Opportunities training session and objectives. In this example, the user is informed that the user will be trained to listen for, identify, and respond to/capitalize on opportunity clues provided by a speaker, and to become a more focused listener. The user is informed that the training will involve the user identifying opportunity clues in conversations, the user explaining why the clues correspond to opportunities, and the user identifying products and/or services that address the opportunities. In this example, the user interface explains that the Preventing Missed Opportunities training tool will not focus on identifying technique and overall style errors or the quality of recommendations (although in other embodiments, a single training tool can focus on preventing missed opportunities, identifying technique and overall style errors, and on enhancing the quality of recommendations). A trainer selection user interface is provided via which the user or trainer can specify whether the trainer is a peer of the user or is a manager/supervisor.

FIG. 1G illustrates a user interface that provides an overview of the queries the user will be expected to respond to with respect to opportunities. In particular, the user is informed that the user is to listen to a conversation (or segments thereof), and is to take notes regarding opportunity clues that the user has identified. The user is further informed that the user will be expected to perform the steps of verbally identifying opportunity clues in the conversation, explain why the clues correspond to opportunities, and identify what products and/or services address the opportunities. The user is informed that the user will be able to review the user's scores after completing the foregoing steps for a given opportunity clue and/or will be able to review final scores with respect to all of the opportunity clues presented during the training session in a summary feedback score report.

FIG. 1H illustrates a scoring user interface with respect to opportunities training. In this example, the scoring user interface is directed to scoring with respect to a single opportunity clue (although optionally instead, a scoring user interface can be used to score the user's performance with respect to multiple opportunity clues). The scoring user interface in this example has the following scoring sections:

Identification of opportunity clue;
 Explanation regarding why the opportunities corresponding to the opportunity clue are opportunities (where they may be one or more corresponding opportunities);
 Recommendations of products and/or services and/or other solutions/responses to opportunities that address a corresponding opportunity.

In this example, the scoring user interface provides the correct answer so that the trainer performing the scoring does not have to look at other reference material in order to perform the scoring and does not have to be highly trained. To further ease grading, in this example, rather than having to enter a number, the trainer merely clicks on a box to indicate that the user provided a correct answer and the system totals and displays the corresponding number of points. While in this example, each correct answer is worth one point, optionally instead different answers (e.g., for different types of questions) can be worth a different number of points. For example, the identification of an opportunity clue can be worth five points, the explanation as to why it is an opportunity can be worth three points, and the identification of products and/or services can be worth one point for each product or service correctly identified. Optionally, negative points can be assigned for incorrect answers (e.g., a recommendation of an inappropriate product or service). Because the correct answers are displayed, the scoring page can also be used by the user for post-study once the session has concluded.

FIGS. 1I-1M illustrate user interfaces that relate to identifying correct techniques and erroneous techniques in a conversation or monologue ("Error Based Learning Objective"). FIG. 1I is an initial interface describing the Error Based Learning Objective training session and objectives. In this example, the user is informed that the user will be asked to identify techniques implemented correctly in a conversation, identify technique errors, state why it is important to correct the errors, verbalize the correct technique guideline language for a given error in the first person, identify style elements that were implemented correctly, and identify style elements that were implemented incorrectly. The user is informed that the user can optionally listen to correct, role-modeled guideline language for a given technique error.

In this example, the user interface explains that the Error Based Learning Objective training tool will not focus on identifying opportunities or the quality of recommendations (although in other embodiments, a single training tool can focus on preventing missed opportunities, identifying technique and overall style errors, and on enhancing the quality of recommendations). A trainer selection user interface is provided via which the user or trainer can specify whether the trainer is a peer of the user or is a manager/supervisor.

The user interface illustrated in FIG. 1J describes the tasks the user is to perform with respect to elements of a technique. The user is informed that the user will listen to a conversation, or segment thereof, and is to take detailed notes on correctly and incorrectly delivered questions posed to a customer/prospect regarding financial needs. The user is further informed that the user will be asked to (verbally) identify techniques implemented correctly in a conversation, identify technique errors, state why it is important to correct the errors, verbalize the correct technique guideline language for a given error in the first person, identify style elements that were implemented correctly, and identify style elements that were implemented incorrectly.

The user is informed that the user can optionally repeatedly refer to pre-study material for a given segment and can listen to correct, role-modeled guideline language for a given technique error, which is "verbal error correction first person role modeling". The user is informed that the user will be able to review the user's scores after completing the foregoing steps for a given conversation segment and/or will be able to review final scores with respect to all of the conversation segments presented during the training session in a summary feedback score report.

The user interface illustrated in FIG. 1K provides an overview of the conversation the user is about to hear. In this example, the conversation context is described (e.g., where the conversation is taking place, who the participants are, why are the participants in the conversation, etc.). The immediate steps the user is to take are described (e.g., wherein the user is instructed to note correct and incorrect key elements of a given participant in the conversation). In addition, other acts the user is to take are described (e.g., prepare to state why it is important to correct the errors, and to verbalize the correct technique guideline language for a given error in the first person, and note the correct and incorrect style elements identified during the conversation).

The user interface illustrated in FIG. 1L lists additional steps the user is take. In this example, the use interface explains that the user has the option of: listening to the entire conversation and immediately responding to all challenges in a listed order; listening to the entire conversation, then listening to individual segments from the entire conversation before listening to challenges specific to each segment; or listening to individual segments and answering questions specific to each segment without first listening to the entire conversation.

Figure 1M:

FIG. 1M illustrates an example user interface via which the user and/or trainer can instruct the systems to playback the entire conversation (e.g., both audio and video components), select playback of one or more specific conversation segments (wherein the segment name describes the segment content and/or selected conversation segment challenge).

Of course fewer, additional, or different user interfaces using different language can be employed.

With respect to the examples discussed herein, while certain embodiments may be described herein using a leader-led format (e.g., with an experienced trainer), a peer-to-peer format (e.g., wherein the skill level of the "trainer" is similar to or less than that of the trainee) may be used as well. Similarly, while certain embodiments may be described using a peer-to-peer format, a leader led format may be used as well. With either format, optionally the trainer scores the trainee's performance objectively, even when the trainee is providing substantially free-form verbal answers, because correct answers are pre-programmed and available to the trainer.

Further, because the scoring in performed using pre-programmed answers, the trainee is much less likely to blame the trainer for a poor score, providing an intellectual and emotional "fail-safe" for the trainer. Notwithstanding the foregoing, the training can be performed solo as well.

While certain embodiments are described wherein a user is verbally questioned and asked to verbally respond, optionally the questions can be textually displayed on a training/user terminal and optionally the user can respond using a keyboard, mouse, or other user input device coupled to the terminal. While certain embodiments are described wherein a trainee/user is queried using queries that do not contain possible answers from which the user is to select (e.g., multiple choice questions, true/false questions, etc.), such types of questions can optionally be used in addition to or instead of the queries discussed above. While certain embodiments are described wherein a trainee/user is queried using questions that do contain possible answers from which the user is to select (e.g., multiple choice questions, true/false questions, etc.), open ended questions that do not include answers from which the user is to select can optionally be used in addition to or instead of the queries discussed above.

For example, using embodiments described herein, the user may be asked to identify the error made by an actor and/or opportunity, such as an opportunity missed by an actor. The error may be an error in the choice of words. Once the user has intervened, the user is optionally presented with a multiple choice textual list of errors, other wording choices, and/or opportunities from which the user is to select the error, other wording choices, and/or opportunity presented directly before the user intervened. By way of example and not limitation, the list can be presented via a drop-down menu or screen, a pop-up window, or otherwise. Optionally, rather than a multiple choice selection, the user may be presented with a true/false choice or a verbal question that does not include an answer to be selected. The user can also be presented with an on-screen field in which the user types in or otherwise enters what the user thinks is the opportunity/error. Optionally, once the user identifies the opportunity using one or more of the foregoing techniques, or using a different technique, the system can automatically present to the user the actual or correct pre-programmed opportunities/errors. Optionally, if a public speaker is being presented in a training session, the user can be asked to identify statements that are compelling, that sound trustworthy, that sound untrustworthy, that are annoying, etc., by clicking on a button, a corresponding quiz answer, or otherwise.

This training process thus provides users with an interactive discovery and learning process that helps users identify errors, opportunities, or other events during training so that they may avoid such errors in their own interactions and be better able to respond to such opportunities. Further, the example process provides users with an interactive discovery and learning process that helps users identify opportunities during training so that they may identify and take advantage of similar opportunities and avoid errors in their own interactions with others.

Optionally, the user may be provided with a time-limited window after the error or opportunity is presented to intervene and/or identify the occurrence of the error or opportunity. The use of such time response windows is very motivational because users have to interact within the relatively short time windows, thereby better ensuring user attentiveness and engagement. For example, the window can be a two second window, a five second window, or other window duration. Optionally, a timer is provided that has a visual representation of a which changes colors from green (when there is a significant amount of time to intervene and/or identify the occurrence of an event) to yellow (when the time limit is approaching) to red (when the time limit has been reached), and which optionally has digital running numbers within it showing the time remaining. Optionally, a score related to a promptness is providing an answer can change (e.g., decrease) as the colors change.

Optionally, different time periods can be used for different errors and/or opportunities. Further, a short time period or longer time period can be used for different users. For example, more advanced users/trainees can be provided with a relatively shorter period of time in which to respond than relatively less advanced users/trainees. Optionally, the size of the time window can be selected by a training administrator. Optionally, the size of the time window can be selected by the user being trained. Optionally, the size of the window can automatically be adjusted by the training system software based on the user's previous responses.

In an optional embodiment, when a user does not react to the error or opportunity (e.g., by activating a control indicating that an error or opportunity has been heard/identified), the role-play simulation automatically stops. Then the module portion containing the error or opportunity is repeated so that the user can hear/see the previously missed error or opportunity, and a quiz is presented to the user. The quiz for example, optionally asks about the nature of a given error or opportunity, and appropriate actions that should have been taken. In addition, the user is optionally "held accountable" for identifying opportunities and indicating how to capitalize on the presented opportunities (e.g., recommend appropriate products or services). In an example embodiment, users learn the correct actions to take for a variety of situations via a variety of appropriate role-simulation modules. At the end of a module, the user's score is optionally displayed so the user can monitor his or her progress. Because the modules optionally provide substantially instantaneous and automatic feedback, rapid quality learning and engagement are achieved.

The system can store and/or score a user based on the number of the user's correct and incorrect interventions of the pre-recorded scenario. In addition, the score can optionally be based in part on the presumed difficulty of identifying a given error or opportunity and/or how quickly the user correctly identified the error or opportunity. Optionally, if the user identified an error or opportunity where none existed, the user's score can be decremented by assigning negative points or other decrementing score to the incorrect identification.

Optionally, as similarly described elsewhere herein, group training is provided by the training system in a competitive manner, further engaging users' attentiveness. For example, multiple users can view a given scenario or corresponding user terminals at substantially the same time. The users can compete, wherein the first user that correctly identifies a given error and/or opportunity wins or is awarded a highest score with respect to identifying the given error and/or opportunity. Optionally, relatively lower scores can be provided to those users who later correctly identified the given error and/or opportunity, wherein higher scores are provided to those who more quickly identified the given error and/or opportunity. Optionally, a lowest possible or zero score is given to those who fail to intervene and/or to those that intervene outside of the predetermined window. Optionally, a negative score (a score that indicates an incorrect user indication) is assigned to those that intervened when no error and/or opportunity occurred. Optionally, users are not presented with the list of errors and/or opportunities at the time the users failed to make a correct identification.

At the completion of a group training session or sub-session, the scores can be totaled for each participating user and the scores can be presented to the users, optionally ranked in accordance with the scores.

Optionally, a given pre-recorded segment is not repeated the same day, or within a predetermined duration, to better ensure that a user is consistently challenged by different scenarios. Optionally, pre-recorded segments can be repeated periodically, and/or repeated in response to a user scoring below a predetermined threshold for a corresponding segment.

An example training process that utilizes multiple choice questions (rather than the open ended questions discussed above) will now be described in greater detail. In the following example, rather than provide a verbal answer, the user selects/enters answers via computer.

In this example, a user can launch and optionally log into a training system program. Optionally, during the log-in process a user identifier and/or password is provided to the training system so that the system can automatically select the appropriate training module for the user and store the user's interactions and/or score in a database in association with the user identifier.

Optionally, the system can present with a selection of modules, such as segments or training sequences and the user selects the desired segment or sequence. Optionally, a training administrator can select and specify the segments to be presented to the user. Optionally, the system automatically selects which segment is to be presented.

Before presenting the segment, text, audio, and/or video, instructions are presented to the user which explain to the user the purpose of the selected training module, the different interactive possibilities that exist within the selected training module, how the user is to interact with the training program, and scoring process.

The user then clicks on a "start" button (or takes other appropriate initiation action) and the training module's audio and/or video segment begins playing on the user's terminal. The video can include real or animated figures that articulate or appear to be "articulating" the pre-recorded audio track. For example, the simulation can be generated using Macromedia Flash or using other applications. The training segment can be two to five minutes in length, or other length. Within the pre-recorded audio track are pre-programmed opportunities and/or errors, which are identified using metadata not visible to the user at the time the corresponding opportunity or error is presented to the user.

When the user thinks he or she has identified an opportunity and/or error related to the skill being trained, the user presses an appropriate keyboard or mouse key (or otherwise provides an appropriate response) to so indicate. The training system determines whether the response was provided within a predetermined response time window (such as within 5 seconds of the occurrence).

If the user correctly identifies the occurrence of an opportunity/error within the prescribed time window, a variety of possible text messages are displayed on the screen. For example, the user can be presented with a free form question (e.g., that does not include an answer from which the user is to select), multiple choice, true/false, or fill in the blank type question. The user then provides a response to the question to the system. For example, the multiple choice question may list a number of possible errors or opportunities, and the user needs to select the error or opportunity that actually occurred in the corresponding segment. After the user provides a response, the training system and/or a human facilitator sitting with the user or remote from the user can then determine if the user response was correct or incorrect and assigns an appropriate score to the response. Substantially immediately after making the determination as to the correctness of the answer (and/or at a later time), the training system can optionally provide the user with the correct answer if the user's answer was incorrect, or, if the user's answer was correct, the training system can so inform the user. Optionally, the user may be given multiple chances to select the correct answer. For example, the user may be provided with two chances to select the right answer in a four choice multiple-choice test, and if the user selects the incorrect answer on both attempts, the system identifies the correct answer.

If the user does not take the appropriate action to identify the occurrence of an error or opportunity within the prescribed timeframe, and provides identification thereafter, optionally, the text messages for the opportunity or error are not presented to the user at this time, and the user's action is recorded as an error with respect to the scoring. Optionally, an indication can be immediately provided to the user via an icon, pop-up text message, tone, or otherwise, indicating that the user missed identifying the occurrence within the time window.

If the user does not take the appropriate action to identify the occurrence of an error or opportunity within the prescribed timeframe, the text messages for the opportunity or error are not presented to the user at this time, and the user's action is recorded as an error with respect to the scoring. Optionally, an indication can be immediately provided to the user via an icon, pop-up text message, tone, or otherwise, indicating that the user missed identifying the occurrence.

Optionally, once the right answer has been selected by the user, or after the correct answer has been automatically displayed as a result of the user failing to select the correct answer, another question, which can be in the form of a multiple-choice test, is displayed which, for example, can ask the user what would be the right way to capitalize on the opportunity or what would be the correct way to handle the situation as compared to the erroneous way a situation was handled in the pre-recorded scenario.

After the questioning or testing process for a given error or opportunity is complete, the scenario resumes. Optionally, the scenario can resume from the beginning of the just reviewed opportunity/error so that the balance of the scenario is in context.

Optionally, if the user failed to identify the error and/or if the user clicked on what the user believed to be an opportunity/error but was not, the scenario, including the audio track, continues to run without pausing. Optionally, the scenario can instead be paused, and the user can be informed of the user's failure during the pause.

Optionally, the user is not provided with prompts during the playing of the scenario to better ensure the user's attentive interaction.

Optionally, the user can be prevented or not provided with the ability to rewind or play back sections for a "do over" until the entire segment is completed and initially scored.

Once the segment is complete, the system automatically presents the user with the user's score for the segment. Optionally, the user can be provided with the scores of others for the segment and/or the user ranking relative to other users.

Preferably, the user repeats the particular audio and/or video pre-recorded segment within a specified period of time, such as 24 hours, with peers and/or coaches to solidify and advance the learning. Optionally, when the audio and/or video segment is repeated, the user is to intervene as described above, but if the user correctly identifies the existence of an opportunity/error, the questions described above are not displayed to the user. Instead, optionally, a coach is automatically provided with the question and answer by the training system, such as via a computer screen, and/or via a coaching manual. The coach can ask the user the same or similar questions presented to the user when the user previously went through the segment. However, in this case, the user is to proactively verbalize the correct answers without prompting previously provided via the multiple choices, and/or true/false statements. The coach can store in the user performance (e.g., the number of correct answers, the number of opportunities identified, etc.) in computer readable memory. The system can then calculate and display a score.

The training procedure can be modified as desired. For example, the presentation of a training scenario can be presented to a participant as similarly described above, except that the participant is instructed to write down (or type into a field presented on the participant terminal) the opportunities and errors that the user believes he heard or observed. Once the segment has completed, the participant can be instructed to write down (or type into a field presented on the participant terminal) and/or verbalize why there were opportunities and errors, as well as the methodologies that can be used to capitalize on the opportunities and correct the errors. The user then presses an "answer" icon or the like, and the segment replays, and automatically pauses at the pre-programmed areas/opportunities, at which point the correct answers are displayed in conjunction with the participant's previously written responses. Optionally, a coach or other supervisor monitors the foregoing to reduce cheating.

Optionally, if a user misses the error or opportunity in the training scenario (e.g., in the script of the program), after a short window of time (e.g. a predetermined, set period of time, such as 3 seconds, 5 seconds, 15 seconds, or 25 seconds), the program will provide a verbal and/or visual notification to the user that an error or opportunity has been missed. The scenario presentation can then be, "rewound" to the point where the error was presented (or shortly before the error was presented) and a drop-down menu or multiple choice form is presented to the user listing several possible errors/opportunities, wherein one of the listed errors is the error that actually occurred. The user is asked to select the error/opportunity that occurred. If the user selects the correct error/opportunity, the user's answer is scored as correct or as partially correct, to take into account that the user had to be prompted to select the correct error/opportunity. Optionally, an error/opportunity menu is not provided to the user. Instead, the user is to type in a free form identification of the error/opportunity.

Example opportunities will now be described with respect to different types of training. In these examples, the opportunities are raised by a customer mentioning something during the scripted conversation. Selected opportunity-raising lines can be incorporated into corresponding scenario scripts.

| BANKING RELATED OPPORTUNITIES | |
| --- | --- |
| SCRIPT | CORRESPONDING OPPORTUNITY |
| Customer mentions a trip | Offer to increase credit limit on credit card |
| Customer mentions a remodel | Offer home equity loan |
| Customer mentions a new child | Offer college savings account |
| Customer mentions inheritance | Offer investment product |
| Customer mentions an account with another institution | Offer to transfer the account to bank |
| Customer mentions credit cards with other institutions | Offer to consolidate credit card debt "It is possible to consolidate debt" |

| TRAVEL AGENCY RELATED OPPORTUNITIES | |
| --- | --- |
| Script | Corresponding Opportunity |
| Customer mentions being tired of the cold | Offer trip to warm vacation spot |
| Customer mentions fear of flying | Offer train-based trip |
| Customer mentions loving to drive | Offer to arrange for a convertible car rental for vacation |
| Customer mentions enjoying food | Offer to arrange reservations at highly rated restaurants during vacation |
| Customer mentions having children | Offer to arrange for babysitter during trip |
| Customer mentions that customer is worried of trip related cancellation costs if customer becomes ill | Offer trip insurance |

Scenarios A-D, provided below, include example scenario scripts having embedded opportunities and errors, as well as example questions regarding the opportunities and errors. Scenarios A and B are directed to banking. Scenarios C and D are directed to a travel agency. The training systems and processes can also be used for other types of financial services, multi-level sales organizations, automotive sales and service, retailing, mass market sellers of products and services, personal relationships and so on.

Figure 2:
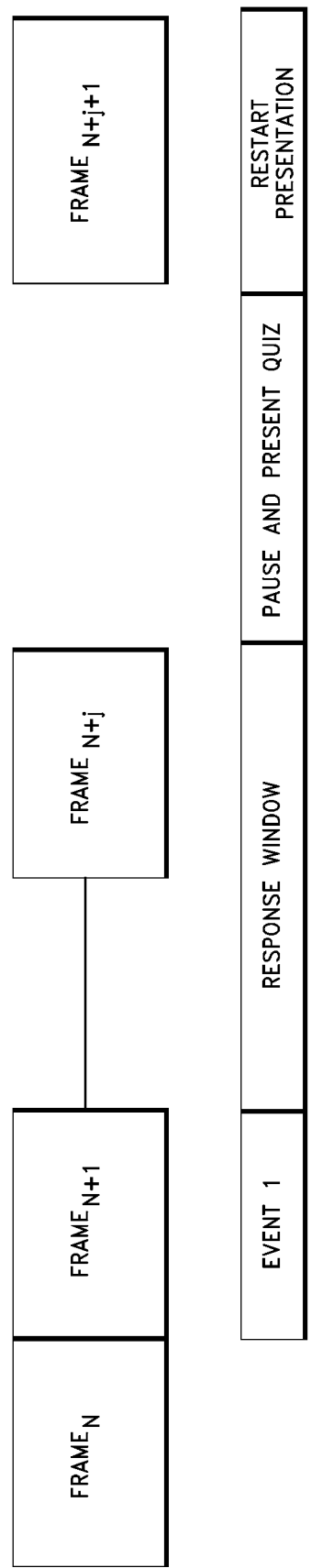
FIG. 2 illustrates an example training presentation.

FIG. 2 illustrates an example series of frames in a video/audio training presentation. The frames can be animation frames, video frames, or other type of frames. In this illustration, the frame sequence is shown in uncompressed form, although the frames can be compressed using a variety of compression techniques (e.g., a version of MPEG), which may result in certain frames being dropped. As illustrated, at Frame$_{N+j}$ an event Event1 occurs which the user is to identify (the event may occur over several frames, rather than one frame). A response window is provided within which the user needs to identify the event. If the user identifies the event within the window, the presentation continues until the end of the time window, at which point the presentation is paused and a quiz is presented. Optionally, no scenario frames are presented to the user while the presentation is paused. Once the user has completed the quiz, or optionally, after a predetermined amount of time, the presentation is restarted at Frame$_{N+j+1}$. If the user fails to identify the event at frame Frame$_{N+j}$, then Frame$_{N+j}$ (as well as an optional number of frames before and after Frame$_{N+j}$) will be presented to the user again.

Figure 3A:
FIGS. 3A-Y illustrate additional example user interfaces.
Figure 31:

FIGS. 3A-V illustrate additional example user interfaces for training personnel in the financial services field, which can be accessed from a training Website via the Internet, from a local user terminal memory, or otherwise. Other interfaces can correspondingly be used for other applications (e.g., training of travel agents, retail store customer service personnel, managers, teachers, parents, siblings, spouses, actors, singer, etc.). In this example, a bank customer service person (e.g., an employee) is interacting with a bank customer. In this example, the optional visual component of the dramatic interaction is provided via animated figures sequenced with an audio track, although video sequences or real people can be used as well. Optionally, user accessible controls (e.g., rewind, pause, fast forward, play, etc.) are provided to the trainee to allow the trainee to control the presentation. The controls can be "soft" buttons displayed on a computer monitor and activated via a mouse, keyboard, or other user interface, and/or the controls can be provided via a dedicated physical control, remote control device, or otherwise.

In this example, the trainee will review a presentation of an example interaction (e.g., a simulated interaction) first in an "uninterrupted mode" and then in an "interactive mode". In this example embodiment of an uninterrupted mode, the trainee may take notes regarding errors made by the customer service person (e.g., an employee) in following a bank-specified customer interaction routine, and opportunities missed by the customer service person, wherein the opportunities may be provided by the customer's remarks. However, in uninterrupted mode, the presentation will not be paused for quizzes, and optionally, the pause and rewind controls are disabled and/or are not presented. Optionally, the trainee can skip the uninterrupted mode presentation. For example, optionally, if the user has previously viewed the interaction presentation, a skip uninterrupted presentation button (e.g., a "skip part 1" control) is presented and enabled, which, when activated by the user, will cause the interactive presentation to be presented without presenting the uninterrupted presentation.

In an example embodiment of an interactive mode, quizzes are presented and the trainee's answers are recorded in computer readable memory, such as in the database discussed above, in association with an identifier associated with the trainee, and in association with an identifier associated with the corresponding training module. For example, during the presentation the trainee may be requested to indicate when the trainee has identified an error in the customer service person following a prescribed customer interaction routine (e.g., first greet the customer, ask the customer what the customer came in for, ask the customer when the customer last refinanced their home, ask the customer if the customer has any upcoming large expenditures, etc.). An additional quiz, such as a quiz asking the trainee to identify opportunities missed by the customer service person, may optionally be presented at the completion of the enactment.

As similarly discussed above, with respect to the quiz presented during the course of the simulation presentation, the trainee may be provided a window of time in which the trainee needs to identify an error. For example, the trainee may need to identify an error within a window of 7 seconds after the occurrence of the error (or after the end of the sentence, phrase and/or concept being presented that includes the error) in order to receive a score indicating a successful error identification. Other windows of time can be used as well, such as 11 seconds. Optionally, different time windows can be used based on the difficulty of the test, the particular question, the rating or experience of the trainee, and so on.

In one example embodiment, a control, such as a Phrase, Error, and/or Stop button (which will sometimes be referred to as an Error/Stop button), or other control of a first color (e.g., red) is presented which the trainee clicks or otherwise activates on in order to indicate that the trainee identified an error, an opportunity, or a significant phrase. Optionally, in addition to the button, the trainee can click in a larger area (e.g., an area surrounding and/or including the button) in order to identify an error. If, upon the occurrence of an error, the trainee clicked on the Error/Stop button (or other designated area) within the corresponding time window, the Error/Stop button will change colors (e.g., to green), and the trainee will receive an appropriate score. Optionally, the interactive presentation does not stop immediately upon the clicking of the Error/Stop button. Instead, the interactive presentation continues to be presented until the end of the sentence, and/or concept being presented. Optionally, the simulation can be halted substantially immediately after the Error/Stop button is activated. After the correct activation of the Error/Stop button, a pop-up quiz is then presented to the trainee. For example, the pop-up quiz can include one or more multiple-choice questions. Where there is more than one question, the questions are optionally presented sequentially. Optionally, the pop-up quiz is not a timed quiz, although in one embodiment, the quiz is timed (e.g., the trainee has to answer the quiz question(s) within a predetermined time window) to provide for speed testing.

Optionally, if the trainee incorrectly answers a quiz question, the quiz question may be presented again to the trainee and the trainee can again attempt to correctly answer the quiz question. The number of retries can be set to "1" or another designated number (e.g., 2 or 3). Optionally, different trainees may be provided with a different number of retries, based on certain trainee characteristics (e.g., the trainee's job title, the number of times the trainee has viewed or utilized the training presentation, etc.). Optionally, the number of retries offered can be varied based on a quiz or quiz question characteristic (e.g., the perceived quiz difficulty, the number of choices in a quiz multiple choice question, etc.). If, after utilizing the designated number of retries, the trainee has failed to correctly complete the quiz question, the correct answer is optionally presented (optionally, while also presenting the quiz question) to the trainee before the presentation continues.

A score is assigned to the trainee's quiz performance (e.g., based on whether the trainee correctly answered the quiz, how many retries the trainee needed to correctly answer the quiz, and/or the time it took the trainee to correctly answer the quiz, etc.), and the score is stored in computer readable memory in association with a trainee identifier and a presentation module identifier. The simulation presentation then continues (e.g., automatically, after completion of the quiz or in response to a trainee command).

If the trainee incorrectly indicates that an error occurred during the presentation by activating the Error/Stop button, for example, when no error had occurred within a selected window of time (e.g., 7 seconds) prior to the activation of the Error/Stop button, optionally, the Error/Stop button does not change color (e.g., the Error/Stop button remains red). Optionally, the button has an error message displayed thereon and the button changes color to indicate an erroneous activation. The trainees score is decremented or otherwise adversely affected to reflect the incorrect identification of an error. The simulation presentation is optionally not stopped or paused at this time, but is allowed to continue without interruption.

If the trainee fails to timely (e.g., within a selected window of time after the occurrence of the error or after the end of a phrase or sentence within which the error occurred) identify (e.g., by activating the Error/Stop button) an error that occurred during the presentation, optionally the Error/Stop button's color is changed (e.g., to green or another color), a text and/or graphic message is displayed indicating that the user missed the error, the presentation automatically stops, and the portion of the presentation in which the error occurred is automatically replayed. Optionally, the replay begins at a predetermined portion of the presentation before the error occurred, and/or the replay ends at a predetermined portion of the presentation after the error occurred, and a pop-up quiz (e.g., the multiple choice quiz or verbal questions discussed as discussed elsewhere herein) is presented. Quiz retries, scoring, and the correct answer presentation may be performed as similarly described above. The simulation presentation then continues (e.g., automatically, after completion of the quiz or in response to a trainee command).

At the conclusion of a simulation presentation another type of quiz is optionally presented, which, for example, can relate to opportunities (e.g., missed opportunities or other opportunities). A list of phrases is verbalized and supported by identical or corresponding text messages. Each of these phrases is presented on a separate screen. For example, the trainee may be asked to identify when an "Event phrase" (e.g., a phrase that indicates an opportunity for the customer service person to offer additional services to the customer, or an opportunity to refer the customer to another service provided within or outside of the trainee's company that can provide the customer with relevant services and/or products) is correctly identified. The phrase may be presented via the training terminal textually, audibly, and/or in the context of a visual interaction between two people. Optionally, this portion of the quiz is time-pressured. For example, a user interface is provided with the text displayed and phrases spoken for only a predetermined window of time (e.g., approximately 3 seconds). If the trainee correctly clicks on a designated area (e.g., the text message or other designated area), corresponding feedback is provided to the trainee (e.g., a positive tone is generated and/or a text acknowledgement appears indicating that the correct phrase was identified by the trainee).

If the trainee does not correctly click on a designated area (e.g., text message) within a predetermined amount of time, the next phrase quiz is automatically presented within a predetermined amount of time (e.g., 3 seconds or other desired period). Optionally, at the time the trainee fails to identify an event phrase, an indication of the failure is not provided to the trainee, although in another embodiment, such an indication is presented to the trainee. A score is recorded and presented to the trainee and, optionally, to a training supervisor or other designated personnel, indicating or corresponding to, the number of correctly identified event phrases, the number of correct multiple-choice answers, the number of unidentified event phrases, and/or the number of missed presentation errors. Optionally, a cumulative score (e.g., a number score, a graded score, or other score) that reflects the total trainee performance for a given module or for multiple modules can be provided in addition to, or instead of separate scores for each quiz or test type. These scores can further be used as a post-study as an aid in reviewing the missed items and as a focus for improving performance in future sessions.

Optionally, once the phrase identification portion of the quiz is completed, a multiple-choice or other quiz is automatically presented to the trainee, which optionally follows the format of the pop-up quiz discussed above.

Optionally, a module can include detail oriented timed testing. For example, a detailed audio and/or video narrative can be played to a trainee. The training system automatically pauses at various points (e.g., predetermined points) during the narrative and tests the trainee on how much narrative detail the trainee remembers and/or on the trainee's listening and/or reading comprehension. Optionally, the test questions are timed, wherein the trainee has a set limited time in which to answer a given question and/or a set of questions (e.g., true/false questions, multiple choice questions, or questions requesting the entry of a word or multiple words). After the trainee answers a question or set of questions and/or after a predetermined amount of time elapses, the narrative resumes and continues until the next predetermined point in the narrative, and another question is presented to the user. The foregoing process continues until the narrative end is reached. Optionally, the user is provided with feedback after each question and/or set of questions is answered, the feedback indicated whether the questions were correctly answered. Optionally, if the user answers a question incorrectly, the user may be given another chance to answer the question.

Optionally, a module can include "intrusive thoughts" practice. During a module, such as during the playing of a scenario, the user is instructed to indicate (e.g., by clicking on an appropriate icon or other designated area) when a "foreign thought", not related or not significantly related to the task hand, enters the users mind. The user indication can be stored in memory and the user can be provided with an indication as to how many "foreign thoughts" the user had. The foregoing process is intended to bring awareness of intrusive thoughts to the user and to help the user practice refocusing their thoughts on the subject at hand.

Two additional training sessions will now be described to further illustrate examples of the training system and processes. The first example emphasizes the interactive aspects of a training session where the training session has a relatively higher degree of interactivity, and the second example emphasizes listening comprehension training, wherein the interactivity is relatively more limited (e.g., wherein interactivity with the training system is optionally limited to quizzes).

In the first example:

1. Text instructions with a pre-recorded audio that corresponds to the text instructions are stored in computer readable memory (e.g., a training module scenario database), optionally on a screen-by-screen basis.
2. Optionally, a pre-recorded audio-animation or live action simulation ("Simulation") is stored in the module scenario database, wherein the simulation includes "Events". By way of example, Events optionally include, but are not limited to, one or more of active errors, errors of omission, opportunities, missed opportunities, style and tone problems, etc. The system can instruct the User which type of Event the User is to identify.
3. The User (e.g., a trainee or other user) starts the simulation by clicking on an appropriate user interface control (e.g., a "Continue" icon).
   In this example, the initial viewing/hearing of the simulation is performed in a non-interactive mode, wherein the mode purposely does not provide any or substantial interactive capability. The User is instructed to listen and/or to take notes, and to thus be prepared for the interactive simulation that follows.
4. The User can listen to the non-interactive simulation a predetermined number of times (e.g., one time or some other designated number of times) prior to beginning the interactive simulation mode.
5. The User can elect to skip the non-interactive simulation and substantially immediately proceed to the interactive simulation by clicking on an appropriate control (e.g., a "Skip" icon).
6. The interactive simulation can be initiated by the User after the non-interactive simulation has been performed by clicking on an appropriate control (e.g., a "Continue" icon).
7. Once the interactive simulation begins, the User optionally cannot exit (via the training application software) the simulation prior to completion and/or is prevented from returning to the non-interactive simulation. (Optionally, the user can exit by closing an appropriate interface, such as a browser, used to access the simulation, by turning off the User terminal, or otherwise). If the User prematurely exits the interactive simulation, the User's score will appropriately reflect such exit.
8. The User can stop or pause the interactive simulation by correctly identifying an appropriate Event (e.g., by clicking on an appropriate control, such as a "Error" or "Stop" icon within a predetermined amount of time of the presentation of the Event). Optionally, if the user clicks on the icon within a predetermined time window (e.g., 5 or 10 seconds) after the occurrence of an Event, then the User will be scored as correctly identifying the Event occurrence. This helps ensure that the User is being tested on knowledge versus "clicking speed."

9. When the User correctly stops the interactive simulation by clicking on the "Error" or "Stop" icon, the color of this icon changes (e.g., from red to green), and optionally a confirmation tone is played, signifying a correct response.
10. When the User correctly stops the interactive simulation as described above, in this example, the interactive simulation does not stop immediately upon clicking the Stop icon (unless the icon is correctly clicked at the moment when the corresponding sentence, phrase and/or concept is programmed to end). Instead, the interactive simulation continues to be presented until the end of the sentence, phrase and/or concept being presented. Advantageously, this makes available the full or adequate context of what has been said for answering of the subsequent quiz (e.g., a multiple-choice question). In addition, this feature provides continuity when the interactive simulation is re-started, as opposed to re-starting the simulation mid-word or mid-sentence.
11. When the User has correctly clicked on the icon, (and as previously described, the icon turns green and the interactive simulation pauses at the end of the sentence, phrase and/or concept) then a quiz question, such as a text-based multiple-choice test, automatically appears.
12. If the User correctly identifies or provides the answer on the first attempt, a positive confirmation tone occurs, and a text or audible voice message acknowledging the correct answer is played. Optionally, if the quiz question is a multiple choice question, the correct answer becomes encircled, bolded, or otherwise highlighted.
13. At this point, the User activates a "Continue" icon, or other appropriate control, to advance to a second quiz, such as a second multiple-choice question.
14. If the User answers incorrectly on the first attempt at answering the quiz question, then a "negative tone" is played, and a graphic and/or text message is provided indicating that the answer was incorrect.
15. A text and/or message then appear, or are otherwise provided, instructing the User to try to answer the quiz question again.
16. The User answers the quiz question again, and if the answer is correct, the process proceeds as described at states 11 and 12 above, and another quiz question is presented to the User.
17. If the User tries to answer the quiz question again, and the User is incorrect a second time, a "negative tone" is played, and a graphic and/or text message is provided indicating that the answer was incorrect.
18. If the second answer attempt was incorrect, then the process automatically causes the correct answer to be displayed or indicated to the User.
19. At this point, the User clicks a "Continue" icon, or other appropriate user control, to advance to the second multiple-choice quiz.
20. States 12 through 19 are repeated for the second quiz question.
21. Once the User completes the two quiz questions (or other designated number of quiz questions), the User clicks on the "Continue" icon, and the interactive simulation resumes.
22. Scoring is performed by the system that reflects the number of correctly and/or incorrectly User-identified Events.
23. The User's quiz answers are scored by the system.
24. When the User incorrectly (e.g., when no Event occurred within the designated time window) identifies an Event and attempts to stop the interactive simulation by clicking on the "Error" or "Stop" icon, the Stop icon does not change color. Instead, the Stop icon remains red, indicating to the User that the User incorrectly identified an Event.
25. Scoring is performed by the system that reflects the incorrect identification of Events.
26. If the User misses an Event by not clicking on the icon during the designated time window, the system automatically stops the interactive simulation (e.g., at the appropriate end of the sentence, phrase and/or concept).
27. A negative tone is played and a graphic and/or text display appears indicating that the User missed an Event, and optionally the system informs the User as to which Event was missed.
28. Scoring is performed by the system that reflects the missed identification of Events.
29. The User is optionally prevented from advancing without next activating the "Replay" icon, or other appropriate control.
30. When the "Replay" icon is activated, a replay of the Event is automatically performed by the system (e.g., a replay of the corresponding entire sentence, phrase and/or concept).
32. A quiz is automatically presented to the User (e.g., a text-based multiple-choice test).
33. States 12 through 23 above are then performed.
34. A list of phrases is verbalized by the User terminal and corresponding and/or identical text messages are displayed to the User. Optionally, each of the phrases is sequentially presented on a separate screen.
35. The User is instructed to click on the designated area (e.g., the text message or surrounding area) when an "Event phrase" is correctly identified. Optionally, this identification process is performed under time pressure. For example, the phrase pages appear with the text (with spoken phrases correspondingly provided) for only a limited time period (e.g., approximately 3 seconds).
36. When the User correctly clicks on the designated area (e.g., the text message or surrounding area), a positive confirmation tone sounds and a text, graphic or other acknowledgement appears confirming that the User selected the correct answer.
37. Then a quiz (e.g., a multiple-choice test) automatically appears which optionally follows the format of the previously discussed quizzes. The quiz can also be different than the previous quizzes (e.g., a single multiple-choice test may be provided that includes a single question).
38. If the User does not correctly click on a designated area (e.g., text message or surrounding area), the next screen and messaging occurs within a certain amount of time (e.g., within three seconds).
39. Optionally, the system does not provide a "negative tone" or text acknowledgement when the User misses identifying an Event phrase.
40. Scoring is performed by the system that reflects the correctly identified Event phrases, the correct multiple-choice answers, and the unidentified Event phrases.
41. Scores are totaled by the system at the end of each module, although the scoring can be updated and totaled upon the occurrence of a scoring event (e.g., a quiz). The scores can be displayed to the User. The scores can be stored in computer readable memory for later access by the User, the User's training supervisor, the User's manager, or other by other designated users.

Optionally, the User can review the simulation again at a later time, such as the next day. Optionally, rather than having the quizzes provided by the system, the User can review the simulation with the User's manager who can verbally quiz the User by asking questions. The manager can record the User's performance (e.g., the number of questions answered correctly) on the system in association with a User identifier.

In the second example:
1. A User views/listens to one or more non-interactive simulation presentation. The length of the non-interactive simulations can vary (e.g., from 30 seconds or 60 seconds to several minutes or even hours).
2. The system prevents the User from viewing/listening to a non-interactive simulation a second time prior to testing.
3. At the end of the non-interactive simulation presentation, the User clicks on the Continue icon and is quizzed on the non-interactive simulation content (e.g., a multiple-choice and/or true-false test based upon what the User heard and/or saw during the non-interactive simulation).
4. The system scores the test.
5. At this point, the User can listen to the non-interactive simulation a second time.
6. The User can then elect to be tested a second time.
7. The system scores the second taking of the test. The scores are optionally stored and presented as similarly discussed above in the previous example.

A training format categorization can be used to separate and/or define the different functionality possibilities that can occur in training modules, and that can segment them between business-based modules and consumer/personal/general public modules. In an illustrative example, training modules can include the following format and subject categories as follows, although other categorizations can be used as well:

1. User Format (e.g., personal relationships, consumers, business)
   2. General Format (e.g., Quiz Interactive or Full Interactive)
   3. Specific Format
   4. Subject or Scenario By way of example, with respect to the General Format, Quiz Interactive generally limits substantive interactivity to interactivity throughout or at multiple points in the scenario (e.g., by pressing an error/stop control to indicate that an error, opportunity clue and/or missed opportunity occurred). Optionally, the Full Interactive mode includes one or more quizzes after the scenario presentation ends.

The Specific Format can include some or all of the following:
   Quizzes/questions presented after the scenario is presented
   Timed questions presented (e.g., speed testing) at various points during (e.g., throughout) the scenario presentation
   Questions regarding communication attitude and/or style
   Self-revealing statements made at various points during (e.g., throughout) the scenario presentation
   Errors made at various points during (e.g., throughout) the scenario presentation by a character in the scenario
   Opportunities presented at various points during (e.g., throughout) the scenario presentation (e.g., opportunities provided by a character, such as a customer, in the scenario)
   Detailed Oriented Timed Testing with questions regarding a detailed narrative presented at various points during the scenario
   Intrusive Thoughts Practice, wherein the user indicates when a "foreign thought", not related or not significantly related to the task hand, enters the users mind The Subject or Scenario can include, by way of illustration and not limitation:
   Banker and Prospect/Customer
   Travel Agent and Customer
   Doctor and Patient
   Manager and Subordinate
   Husband and Wife Therapy
   Parent and Child
   Arguing Neighbors
   Car Salesman and Prospect
   Driving The following table illustrates several example module configurations:

| | SUBJECT/SCENARIO | USER FORMAT | GENERAL FORMAT | SPECIFIC FORMAT |
|---|---|---|---|---|
| 1 | Spouse Therapy | Consumer/Business | Quiz Interactive | Questions at end of scenario |
| 2 | Spouse Therapy | Consumer/Business | Full Interactive | Questions regarding communications attitude and style |
| 3 | Spouse Therapy | Consumer/Business | Full Interactive | Self-revealing statements |
| 4 | Parent and Child | Consumer | Full Interactive | Errors during scenario |
| 5 | Conversation While Driving | Consumer | Quiz Interactive | Timed questions during scenario |
| 6 | Neighbors | Consumer | Quiz Interactive | Questions during scenario |
| 7 | Car Salesman & Prospect | Business | Quiz Interactive | Questions at end of scenario |
| 8 | Banker and Prospect/Customer | Business | Full Interactive | Errors and opportunities during scenario | quizzes (e.g., multiple choice or other quizzes, such as listening comprehension quizzes) presented at the end of the scenario. Full Interactive generally provides for substantive user FIGS. 4F-L illustrate example processes for setting up an example training system, and for performing example training processes. With reference to FIG. 4F, at state 402f, user instructions for a given module, and/or for modules in a selected training are stored in a database, such as the database 112 illustrated in FIG. 1. For example, a given module can have module specific instructions, or the same instructions can be used for a certain set of modules (e.g., modules in a given field, such as financial services). The instructions can include text and/or voice instructions. The instructions can be stored in association with the modules to which the instructions apply. At state 404$f$ the module simulations are stored in the database. As previously discussed, the simulations can be in the form of animated sequences and/or video segments.

At state 406$f$, a user, such as a training administrator or a manager, can define a training course including multiple modules. For example, the training administrator can specify via a user interface which modules are to be presented as part of a specific training series, and the sequence order in which the modules are to be presented to a given trainee. In addition, the training administrator can define questions and quizzes, indicate or provide the correct answers, specify answer window time lengths, and specify scoring for correct and incorrect answers. The training administrator specification is stored in the database and is later accessed when a trainee logs in to undergo a training session. Optionally, the training administrator can be provided with specific and/or limited authority to edit or specify training sessions.

Optionally, training sessions can be customized for a given trainee. For example, a training administrator can select appropriate modules and arrange them in an appropriate sequence for a given trainee based on the trainee's job function, level of experience, and/or previous training. In an example embodiment, the training administrator can specify the modules and module sequences by entering module names into a form in the desired order or by dragging and dropping icons or text corresponding to the desired modules into the desired order.

At state 408$f$, the training administrator can specify which trainee is authorized to access which modules or series of modules. For example, an identifier corresponding to the authorized trainees can be stored in a database (e.g., database 112 and/or database 114 illustrated in FIG. 1) in association with the corresponding modules or series of modules (e.g., in association with module identifiers or in association with an identifier associated with a sequence of modules).

At state 410$f$, user account information is stored in a database, such as database 114. The user account information can include a user identifier, a user password, a job title or classification, the number of years the user has been employed with the employer authorizing the training session, the length of time the user has been employed in a given field, an identification of the modules and/or series of modules the user has completed and the corresponding scores and completion dates, and a training schedule for the user indicating a training frequency and/or when (e.g., which day or which week) the user is to view a particular module or series of modules. The user account information can be entered via a form and/or from another database by the user, an administrator, and/or other entity.

Referring now to FIG. 4M, an example "performance drilling" training session process is illustrated, wherein a user/trainee is drilled in responding quickly, accurately, and with confidence to challenges/statements made by others (e.g., customers/prospects). Reference will be made to certain user interfaces. Certain non-limiting examples of such user interfaces are discussed elsewhere herein with respect to FIGS. 1B-1E.

At state 401$m$, the process begins, and the trainee and/or trainer log into the training system. At state 402$m$, the system displays a welcome screen. The system receives a selection of a training module from a menu of training modules. For example, the different training modules may relate to different subject matter, such as different products and services. Optionally the system provides a description of the corresponding training objectives and a description of the training module. A user interface is displayed via which the trainee and/or trainer optionally selects a peer type.

At state 404$m$, a user interface is presented via which the trainee/trainer can instruct the system to display a tutorial for the learner/trainee. If an instruction is provided to launch the learner tutorial, the process proceeds to state 406$m$ and the learner tutorial is launched (e.g., including text, audio, animation and/or video). Otherwise, the process proceeds to state 408$m$.

At state 408$m$ the module content (e.g., including text, audio, animation and/or video) is played. At state 410$m$, a user interface is displayed introducing/describing the challenge process. At state 412$m$, the system presents the trainee/learner with a challenge to which the trainee is instructed to verbally respond to, and a timer (which may be in the form of a timer ball or clock) is started automatically with the presentation of the challenge, or optionally the timer can be started by the trainer or trainee. The challenges may be based upon the product/service/solution descriptions (e.g., key elements) presented in the pre-study section. The presentation of the challenges (optionally corresponding to the pre-study information/elements) are optionally randomized or non-randomized. The user is instructed to verbally respond to the challenges as soon as the user hears the challenges. The trainer or trainee stops the timer to indicate how quickly the trainee began providing a verbal response, wherein the time is stored in memory. The trainee continues responding even after the timer is stopped. At state 414$m$, the trainee's response is scored for accuracy and/or completeness, optionally by the trainer or trainee, using an accuracy and/or completeness scoring user interface. At state 416$m$, the trainee's response is scored with respect to how quickly the trainee responded. Optionally, such scoring is automatically performed once the trainer indicates that the trainee has responded (or optionally, has correctly responded). At state 418$m$, the trainer and/or trainee scores the trainee with respect to the confidence exhibited by the trainee in responding using a confidence scoring user interface. The example embodiment scores by category and sub-category. Therefore, it provides substantially instant feedback on a sub-category basis, and total feedback for the "full" category (e.g., including the summation of scores for the sub-categories). This substantially instant evaluation enables the pinpointing of areas where improvement is needed, optionally including improvement in the ability to articulate the correct answers/content, as well as the assessment of speed/fluency and style/confidence.

At state 420$m$, a summary scoring page is displayed, providing the scores with respect to accuracy, response time, and confidence for the most recent challenge. At state 422$m$, a user interface is provided via which the trainer/trainee can specify whether a model answer to the challenge is to be presented. If an instruction is received to provide the model answer, the process proceeds to state 424$m$. A user interface optionally including an animated character or video of a person speaking a model answer to a challenge is presented, although audio, without a video/animated component can be used. Optionally, the spoken communication is also provided textually to further reinforce the teaching of the presented information and wording style. A "replay" control is optionally provided, which when activated, causes the animated or video character to repeat the model answer (e.g., audibly with the textual reinforcement displayed). A "proceed" control is optionally provided via which the user (and/or trainer) can instruct the system to proceed to the next segment.

At state 426m, a determination is made as to whether there are additional challenges to be presented to the trainee. If additional challenges remain, the process proceeds back to state 412m, otherwise the process proceeds to state 428m. The scores and/or a summary thereof (e.g., a grade score or overall point score) is calculated and presented with respect to the challenges presented during the process. At state 430m, the process ends.

Referring now to FIG. 4G, an example training session process is illustrated. At state 402g, a trainee (also referred to as a user) logs into the training session via a terminal. If the training session is password protected, the user may be asked to enter a password. At state 404g, the appropriate training module is selected from the training module database. The database can be remote from the user and accessed over a network, or the database (or a portion thereof) can be stored locally, in the user terminal memory. If the user is so authorized, the user may be presented with a list of modules which the user is authorized to access and from which the user can select the appropriate module or module series. Optionally, instead, the training system automatically selects the appropriate training module or modules based on information retrieved from the appropriate system database. For example the information can include an identification of the training courses the user is authorized to access, an identification of which modules have already been completed by the user, the user's scores on one or more already completed training modules, and the user's training schedule as previously defined by a training administrator or the user.

At state 406g, the training user instructions are retrieved from the appropriate database and displayed and/or played back to the user via the user terminal. In addition, module and/or module series identification can be presented to the user (e.g., "This is module 10 in the Loan Officer Training Series"). At state 408g, a determination is made as to whether the user has indicated that a non-interactive training simulation is to be skipped, and if so, whether the user has met the prerequisite skip conditions (e.g., has previously viewed the simulation at issue). If the user has not provided a skip instruction and/or has not met the requisite skip instructions, the process proceeds to state 410g, and the appropriate simulation is played via the user terminal. In the non-interactive mode, the user is not provided with any or substantial interactive capability (e.g., the user is not provided with quizzes or tests during the simulation playback). If the user indicated that the non-interactive mode is to be skipped, and if optionally specified skip criteria are met (e.g., if the user has previously viewed the interaction presentation), the process proceeds to state 400h.

Once the example non-interactive simulation is complete, at state 412g, the user can activate a control (e.g., a begin or a continue button or link) which causes the interactive mode to begin, and the process proceeds to state 414g. Optionally, instead, the interactive mode can automatically begin after completion of the non-interactive simulation without manual user activation. At state 400h, the interactive simulation is presented to the user. Optionally, the user can select a portion or chunk of the simulation to be presented to the user, rather than the entire simulation. For example, optionally the user can select a beginning portion, a middle portion, or an end portion. Optionally, the user can select a previously saved bookmark (e.g., the may have been set by the user or the system at a previous session, such as at the point the previous session was terminated). State 400h will be discussed in greater detail below with respect to FIG. 4H. After the completion of the interactive simulation, at state 400k, an opportunity event identification test is presented to the user. State 400k will be discussed in greater detail below with respect to FIG. 4K.

At state 416g, a style quiz is optionally presented to the user. The style quiz, for example, can include questions regarding the communication style, tone of voice, and/or manner of a "person" represented in the simulation. The person can be, for example, a person who is simulating performing the "job" function (e.g., a sales person, a financial adviser, a lawyer, a parent, singer, doctor with patient, etc.) for which the user is training. The style quiz, by way of example, can be in the form of a true and false question, a multiple choice question, and/or a question wherein the user's response can be provided using natural language, etc.

At state 418g, the user's scores (e.g., scores related to the number of quiz questions the user answered correctly, the number of quiz questions the user answered incorrectly, the number of events the user correctly identified, failed to identify, or misidentified, and/or the time it took the user to complete quizzes) are totaled in a given area, for example one or more of the following (and/or other scores):

a score (e.g., a number, letter, or title) indicating the number of correct event identifications during the interactive simulation;

a score indicating the number of incorrect event identifications during the interactive simulation;

a score indicating the number of correct answers to the quizzes provided during the interactive simulation;

a score indicating the number of incorrect answers to the quizzes provided during the interactive simulation;

a score indicating a score indicating the number of correct event identifications during the interactive simulation;

a score indicating the number of incorrect event identifications during the interactive simulation;

a score indicating the number of correct opportunity identifications during the opportunity identification;

a score indicating the number of incorrect opportunity identifications during the opportunity identification;

a score indicating the number of correct style quiz answers;

a score indicating the number of incorrect style quiz answers;

a cumulative score indicating the overall performance on the module;

a ranking of the trainee relative to others in a selected set of trainees based at least in part on the trainee's score(s) or performance.

The system optionally presents one or more buttons, links, or menus via which the user can instruct the system to return to the module selection page, to proceed to the next module in the module series, to replay the current module, or to exit the training session. If the user elects to exit the training session, the process proceeds to End state 420g.

Referring now to FIG. 4H, interactive simulation state 400h is illustrated in greater detail. The simulation (which can instead be a presentation of any actual interaction) of an interaction corresponding to the skills to be trained is presented. The simulation includes multiple events $400I_1$ to 400In, wherein a given event can be an active error (a misstatement, interrupting the customer inappropriately, offering an inappropriate good/service, etc.), an error of omission, an opportunity, a missed opportunity, or a style or tone problem. Instructions, such as those provided at state 406g in FIG. 4G, can more narrowly define the types of events that the user is to identify (e.g., an active error or an error of omission). If the system detects a misidentification of an event (where the user indicated that an event had occurred, where none actually had occurred), a negative score is assigned to the misidentification, and the simulation continues uninterrupted. Optionally, negative feedback (e.g., an error tone, an error icon, error text, or a color change of a control or text) is provided to indicate that the user has misidentified an event occurrence. The negative feedback can be provided substantially immediately, or within a certain time window (e.g., within 10 seconds of the time window within which the user was to identify the event).

FIG. 4I illustrates an example of the process 400h performed during an event illustrated in FIG. 4H. With reference to FIG. 4I, at state 401i the system determines the occurrence of an event. The determination can be performed by reading digital metadata stored in association with the simulation, wherein the metadata indicates the occurrence of an event. The training system monitors user inputs to determine whether the user has identified the event occurrence within the specified time window. For example, the user can indicate that an event has been identified by one or more of clicking on a hard button, a soft button, by providing a verbal instruction, or via other user input.

If the user has identified an event, the process proceeds to state 410i, and a positive score is assigned to the user and stored in computer readable memory. The process proceeds from state 410i to state 412i, and the simulation is stopped in response to reading metadata that indicates a quiz is to be given. The process then proceeds to state 400j, and one or more quizzes are presented to the user. State 400j is discussed in greater detail below.

If, at state 402i, the user failed to identify the event within a corresponding time window, the process proceeds to state 404i, and a negative score is assigned and stored in computer readable memory. The process then proceeds to state 406i, and the simulation continues until a designed stop indicating the end of the sentence, phrase and/or concept being presented that includes the error. The process proceeds to state 408i, and the system replays the portion of the simulation that includes the end of the sentence, phrase and/or concept being presented that includes the error, beginning at a start point indicated by corresponding metadata and ending at the end of the sentence, phrase and/or concept being presented. The process proceeds to state 400j, and one or more quizzes are presented to the user.

FIG. 4J illustrates a more detailed flow diagram of state 400j illustrated in FIG. 4I. At state 402j, a quiz (e.g., multiple choice, true/false, matching or free form questions) is presented to the user via the user terminal. At state 404j, the user quiz answer is received and a determination is made as to whether the user answered the quiz correctly.

If the user answered the quiz correctly, the process proceeds to state 406j and a positive score (indicating a correct answer was provided) is recorded and the user is provided with substantially immediate feedback (e.g., via a tone, icon, text, color change, etc.) confirming the user's answer is correct. At state 408j, a second quiz is optionally presented to the user. At state 410j, the user quiz answer is received and a determination is made as to whether the user answered the second quiz question correctly.

If the user answered the second quiz question correctly, the process proceeds to state 412j and a positive score is recorded and the user is provided with substantially immediate positive feedback. The process then proceeds to state 414j and the simulation resumes.

Referring back to state 404j, if the user provided an incorrect answer to the first quiz question, the process proceeds to state 416j, and a negative score is provided (indicating an incorrect answer was provided), and negative feedback is optionally provided substantially immediately. At state 418j, a determination is made as to whether the user has already attempted a predetermined permitted of retries (R1). If the user has not yet exceeded the predetermined permitted of retries, the process proceeds back to state 402j and the first quiz is presented again. The user can then attempt to correctly answer the first quiz question again. If, at state 418j, the system determines that the user has already attempted, but failed to answer the first quiz question R1 times, the process proceeds to state 420j, and the correct answer is provided to the user.

Similarly, referring back to state 410j, if the user provided an incorrect answer to the second quiz question, the process proceeds to state 422j, and a negative score is provided, and negative feedback is optionally provided substantially immediately. At state 424j, a determination is made as to whether the user has already attempted a predetermined permitted of retries (R2, which optionally has the same value as R1). If the user has not yet exceeded the predetermined permitted of retries, the process proceeds back to state 408j and the second quiz is presented again. The user can then attempt to correctly answer the second quiz question again. If, at state 424j, the system determines that the user has already attempted, but failed to answer the second quiz question R2 times, the process proceeds to state 426j, and the correct answer is provided to the user.

Referring now to FIG. 4K, state 400k discussed above with respect to FIG. 4G is discussed in greater detail. One or more opportunity event test $401l_1$-$401l_n$, are presented to the user. FIG. 4L illustrates an opportunity event test 401l in greater detail. In an example embodiment, the user will be asked to identify statements or phrases made by a first individual (e.g., a customer) during the simulation, which represented opportunities but that were missed by the second individual (e.g., the customer service person). The statements or phrases may be both textually presented to the user and audibly played to the user.

Referring now to FIG. 4L, at state 402l, a first event phrase is presented to the user. At state 404l a determination is made as to whether the user identified the correct event phrase within a predetermined time limit. If the user did correctly identify the event phrase within the time limit, the process proceeds to state 412l, and the system records a corresponding positive score, and provides the user with substantially immediate positive feedback. The process proceeds to state 400j, and one or more quizzes are presented to the user.

If, at state 404l, a determination is made that the user did not correctly identify the event phrase within the time limit, the process proceeds to state 406l, and the system records a corresponding negative score, and optionally provides the user with substantially immediate negative feedback. The user is provided with another opportunity to identify the event phrase. At state 408l, a determination is made as to whether the user identified the correct event phrase within a predetermined time limit on the second attempt. If the user did correctly identify the event phrase within the time limit, the process proceeds to state 414l, and the system records a corresponding positive score, and provides the user with substantially immediate positive feedback. If the user failed to correctly identify the event phrase, the process proceeds to state 410l, and a negative score is recorded.

While certain embodiments are described as having a human trainer and trainee participate together in a training process (e.g., where the trainer verbally asks the trainee questions and/or grades the trainee), optionally instead, the training can be conducted without a human trainer being present. For example, questions can be presented to the trainee via a training terminal or printout, and the trainee's verbal or hand input responses to the questions can be recorded by the terminal or otherwise. Correct answers can then be presented to the trainee (e.g., via the training terminal, a printout or otherwise). The trainee can play back or otherwise access the trainee's recorded responses, compare the recorded responses to the correct answers, and optionally the trainee can perform the scoring.

Referring now to FIGS. 3A-Y, which illustrate example user interfaces, FIG. 3A illustrates an introductory screen display, informing the User which training module is about to be presented. FIGS. 3B-3G illustrate example screen displays that describe the skills the corresponding module will teach and/or improve, and provide the User with instructions on using the module. FIG. 3H illustrates an example screen display that further describes and provides instructions for the non-interactive simulation. FIG. 3I illustrates an example screen display of a simulated customer service person, and further illustrates a "Skip Part 1" button which, when activated causes the non-interactive simulation to be skipped.

Figure 3K:

FIG. 3J illustrates an example screen display that further describes and provides instructions for the interactive simulation. FIG. 3K illustrates the visual portion of the interactive simulation, with an Error/Stop button (which can be otherwise labeled) used by User to indicate the occurrence of the Event of the type the User is asked to identify. FIG. 3L illustrates a first example quiz question in the form of a multiple-choice question. FIG. 3M illustrates an example screen display informing the User that the User selected the wrong answer in the quiz question illustrated in FIG. 3L. The User is prompted to try the quiz again, and a "try again" button is provided, which when activated, will cause the quiz in FIG. 3L to be displayed again. FIG. 3N illustrates an example screen display informing the User that the User again selected the wrong answer after attempting for the second time to correctly answer the quiz question illustrated in FIG. 3L. In addition, as illustrated in FIG. 3N, the correct answer is provided by highlighting the correct answer.

FIG. 3O illustrates an example screen display informing the User that the User selected the correct answer to a second multiple choice question. FIG. 3P illustrates an example screen display providing instructions with respect to an opportunity identification test. FIG. 3Q illustrates an example phrase identification question. FIG. 3R illustrates an example screen display notifying the User of a failure to identify an opportunity. A "Continue" button is provided, which causes a quiz to be presented. FIG. 3S illustrates an example screen display of a multiple choice quiz question relating to explaining why a certain customer phrase represents an opportunity. FIG. 3T illustrates an example screen display informing the User that the User selected the wrong answer in the quiz illustrated in FIG. 3S. The User is prompted to try the quiz again, and a "try again" button is provided, which when activated, will cause the quiz in FIG. 3S to be displayed again. FIG. 3U illustrates an example screen display informing the User that the User again selected the wrong answer after attempting for the second time to correctly answer the quiz question illustrated in FIG. 3S. In addition, as illustrated in FIG. 3U, the correct answer is provided by highlighting the correct answer.

FIG. 3V illustrates an example quiz question related to identifying the style of the customer service person in the simulation presentation. FIG. 3W illustrates an example screen display informing the User that the User selected the correct answer to the question illustrated in FIG. 3V.

FIG. 3X illustrates an example explanation of the potential subjectivity with respect to identifying errors and opportunities, and with respect to the quizzes. FIG. 3Y illustrates an example scoring screen display.

Of course, other user interfaces than the examples illustrated herein can be used as well.

Figure 5A:
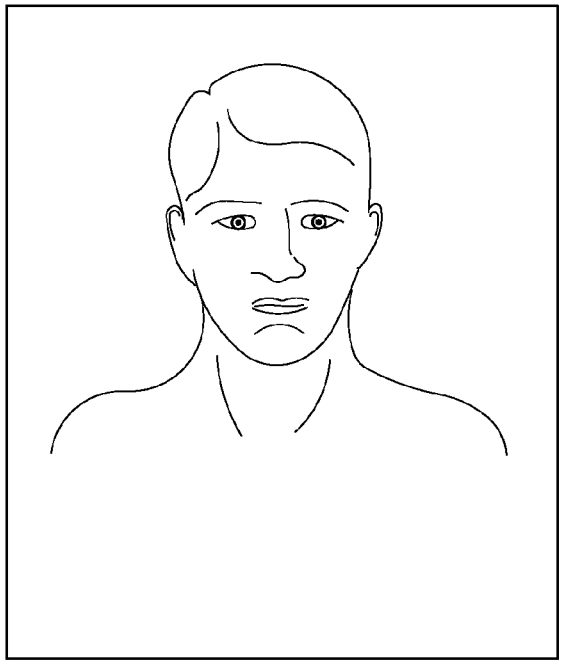
FIGS. 5A-V illustrate further example user interfaces.

FIGS. 5A-V illustrate additional example user interfaces for training personnel in the travel agency services field. In this example, a travel agent is interacting with a customer. The example visual component of the dramatic interaction is provided via animated figures sequenced with an audio track, although video sequences or real people can be used as well. Optionally, user accessible controls (e.g., rewind, pause, fast forward, play, resume, etc.) are provided to the trainee to allow the trainee to control the presentation. For example, many of the following interfaces include a pause control and a "go back" one screen control.

FIG. 5A is an initial introduction interface. FIG. 5B illustrates a user interface that provides trainee instructions. In this example, the trainee is informed that the conversation the trainee is about to be presented with is between a travel agent and a customer. The instructions further inform the trainee that certain travel agent statements contain errors, which the trainee needs to identify within 5 seconds after the error occurrence by clicking on the Stop button. The trainee is further informed that if the trainee correctly identifies an error, a quiz will be presented. The interface further explains that once the trainee answers the quiz, the conversation will resume. The trainee is also informed that if the trainee indicates an error where none occurred, the trainee's score will be negatively affected. The trainee is then instructed to click a Start button in order to initiate the presentation.

Figure 5C:
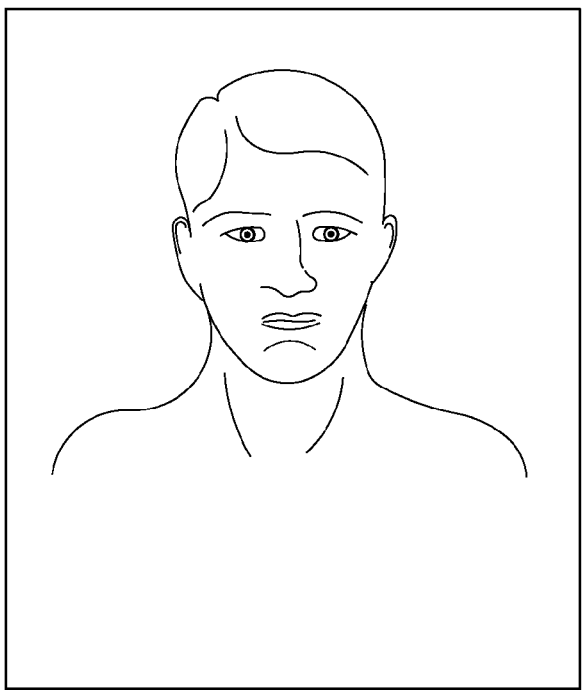
Figure 5D:
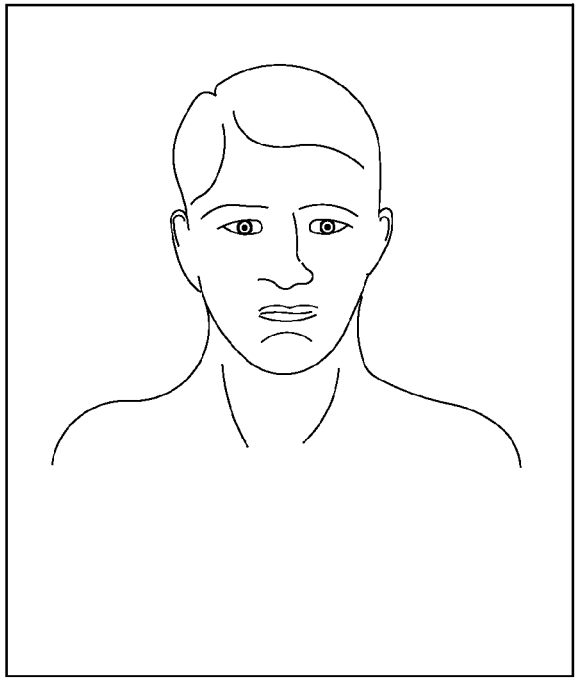
Figure 5E:
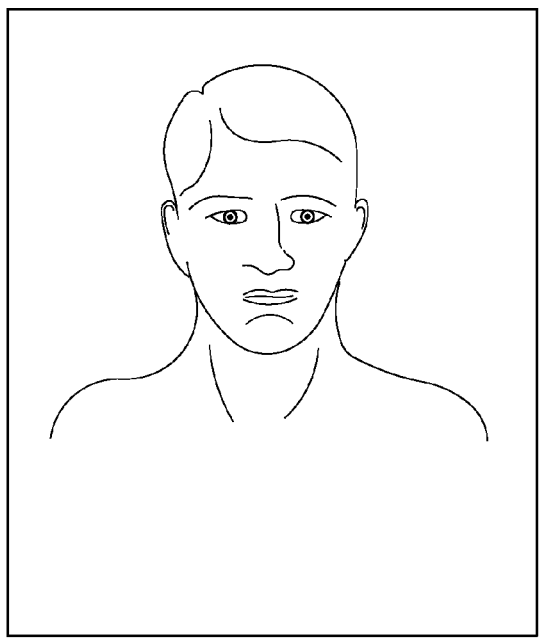

The example user interface illustrated in FIG. 5C provides a brief description of the conversation scenario. In this example, the user interface describes a conversation between two characters in a travel agency. The example user interface illustrated in FIG. 5D discusses the focus of the training module. In this example, the interface states the module focus in on error identification, and that the trainee is to identify errors strategically placed within the conversation. FIG. 5E states that in some modules the trainee will be given the opportunity to listen to an entire uninterrupted conversation, during which the trainee can take notes prior to an interactive portion, and in some modules, the trainee will not be given such an opportunity.

Figure 5F:
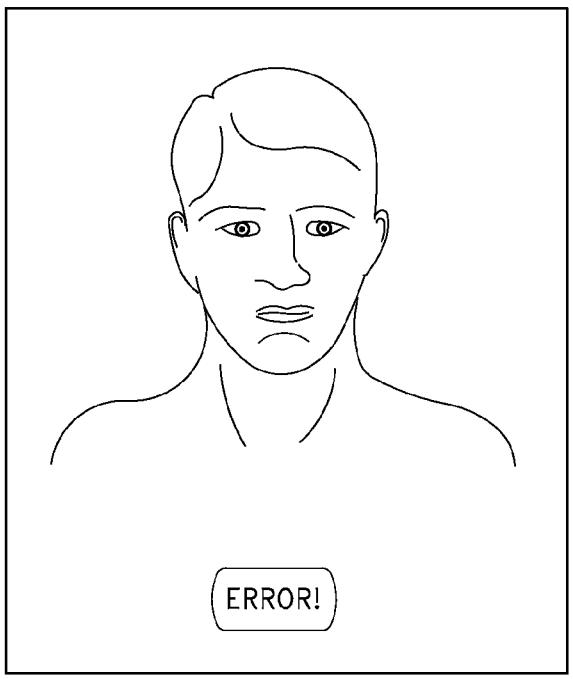
Figure 5G:
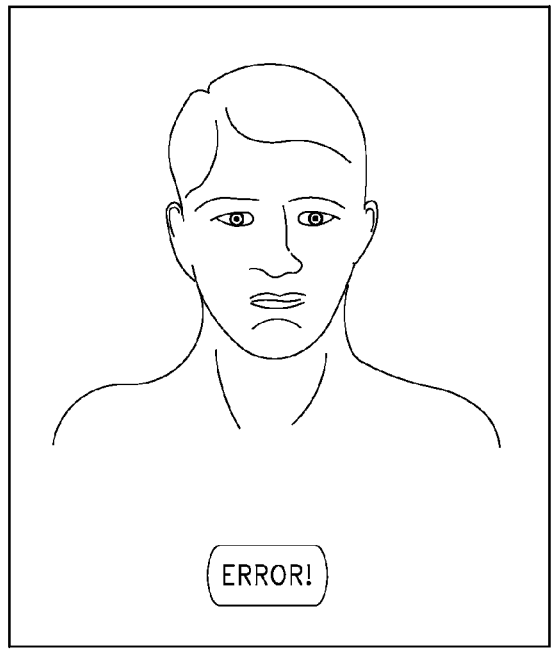
Figure 5H:
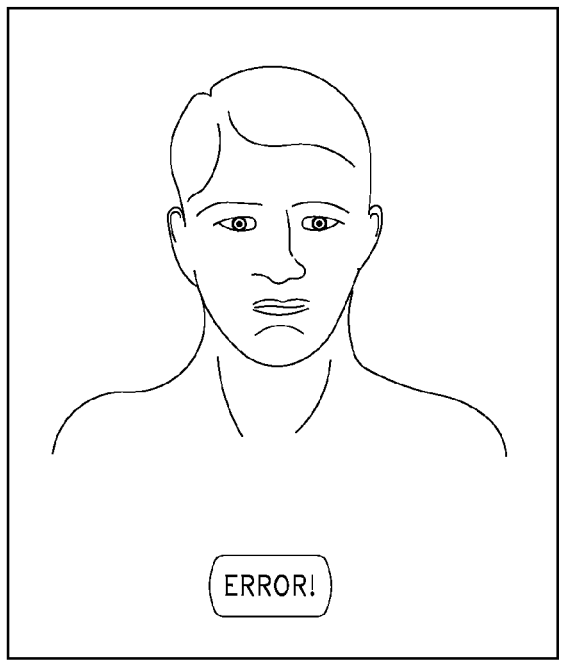

In FIG. 5F, the user interface instructs the trainee to click within a predefined area to identify an error within the conversation. FIG. 5G informs the trainee that if the trainee correctly identifies an error by clicking the mouse (or via other user input device) at the appropriate time, the training system will provide positive feedback by changing the color of a button (e.g., an Error button). The interface can also inform the trainee that the button related text will change to "Correct". The interface illustrated in FIG. 5H informs the trainee that if the trainee incorrectly identifies an error by clicking the mouse when there is no conversation error, the training system will provide negative feedback by changing the color of the button (e.g., an Error button) to red, and by changing the button related text (e.g., "OK" or blank text) to "Incorrect" or "Error".

Figure 5J:
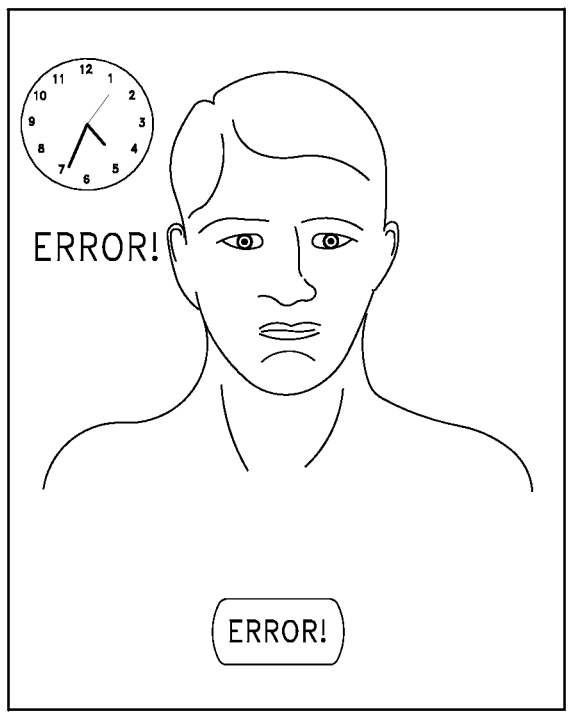

The interface illustrated in FIG. 5I informs the trainee of the time the trainee has to identify the error (5 seconds in this example). In this example, a tutorial conversation session is to be presented to the trainee and the interface informs the trainee that the error will be identified by the system to the trainee, and that a countdown clock (displaying the amount of time left for the trainee to identify the error) will be displayed. The interface further describes an error (misidentification of Ingrid Bergman's birthplace) that will occur during the course of the tutorial conversation. FIG. 5J illustrates the frame in which the error is spoken.

Figure 5K:
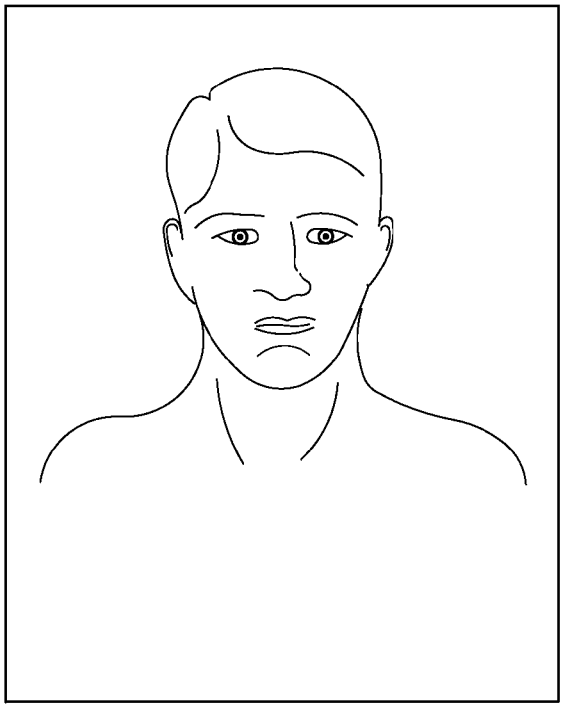
Figure 5M:
Figure 50:

The interface illustrated in FIG. 5K describes a multiple choice quiz tutorial, wherein a first quiz will be directed to the nature of the specific error, and a second quiz will ask the trainee to identify a correct alternative. The user interface illustrated in FIG. 5L provides an example first multiple choice tutorial quiz, wherein the user is asked to select from a plurality of error choices the erroneous statement made by the travel agent. FIG. 5M illustrates the system emulating a trainee answering the quiz illustrated in FIG. 5L. FIG. 5N illustrates a quiz wherein the trainee is to select what the correct statement would have been with respect to the erroneous travel agent statement. FIG. 5O illustrates the system emulating a trainee answering the quiz illustrated in FIG. 5N. FIG. 5P illustrates the system response if the trainee selects the wrong answer a second time, wherein the system highlights the correct answer. The user interface illustrated in FIG. 5P further includes a "Continue Conversation" control, which, when activated causes the system to continue playing the conversation. FIG. 5Q illustrates the system emulating a trainee selecting the "Continue Conversation" control.

Figure 5S:
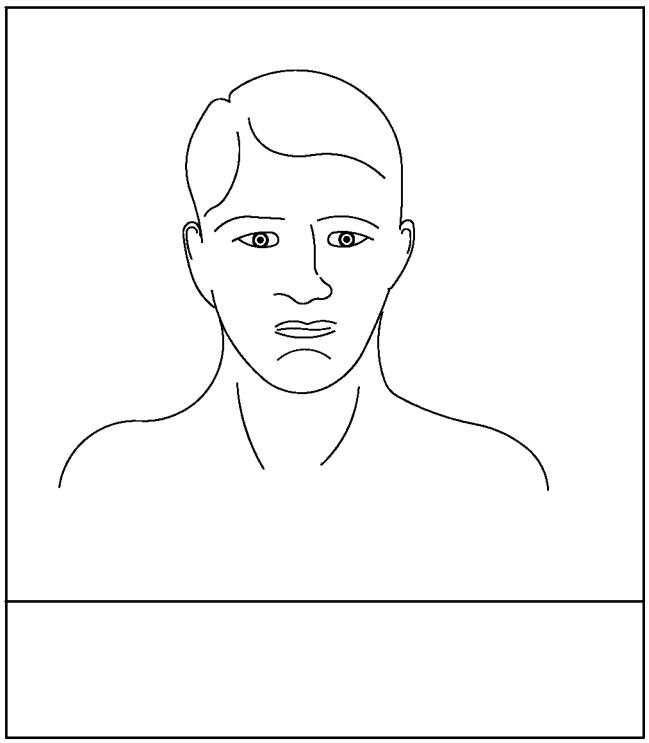

FIG. 5R illustrates an example user interface displayed the first time a trainee selects the wrong option in a quiz, wherein the trainee is provided two opportunities to select the correct option. FIG. 5S illustrates the conversation presentation resuming after the "Continue Conversation" control is activated.

FIG. 5T illustrates an example user interface that provides the trainee's scores. In this example, the interface displays the number of correctly identified errors out of how many errors, the number of incorrect error identifications (the number of times the trainee indicated an error occurred, when no error had occurred), and the number of quiz questions correctly answered out of how many quiz questions.

FIG. 5U illustrates an example user interface presented before the beginning of a practice session. FIG. 5V illustrates an example user interface displayed during an interactive session upon the user failing to identify an error, wherein the user interface inform the trainee that the presentation will replay the error for the trainee.

Thus, as described herein, certain embodiments enable trainees to better identify opportunities to better serve clients, to better capitalize on these opportunities, to better identify errors in service-related discussions/conversations, and to learn how to correct such errors. Further, systems and processes disclosed herein will enable trainees to better analyze the service needs of customers, clients, prospects, to better overcome objections to services suggested by the trainee to customer, prospects, and clients, to better and more appropriately finalize customer service interactions, and to better and more appropriately time manage service conversations. Certain embodiments can also trainee families, spouses, and others learn to identify errors in their handling of personal relationships, to listen better to others, and to better manage their personal relationships.

The following are example scenarios and scripts:

Scenario A

Banker (B) and Customer (B) Interactions
Scenario #1
Phone Conversation
Background Info. The banker has not provided his account number when the automated banker asks him to do so. He is told that if he does not know his account number, to wait on the line for the next representative.

B: Good afternoon. This is Linda at XYZ bank. How can I help you?
A: Hello Linda . . . can you tell me what a check from 3 months ago was made out to. I can provide you with the Check number, amount and date.
B: Oh no . . . I can actually give you the check number, amount and date, but don't have access to the name to whom the check was made out to. What we can do is request a federal copy of the check for you. Have you ordered those before? (Error 1)
Multiple-Choice-You can pick more than one answer.
What did the banker fail to do?
   a. She failed to answer the client's question.
   b. She failed to verbally acknowledge the given sales/service opportunity.
   c. She failed to introduce herself properly.
   d. She failed to ask the client's name.
Note: If the participant picks the correct answer d., a second multiple-choice question and answers will appear:
If they pick the wrong answer, they are prompted to try again, until the right answer is presented by default.
What should she have done?
   a. She should have asked the client for his name immediately after introducing herself.
   b. She should have asked client's name immediately after client's request for the check info.
   c. She should have asked for client's account number first, then used the name displayed.
   d. She should have asked for client's social security number first, then pulled up their account with their name.
A: No, I haven't.
B: You get three per statement cycle, so this will be free of charge.
A: No kidding! That's the first time this bank has offered me anything for free.
B: Oh, really? I'm sorry to hear that. Let me get that check information and your social security number please. (Error 2)
What did the banker do wrong?
   a. She failed to pick up on a hot topic.
   b. She ignored the client's comment.
   c. She failed to offer the client something for free.
   d. She gave the client false information.
What was the hot topic?
   a. The client could benefit from having his checks returned to him.
   b. The client feels the bank charges for everything.
   c. The client is dissatisfied with his current bank.
   d. All of the above.
What could the banker have done differently?
   a. She could have acknowledged the client's concern of spending too much and used this as a subject to weave into determining the client's needs.
   b. She could have told the client that she would mail the cleared checks back to him.
   c. She could have inquired about the comment that he doesn't receive "anything for free."
   d. She could have informed the client of all of the bank's complimentary features.
A: My social is 769708868 and the check number was 1189. And it was for $378.86 and the date was Mar. 27, 2003.
B: Okay, Mr. Teale. You should receive the copy of that check in the mail sometime within the next week.
A: Oh great.
B: Now Mr. Teale, may I ask you a few questions regarding your financial needs today? (Error 3)
What did the banker do wrong?
   a. She failed to make the appropriate introduction for the client interact.

b. She failed to offer cleared check return services to the client.
c. She failed to ask whether if the client was interested in image check services.
d. She failed to pre-position the marketing of products.

What could the banker have done?
 a. Explained why they were transitioning into a discussion of the client's banking needs.
 b. Explained how discussing the client's needs is important for building a relationship as well as a better understanding of the client's financial needs.
 c. She could ask the client if this was an appropriate time to discuss the client's needs.
 d. She could have mentioned the desirability of discussing the client's needs at the beginning at the time of introductions.

A: Okay. Is this going to be another one of those fees I'll find in my statement next month under Phone Banker charges?
B: No, not at all. This is an analysis we're doing with all of our clients.
(Error 4)
What did the banker do wrong?
 a. Failed to explain the importance of evaluating the client's needs thoroughly.
 b. Failed to address the issue of Phone Banker fees.
 c. Failed to recognize the client's frustration.
 d. All of the above
A: Okay.
B: Do you think that you or any members of your family will have a need to borrow any money, say, sometime within the next six to twelve months?
A: No, probably not. Our family is consumed with my sister's wedding that's coming up.
B: So your sister's getting married! Well, that's exciting.
A: Yeah, but you know, I was going to travel the country with my cousin Alfred. But as always, even at 72 years of age, the world's got to stop at her feet and when she asks for it.
B: Who's 72?
A: My sister!
B: Wow that's incredible! Good for her.
A: Our mother left us a trust, but we're using it up and her wedding is already putting a huge dent in it. It's no small wedding. I can tell you that much!
B: I understand. You know, we're here to help you if you or your sister should ever need help. (Error 5)
What did the banker do wrong?
 a. She asked the first question incorrectly.
 b. She ignored the comment about sister's upcoming marriage.
 c. She didn't' acknowledge any of the several sales and service opportunities.
 d. She failed to inquire about the trust left to her by her mother.
What could the banker have said to acknowledge the client's potential needs?
 a. "It sounds like the wedding will be quite expensive and it's unfortunate that you're drying up your trust. Have you thought about taking out a loan?"
 b. "Why don't you give me a grand total of expenses you expect to pay and we'll work out a loan for you."
 c. "It sounds like you'll need a loan for your travel expenses after the wedding. Do you want to set up an appointment to talk?"
 d. All of the above.
A: Thank-you. Okay, is that it?
B: No, just a couple more questions Mr. Teale, if that's okay with you?
A: Okay.
B: Do you have any deposits and/or investments besides what you have with us, elsewhere?
What did the banker do wrong?
 a. She did not preposition the deposits and investments question.
 b. She asked the question out of order.
 c. She did not clarify what the client has currently at the bank.
 d. All of the above
A: No. Should I?
B: (laughs) No, we would like to keep you all to ourselves here at this bank. Now, besides the checking account and Savings accounts, check card and credit cards you have here do you have anything set up elsewhere?
A: No. I used to have an account with XYZ bank, but I closed it when I got separated from my wife.
B: And it's very nice to have you as a client indeed, Mr. Teale.
(Error 6)
What did the banker do wrong?
 a. She failed to inquire about the trust account.
 b. She failed to explain the reason for asking the questions.
 c. She failed to respect the client's possible time constraints.
 d. She left the question asking for outside deposits and investments too soon.
A: Thank you.
B: That concludes the analysis. Is there anything else I can do for you today?
A: No, I look forward to getting the copy of that check soon.
B: Yes, it should arrive sometime within the next week at your home address.
A: Great.
B: No problem. Have a nice day.
A: Thank you very much.
B: You're very welcome. Bye.
A: Bye.

Scenario B

Banker (B) and Customer (B) Interactions
Directions: In this scenario, participant is told to click the STOP icon not just when an error has been made, but also when an opportunity clue leading to a potential sale and/or service has been identified.
Total # errors & opportunity clues=14
Background Info The client is upset with an error that has recently occurred on her checking account. She has come into the branch because her previous attempts to correct the error over the phone have not proved efficient.
A: Hi, I have a major problem with my account, and I really want it fixed.
B: Sure what's STOP the problem? (Error 1)
True or False
The banker made the right move by immediately asking what the problem was.
 a. True
 b. False
What should the banker have said instead?
 a. The banker should have shown more sympathy for the client's situation before asking for the specific problem.
 b. The banker should have asked for the client's name to pull up the relevant account.
 c. The banker should have introduced himself then asked the client's name to pull up the relevant account.
 d. All of the above.

A: A couple days ago, I withdrew $1000 from my account, and apparently you guys withdrew $2000 by mistake. So, now my account has a negative balance STOP. (Opportunity Clue 2)
What opportunity clue(s) did you hear?
  a. An opportunity for opening up a savings account.
  b. An opportunity to discuss better money management and budgeting plans.
  c. An opportunity to discuss assigning the client a personal relationship banker.
  d. All of the above.
What is the best method of discussing these opportunity clues?
a. via teleconference
b. via online banking
c. via a structured needs discovery process
d. All of the above
A: (continues to speak) And I called yesterday and spoke to someone and they told me that it would be dropped off by the evening, so when I logged on again this morning and checked, I see nothing has changed. I'm still at a negative balance, and I have to pay my rent STOP tomorrow. (Opportunity Clue 3)
What opportunity clue(s) did you hear?
  e. An opportunity for opening up a savings account.
  f. An opportunity to discuss better money management.
  g. An opportunity to discuss assigning the client a personal relationship banker.
  h. All of the above.
B: Wow! I'm really sorry this has happened. Let me pull up your account. May I have your social security number please?
A: Yeah, okay it's 064616525.
B: Okay, I see what the problem is. It looks like since you withdrew the money after 4 pm, that the withdrawal wasn't posted until the next day, and in order to have it dropped off, it would have taken a day from the time the withdrawal was posted . . . the next transaction day. So, you should see a change by tonight.
A: Okay, but that's pretty much what I was told yesterday STOP and if I have to come back here again tomorrow, I'm not going to be very happy about this. I do work across the street so I will be back again if I have to. I really don't appreciate coming down here multiple times this week. (Opportunity Clue 4)
What opportunity clue or hidden message did you hear?
  a. an opportunity for opening up a Savings account.
  b. An opportunity to discuss better time-management.
  c. An opportunity to discuss assigning the client a private banker.
  d. All of the above.
B: Sure of course. Let me take your number and we'll call you to let you know what has happened. This problem should be fixed by midnight tonight. Meanwhile, I'm going to go ahead and credit your account $20.00 for the inconvenience.
I think this is just a glitch in the system here, because you're not the only one it has happened to.
A: (sarcastic) Yeah, okay great. I guess $20.00 is great, but you know I've been with you guys for about 9 years now STOP and I really don't appreciate being treated this way. It'll be really easy to take my account to another bank that's offering me_$75 and a free checking account just to join them! (Opportunity Clue 5)
What opportunity clue or hidden message did you hear?
  a. The client has been shopping around.
  b. The client has recent reservations with the bank
  c. The client needs more compensation for what she's gone through.
  d. All of the above.

What topics should be addressed and when or how should they be discussed?
  a. The client's dissatisfaction with the current bank; the time to discuss them is now.
  b. The client's need for more compensation; the banker can talk about client's immediate credit needs, if needed.
  c. The client has been shopping around; the banker should bring up the services the bank can offer to meet the client's many ways.
  d. All of the above.
B: Sure I understand. We're going to look into this to make sure it doesn't happen again. You know . . . one thing that can help us out at this bank STOP is if you participate in a new analysis we're conducting with all of our clients. (Error 6)
What did the banker do wrong?
  a. introduced the client needs analysis at an inappropriate time.
  b. Did not pre-position the client needs analysis.
  c. Did not bother to ask if the client has enough time.
  d. Mentioned how the client needs analysis will help the bank, but not the client.
What should the banker have said instead?
  a. The banker should have asked the client for 4-5 minutes of their time to conduct a client needs analysis.
  b. Explained the purpose of the client needs analysis, as related to the enhancement of their services and relationship with the client.
  c. Asked the banker when the right time to conduct a client needs analysis would be, and set an appointment
A: What for?
B: It helps us get a better picture of how we can be more helpful to our client's financial needs. But the best way to find out is to take part in it. (Error 7)
True or False
The banker handled the objection well.
a. True
b. False
A: Look, I don't have long. I'm here on my lunch hour.
B: I promise this will not take long at all STOP and will be highly beneficial to you. (ERROR 8)
What should the banker have said or asked the client, that he hasn't?
  a. the banker could have asked for a better time to conduct a client needs analysis and set the appointment.
  b. The banker could have been honest about the time a client needs analysis can take, and then expressed the urgency of conducting one at the current time.
  c. The banker should specify the time it takes to conduct a client needs analysis.
  d. All of the above
What is the duration of conducting a client needs analysis?
  a. 15 minutes including any additional questioning.
  b. 4-5 minutes for the initial part; an additional 4-5 more for additional questions
  c. 2-3 minutes for the initial part; an additional 2-3 more for additional questions.
  d. Any of the above
A: Okay, but you guys made me a promise last night that you didn't keep!
B: I'm sorry I don't know who you talked to. They should have given you the facts, but because of this glitch in our system, everyone's kind of had a lot on their plate to deal with recently. I promise I will look into your situation, personally. Now, shall I start with the analysis? ERROR 9
What did the banker do wrong?
  a. Miss the opportunity for a service
  b. Ignore the client's frustration c. Revealed the bank's glitch.
d. Didn't ask who helped them.

What could have been done?
 a. A personal banker could be assigned to the banker to avoid future confusion and inconsistency.
 b. Acknowledged the client's frustration, by mirroring it (verbally repeating it with an empathetic remark).
 c. Assuring the client that she will be better taken care of after conducting the client needs analysis because there will be a better profile of her and her needs for the bank to build a relationship upon.
 d. All of the above.

A: Okay, but if it runs too long, I'm leaving in the middle.
B: No problem. Okay, Ms. Levy, for starters, do you or any of your family members have a need STOP to take out any loans, sometime between now and next year? (ERROR 10)

What did the banker do wrong?
 a. Asked the wrong question first.
 b. Didn't define the purpose of the question before asking it.
 c. Re-asked the question when the participant had already answered that there were no needs.
 d. Did not ask about specific areas where a loan may be considered A: No, not really.
B: Okay, so there are no borrowing needs STOP that we can look at today? (Error 11)
True or False
The banker should have given specific types of loan examples and given a detailed account of each to confirm that the client does not have any borrowing needs with respect to the loans the bank offers.
 a. True
 b. False A: Not that I can think of, no.
B: Okay, do you have any deposits STOP and/or investments at any other financial institution? (Error 12)
True or False
The banker pre-positioned the question well.
 a. True
 b. False What could the banker have said?
 a. In order to help you consolidate any of your outside accounts here with your accounts at this bank, can you tell me what deposits and investments you may have elsewhere?
 b. In order to help simplify your financial life, can you tell me what investments/deposits, you have elsewhere?
 c. In order to help you simplify your financial life through consolidation of accounts where appropriate in an attempt to save you time and money, can you tell me what investments/deposits, you have elsewhere?

A: No, just with your establishment.
B: What about credit cards, STOP check cards, Savings or Checking accounts, aside from what you have here with us? (Error 13)
True or False
The client did not pre-position the question well.
 a. True
 b. False A: Nope . . . all I have is what you have on your screen there.
B: Alright . . . well, I have to conclude the analysis STOP here because it looks like there isn't much we can look at today. (ERRORS 14)
True or False
The banker has reached an adequate conclusion after analyzing the client.
 a. True
 b. False What did the banker do wrong?
 a. He rushed the client needs analysis process without thoroughly analyzing the client's needs.
 b. He missed all opportunities for potential sales and services that could have met the client's needs.
 c. He did not give any rationales for asking any of the client needs analysis probes or pre-position the client needs analysis process well.
 d. All of the above.

A: I'm pretty happy that it was quick just like you said it would be.
B: Yes, and I am so sorry about what has occurred. We'll be staying in touch. Good luck.
A: Yeah thanks. I look forward to the withdrawal to be dropped off by midnight tonight.
B: Yes, it will be dropped off no later than tonight.
A: Okay, I appreciate your help.
B: Pleasure is mine. Bye Ms. Levy.

Scenario C

Travel Agent (X) and Client (Y) Interactions
X1
Welcome to The Alternate Learning Travel Agency. What can we do for you today?
 Y1
 I am a movie buff and am interested in traveling to Europe for a week this summer.
X2 (ERROR)
Well, I'd recommend you go see the birthplace of Ingrid Bergman in Finland. The weather there is stunning during the summer months.

II. Quiz 1A

Q: Where was Ingrid Bergman born?
 A Turkey
 B Norway
 C Sweden
 D Iceland

III. Quiz 1B

Q: Which body of water lies to the east of Sweden?
 A The Baltic Sea
 B The Caspian Sea
 C The Red Sea
 D The Dead Sea
X2C (CORRECTED)
Well, I'd recommend you go see he birthplace of Ingrid Bergman in Sweden. The weather there is stunning during the summer months.
 Y2
 Well actually, one of my favorite movies is La Strada with Anthony Quinn.
X3
Quinn was born in Mexico, but we can send you Italy, where the movie was made.
 Y3
 That sounds quite exciting.
X4 (ERROR)
We have 4 destination specials at the moment; Naples in the South, Bolzano in the mountains, Milan on the beach, or Venice by the canals.

IV. Quiz 2A

Q: Which of these facts is wrong?
  a. A Naples is in the south of Italy
    B Milan is on the coast
    i. C Bolzano is in the Alps
    D Venice has canals
2. Quiz 2B
Q: What island lies off the southern tip of Italy?
    A Corsica
    B Sardinia
    C Sicily
  B. D Crete
X4C (CORRECTED)
We have 4 destination specials at the moment; Naples in the South, Bolzano in the mountains, Milan in the North, or Venice by the canals.
  Y4
  How about France?
X5
Well there is always the Riviera. You've got Nice and St. Tropez which can be pricey, or we can send you on a wine tour starting in Bordeaux in the west.
  Y5
  Oh, I absolutely love wine.
X6 (ERROR)
If you love wine, you'll love this trip we have to the Champagne caves in Burgundy.

V. Quiz 3A

Q: Where are the Champagne caves?
    A Reims
  (a) B Champagne
    C Both of the above
  ii. D None of the above

VI. Quiz 3B

Q: In the list below, which is the nearest city to where champagne is made?
    A Paris
  a. B Tolouse
    C Marseille
    D Lyon
X6C (CORRECT)
If you love wine, you'll love this trip we have to the Champagne caves northeast of Paris.
  Y6
  How long will it take me to get to Paris from Los Angeles?
X7 (ERROR)
The flight is very pleasant and should take you no longer than 9 hours non-stop. What day would you like to depart?

VII. Quiz 4A

Q: How long is a non-stop flight form Los Angeles to Paris?
    A 10.5 hrs
    B 11.5 hrs.
    C 12.5 hrs.
    D None of the above

VIII. Quiz 4B

Q: How far is Los Angeles from Paris?
  i. A 4090 miles
    B 3923 miles
    C 8012 miles
    D 6159 miles
X7C (CORRECT)
The flight is very pleasant and should take you ten and a half hours non-stop. What day would you like to depart?
END

Scenario D

Travel Agent (X) and Client (Y) Interactions
X1
Welcome to the Advanced Listening Travel Agency! What can we do for you today?
  Y1
  I am a movie buff and am interested in traveling to Europe for a week this summer.
X2
Well, I'd recommend you go see the birthplace of Ingrid Bergman in Finland. The weather there is stunning during the summer months.
Quiz 1A
What is the error?
A. Ingrid Bergman was born in Finland.
B. The weather in Finland is stunning during the summer months.
C. Ingrid Bergman was born.
D. A&B
What should the Travel Agent have said instead?
A. Ingrid Bergman was born in Norway.
B. Ingrid Bergman was born in Paris.
C. Ingrid Bergman was born in Sweden.
D. To this day, the birthplace of Ingrid Bergman remains a mystery.
  Y2
  Well actually, one of my favorite movies is La Strada with Anthony Quinn.
X3
Quinn was born in Mexico, but we can send you Italy, where the movie was made.
  Y3
  That sounds quite exciting.
X4
We have 4 destination specials at the moment:
Sicily in the South,
Rome, which is the capital,
Milan, which is on the beach,
or Venice by the canals.
Quiz 2A
What is the Error?
  A. Sicily is in the South of Italy.
  B. Milan is on the beach.
  C. Venice is by the canals.
  D. Rome is the capital of Italy.
Quiz 2B
What could the Travel Agent have said about Milan?
  A. Milan is the Italian Riviera.
  B. Milan is a town in Rome.
  C. Milan is the name of Venice's famous canal.
  D. Milan is in Northern Italy.
  Y4
  How about France?
X5
Well there is always the Riviera. You've got Nice and St. Tropez on the Mediterranean, which can be pricey, or we can send you on a wine tour starting in Bordeaux in the west.
  Y5
  Oh, I absolutely love wine.

X6
If you love wine, you'll love this trip we have to the Champagne caves in Burgundy. It is one of our most popular trips.
Quiz 3A
What is the Error?
　A. The Travel Agent assumes the Client loves wine.
　B. The Travel Agent claims that this is one of their "most popular trips."
　C. Champagne Caves are in Burgundy.
　D. A&B
Quiz 3B
What could the Travel Agent have said instead?
　A. Champagne caves can be found in Reims.
　B. Champagne caves can be found in Champagne.
　C. Champagne caves can be found in Tuscany.

IX. D. A&B a. Y6
　　Well, I've never been a fan of Champagne . . . a little pretentious if you ask me. I think I'd like to go to Rome instead.
X7
All right then! Let's see what we have available to France. When would you like to travel?
Quiz 4A
What is the Error?
　A. The Travel Agent assumes the responsibility of looking for available dates of travel.
　B. The Travel Agent says he will look for flight availability to France.
　C. The Travel Agent asks the Client when she would like to travel.
　D. All of the Above.
Quiz 4B
What does this Error say about the Travel Agent and how what could he have said instead?
　A. The Travel Agent could be distracted. He could have offered to look at availabilities to Rome.
　B. The Travel Agent hasn't heard what his Client has said. He could have offered to look at availabilities to Rome.
　C. The Travel Agent doesn't care about the Client's wish. He could have offered to look at availabilities to Milan.
　D. A&B
END Thus, as described above, certain embodiments involve having a trainee provide "real world" verbal answers, rather than multiple choice or true-false, to thereby better test for real knowledge versus the "prompted knowledge" of multiple choice or true-false testing. Further, even though a trainee provides verbal answers, certain embodiments still facilitate objective scoring. In addition, the process of providing verbal "real world" answers impacts cognitive and psychomotor functions of the trainee's brain. In addition, fluency, automaticity (the ability to do things without occupying the conscious mind with low level details) and the ability of the trainee to generalize the trained skills and subject matter are enhanced. Thus, multi-channel integrated learning is provided by affecting different brain areas (e.g., the visual, hearing, and cognitive).

Further, certain embodiments teach critical thinking and train users in taking an idea or issue to its logical conclusion. Optionally, even if the user is unable to answer a question in a related series of questions, the trainee's critical thinking is further trained via subsequent questions in the series. As discussed above, "Microscoring" is provided in certain embodiments, wherein if the trainee fails to answer a first question in a series of questions, the trainee is appropriately scored for the failure, but the answer is then provided to the trainee so that the trainee can answer (and be scored on) subsequent questions in the series.

In addition, certain embodiments utilize a human facilitator to enhance the trainee's engagement, attention, focus and fun. Further, the facilitator, by acting as a facilitator also learns certain of the skills and information being taught to the trainee, thereby providing "dual learning". Optionally, training can be performed solo by the trainee, without a human facilitator.

It should be understood that certain variations and modifications of this invention would suggest themselves to one of ordinary skill in the art. The scope of the present invention is not to be limited by the illustrations or the foregoing descriptions thereof.

What is claimed is:

1. A method of computerized training using an interactive computerized training system, comprising:
　presenting to a user a first presentation of a first speaker speaking using a first speaking style and a first script via the interactive computerized training system;
　presenting to the user a second presentation of the first speaker speaking using a second speaking style and the first script via the interactive computerized training system so that the user can evaluate the effect of speaking style on a listener; and
　causing at least in part the user to be queried as to whether the first speaker was more effective in the first presentation or the second presentation and why, wherein the user is to verbally respond and is not provided a choice of answers from which to select$_L$ and
　calculating and reporting by the computerized training system a score reflective, at least in part, of the user's response to the query.

2. The method as defined in claim 1, wherein the user is instructed to verbally explain why the first speaker was more effective in the first presentation or the second presentation to a person in physical and audible proximity with the user, wherein the person scores the user's response by comparing the user explanation with a preprogrammed answer presented by the system.

3. The method as defined in claim 1, wherein the first presentation is randomly selected by the system from a set of presentations.

4. The method as defined in claim 1, wherein the appearance of the first speaker is the same in the first presentation and the second presentation.

5. The method as defined in claim 1, wherein the appearance of the first speaker in the first presentation differs from the appearance of the first speaker in the second presentation.

6. The method as defined in claim 1, wherein the clothing and/or hair style of the first speaker in the first presentation differs from that of the first speaker in the second presentation.

7. The method as defined in claim 1, wherein the second speaking style is a more confident style than the second speaking style.

8. The method as defined in claim 1, wherein the second speaking style is quicker than the second speaking style.

9. The method as defined in claim 1, the method further comprising asking the user to identify correct and incorrect speaking style technique implementations in the first and/or second presentations.

10. The method as defined in claim 1, the method further comprising asking the user to identify appearance and/or grooming issues that detract from the verbal communication persuasiveness of the first speaker in the first and/or second presentation.

11. The method as defined in claim 1, the method further comprising storing the user's response to the query regarding whether the first speaker was more effective in the first presentation or the second presentation.

12. The method as defined in claim 1, the method further comprising storing a score related to the user's response to the query regarding whether the first speaker was more effective in the first presentation or the second presentation.

13. A method of computerized training, comprising:
presenting to a user a first presentation of a first speaker speaking using a first speaking style and a first script via a computerized training system;
presenting to the user a second presentation of the first speaker speaking using the first speaking style and a second script via the computerized training system, wherein the first script and the second script provide substantially the same information using at least in part different wording so that the user can evaluate the effect of wording on a listener; and
causing at least in part the user to be queried to verbally articulate:
whether the first speaker was more effective in the first presentation or the second presentation,
why the first speaker was more effective in the first presentation or the second presentation; and
calculating and reporting by the computerized training system a score reflective, at least in part, of the user's response to the query.

14. The method as defined in claim 13, wherein the user is instructed to verbally explain why the first speaker was more effective in the first presentation or the second presentation to a person in physical and audible proximity with the user, wherein the person scores the user's response by comparing the user explanation with a preprogrammed answer presented by the system.

15. The method as defined in claim 13, wherein the first presentation is randomly selected by the system from a set of presentations.

16. The method as defined in claim 13, wherein the appearance of the first speaker is the same in the first presentation and the second presentation.

17. The method as defined in claim 13, wherein the appearance of the first speaker in the first presentation differs from the appearance of the first speaker in the second presentation.

18. The method as defined in claim 13, wherein the clothing and/or hair style of the first speaker in the first presentation differs from that of the first speaker in the second presentation.

19. The method as defined in claim 13, wherein the first script and/or the second script include contradictions.

20. The method as defined in claim 13, wherein the first script and/or the second script include redundancies.

21. The method as defined in claim 13, the method further comprising asking the user to identify appearance and/or grooming issues that detract from the verbal communication persuasiveness of the first speaker in the first and/or second presentation.

22. The method as defined in claim 13, the method further comprising storing the user's response to the query regarding whether the first speaker was more effective in the first presentation or the second presentation.

23. The method as defined in claim 13, the method further comprising storing a score related to the user's response to the query regarding whether the first speaker was more effective in the first presentation or the second presentation.

24. A method of computerized training, comprising:
presenting to a user a first presentation of a first speaker speaking using a first speaking style and/or a first verbiage via a computerized training system;
presenting to a user a second presentation of a second speaker speaking using a second speaking style and/or a second verbiage via the computerized training system;
causing at least in part the user to be queried as to whether the first speaker or the second speaker was more effective and why;
storing the user response to the query in computer accessible memory; and
causing at least in part the user to be queried to verbally explain why the first speaker or the second speaker was more effective and
calculating and reporting by the computerized training system a score reflective, at least in part, of the user's response to the query.

25. The method as defined in claim 24, wherein the user is instructed to verbally explain why the first speaker or second speaker was more effective to a person in physical and audible proximity with the user, wherein the person scores the user's response by comparing the user explanation with an answer presented by the system.

26. The method as defined in claim 24, wherein the first presentation is randomly selected by the system from a set of presentations.

27. The method as defined in claim 24, wherein the first verbiage is the same as the second verbiage.

28. The method as defined in claim 24, wherein the first speaking style is the same as the second speaking style.

29. The method as defined in claim 24, wherein the appearance of the first speaker in the first presentation differs from the appearance of the second speaker in the second presentation.

30. The method as defined in claim 24, wherein the clothing and/or hair style of the first speaker in the first presentation differs from that of the second speaker in the second presentation.

31. The method as defined in claim 24, the method further comprising asking the user to identify appearance and/or grooming issues that detract from the verbal communication persuasiveness of the first speaker and/or the second speaker.

32. A method of computerized training, comprising:
causing at least in part a first presentation to a user of a first speaker speaking using a first speaking style, a first script, and having a first appearance via a computerized training system;
causing at least in part a first presentation to the user of the first speaker using a second speaking style, a second script, and/or a second appearance;
causing at least in part the user to be queried as to whether the first speaker was more effective in the first presentation or the second presentation and why, wherein the user is to verbally respond; and
calculating and reporting by the computerized training system a score reflective, at least in part, of the user's response to the query.

33. The method as defined in claim 32, wherein the first presentation is randomly selected by the system from a set of presentations.

34. The method as defined in claim 32, wherein the first speaker in the second presentation has a different appearance and uses a different speaking style than in the first presentation.

35. The method as defined in claim 32, wherein the first speaker in the second presentation has a different appearance and uses a different script than in the first presentation, wherein the different script has substantially the same informational content as that in the first presentation.

36. The method as defined in claim 32, the method further comprising training the user in taking notes during at least a first training session, including training the user to prioritize what is to be noted regarding the first training session.

37. The method as defined in claim 32, the method further comprising providing a user interface including:
- a first user input control enabling a command to be entered causing an entire presentation conversation to be played; and
- a plurality of conversation segment controls enabling corresponding segments of the presentation conversation to be automatically located and selectively played.

38. An article of manufacture comprising:
program code stored in non-transitory, computer readable memory, that when executed by a computing system is configured to cause the computing system to perform operations comprising:
presenting to a user a first presentation of a first speaker speaking using a first speaking style and a first script via the interactive computerized training system;
presenting to the user a second presentation of the first speaker speaking using a second speaking style and the first script via the interactive computerized training system so that the user can evaluate the effect of speaking style on a listener;
causing at least in part the user to be queried as to whether the first speaker was more effective in the first presentation or the second presentation and why, wherein the user is to verbally respond and is not provided a choice of answers from which to select; and
calculating and reporting by the computerized training system a score reflective, at least in part, of the user's response to the query.

39. An article of manufacture comprising:
program code stored in non-transitory computer readable memory, that when executed by a computing system is configured to cause the computing system to perform operations comprising:
presenting to a user a first presentation of a first speaker speaking using a first speaking style and a first script via a computerized training system;
presenting to the user a second presentation of the first speaker speaking using the first speaking style and a second script via the computerized training system, wherein the first script and the second script provide substantially the same information using at least in part different wording so that the user can evaluate the effect of wording on a listener; and
causing at least in part the user to be queried to verbally articulate:
whether the first speaker was more effective in the first presentation or the second presentation,
why the first speaker was more effective in the first presentation or the second presentation; and
calculating and reporting by the computerized training system a score reflective, at least in part, of the user's response to the query.

\* \* \* \* \*

UNITED STATES PATENT AND TRADEMARK OFFICE
CERTIFICATE OF CORRECTION

Page 1 of 2

PATENT NO.        : 8,702,432 B2
APPLICATION NO.   : 12/058493
DATED             : April 22, 2014
INVENTOR(S)       : Cohen It is certified that error appears in the above-identified patent and that said Letters Patent is hereby corrected as shown below:

In the Drawings

Sheet 8 of 80 (Fig. 1H) at line 7 (approx.), Change "and/od" to --and/or--.

Sheet 17 of 80 (Fig. 3C) at line 7, Change "converstaion" to --conversation--.

Sheet 17 of 80 (Fig. 3C) at line 14, Change "opportunites." to --opportunities.--.

Sheet 20 of 80 (Fig. 3F) at line 17, Change "opportunit" to --opportunity--.

Sheet 22 of 80 (Fig. 3H) at line 4, Change "ntoes." to --notes.--.

Sheet 30 of 80 (Fig. 3P) at line 4, Change "opportunites," to --opportunities,--.

Sheet 38 of 80 (Fig. 3X) at line 5, Change "scenarious" to --scenarios--.

Sheet 39 of 80 (Fig. 3Y) at line 11, Change "opportunites)" to --opportunities)--.

Sheet 41 of 80 (Referral Numeral 450A, Fig. 4A-2) at line 1, Change "CORE" to --SCORE--.

Sheet 57 of 80 (Referral Numeral No. 414N, Fig. 4N-1) at line 4, Change "CHALLENGESON" to --CHALLENGES ON--.

Sheet 67 of 80 (Fig. 5I) at line 1, Change "ALOTTED" to --ALLOTTED--.

Sheet 67 of 80 (Fig. 5I) at line 14, Change "ALOTTED." to --ALLOTTED.--.

In the Specification

In column 53 at line 4, Change "opportunities," to --opportunities.--.

In column 56 at line 49, Change "thereof," to --thereof;--.

In column 56 at line 51, Change "thereof," to --thereof;--.

In column 57 at line 40, Change "and or" to --and/or--.

In column 64 at line 8, Change "it" to --is--.

In column 68 at line 61, Change "At" to --at--.

In column 70 at line 45, Change "that that" to --that--.

Signed and Sealed this
Thirteenth Day of January, 2015

Michelle K. Lee
*Deputy Director of the United States Patent and Trademark Office*

CERTIFICATE OF CORRECTION (continued)
U.S. Pat. No. 8,702,432 B2

In column 73 at line 62, Change "appropriate" to --appropriate.--.

In column 96 at line 60, Change "400In," to --400$I_n$,--.

In column 104 at line 48, Change "Info" to --Info:--.

In column 105 at line 64, Change "bank" to --bank.--.

In column 106 at line 29, Change "appointment" to --appointment.--.

In column 106 at line 54, Change "questions" to --questions.--.

In column 106 at line 66, Change "service" to --service.--.

In column 106 at line 67, Change "frustration" to --frustration.--.

In column 107 at line 24, Change "considered" to --considered.--.

In column 109 at line 43, Change "Tolouse" to --Toulouse--.

In column 109 at line 57, Change "form" to --from--.

In the Claims

In column 112 at line 33, In Claim 1, change "$select_L$" to --select;--.